July 29, 1952 F. D. PALMER 2,604,826
APPARATUS FOR MAKING PACKAGES
Filed May 31, 1944 27 Sheets-Sheet 1

INVENTOR.
Frank D. Palmer
BY Soans, Pond & Anderson
ATTYS

July 29, 1952 F. D. PALMER 2,604,826
APPARATUS FOR MAKING PACKAGES
Filed May 31, 1944 27 Sheets-Sheet 3

INVENTOR.
Frank D. Palmer
BY
Evans, Pond & Anderson
ATTYS

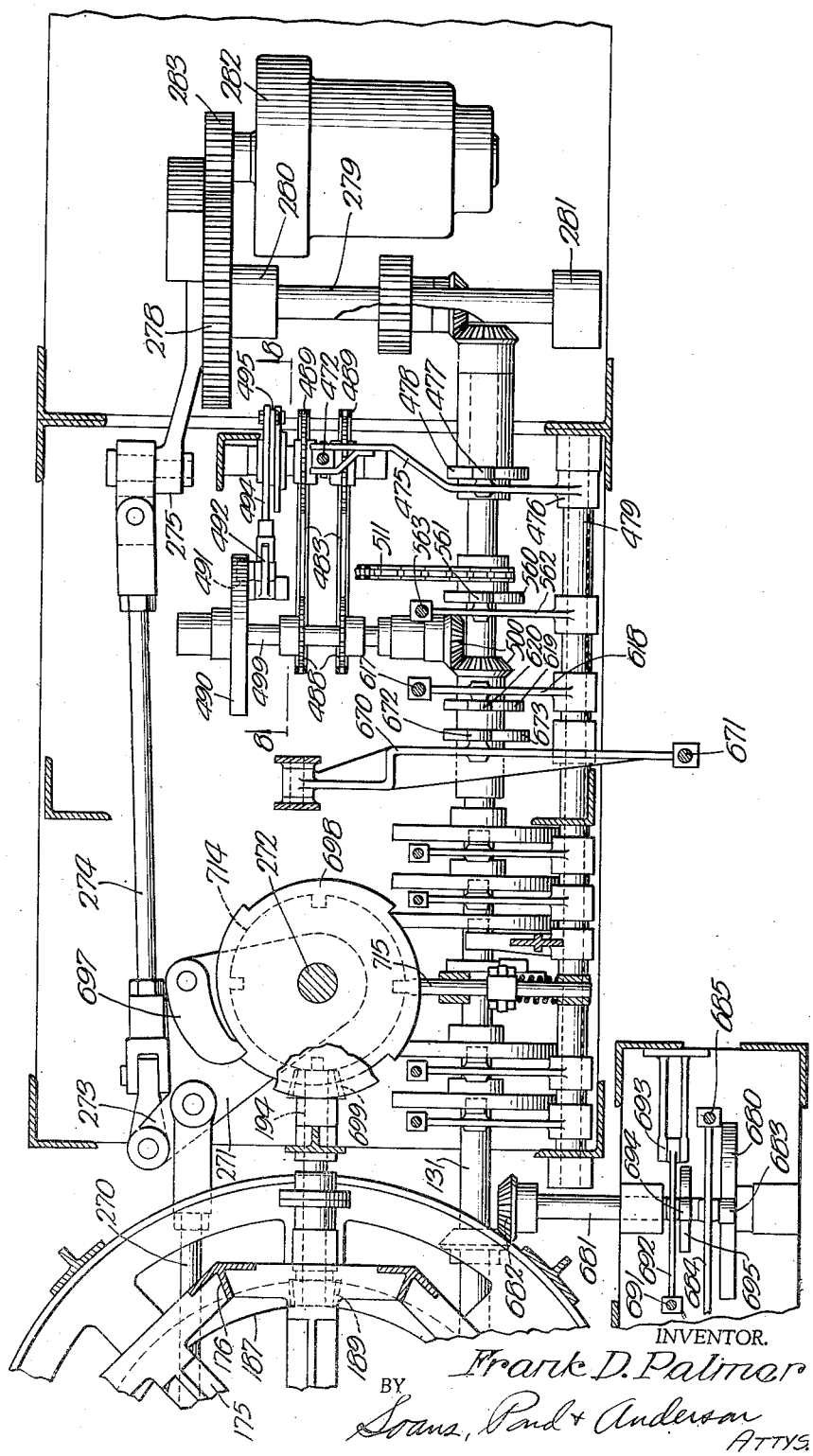

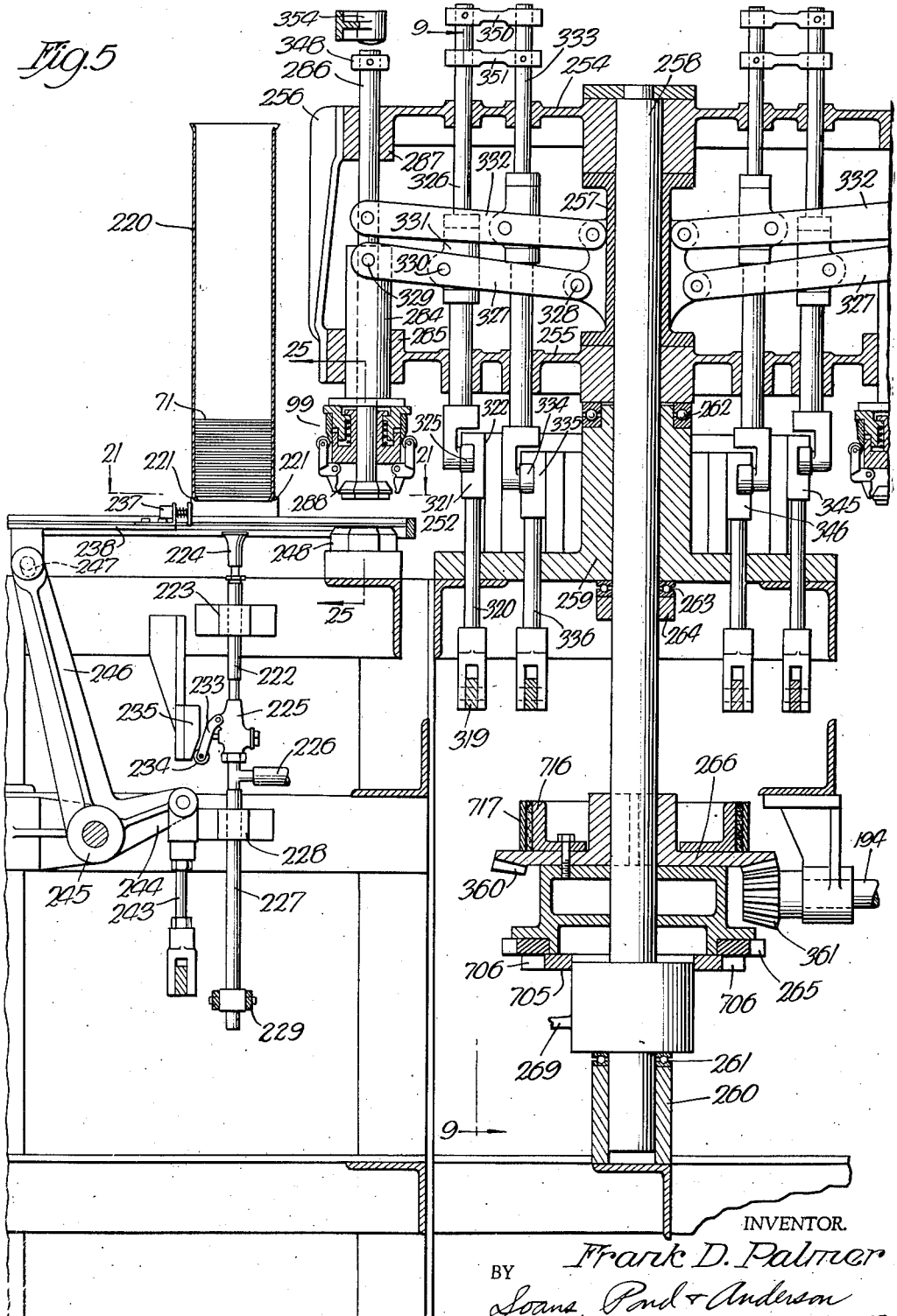

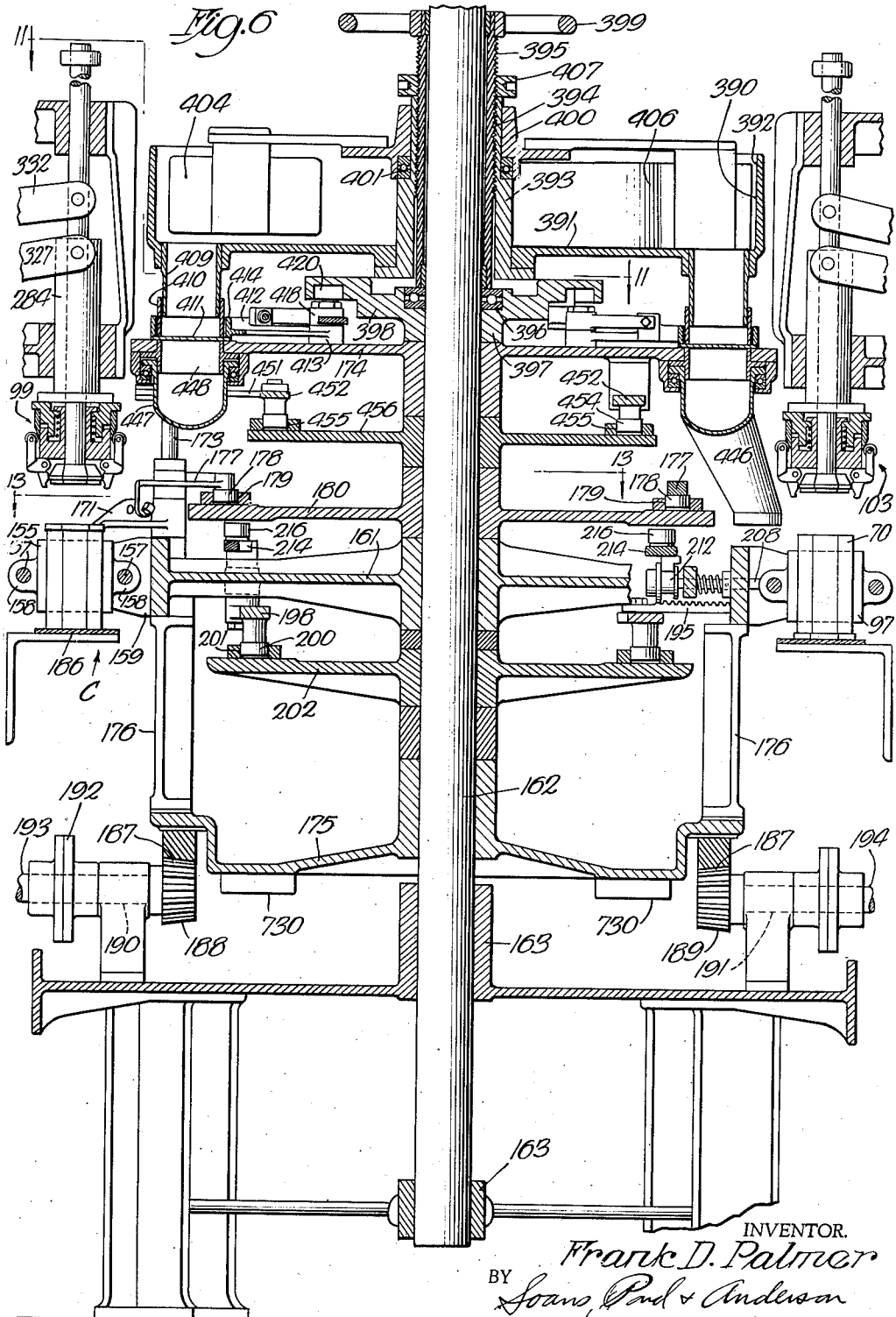

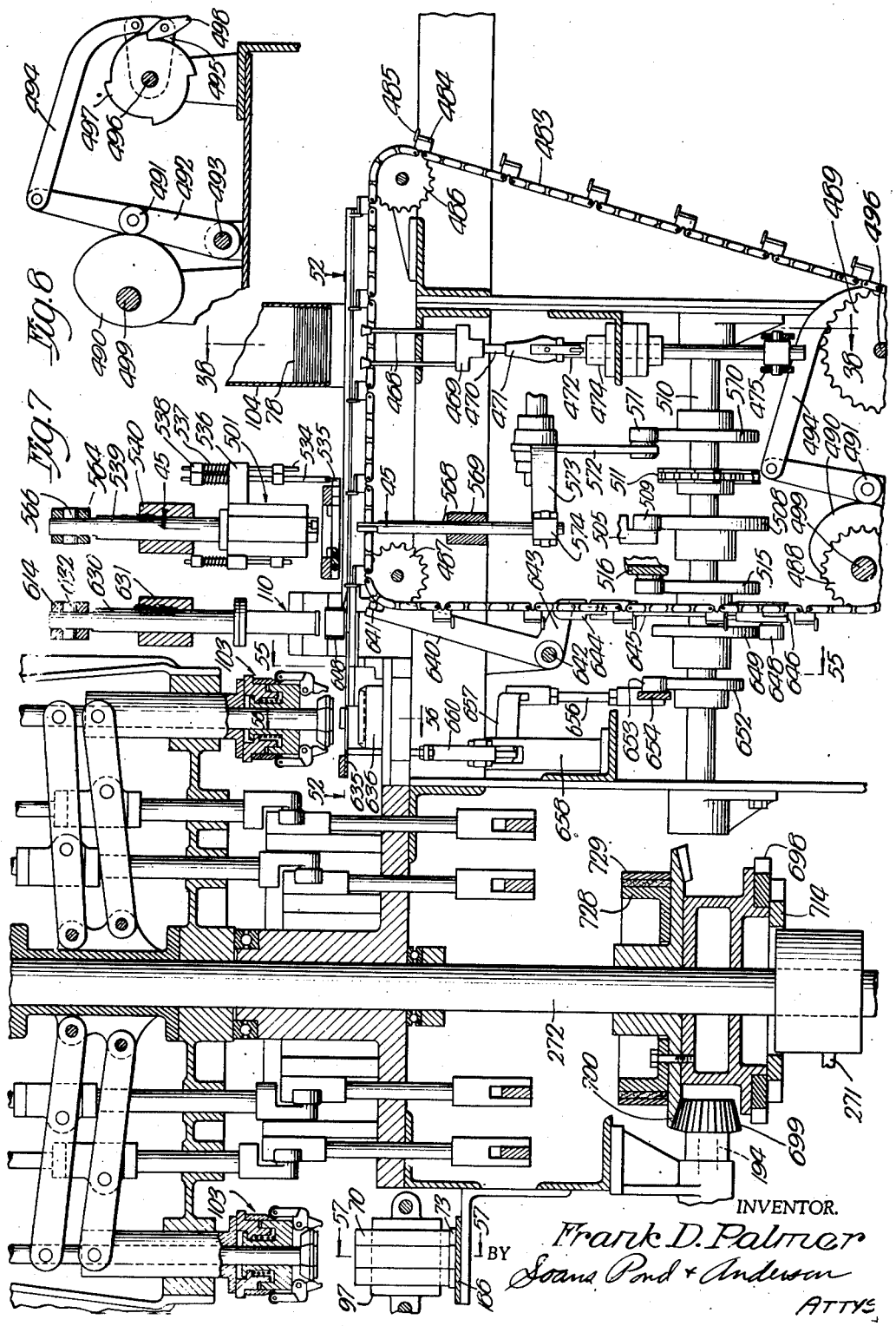

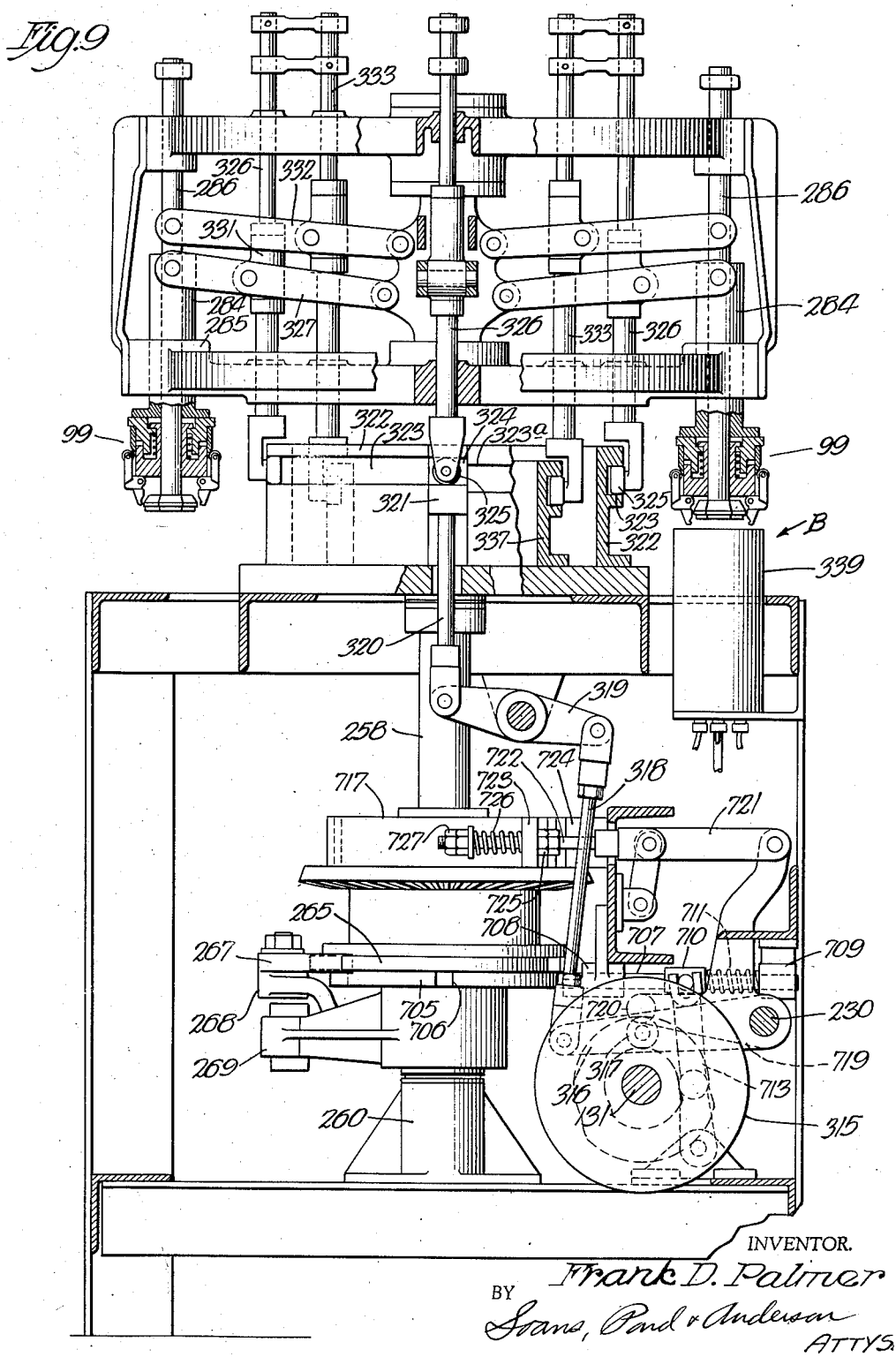

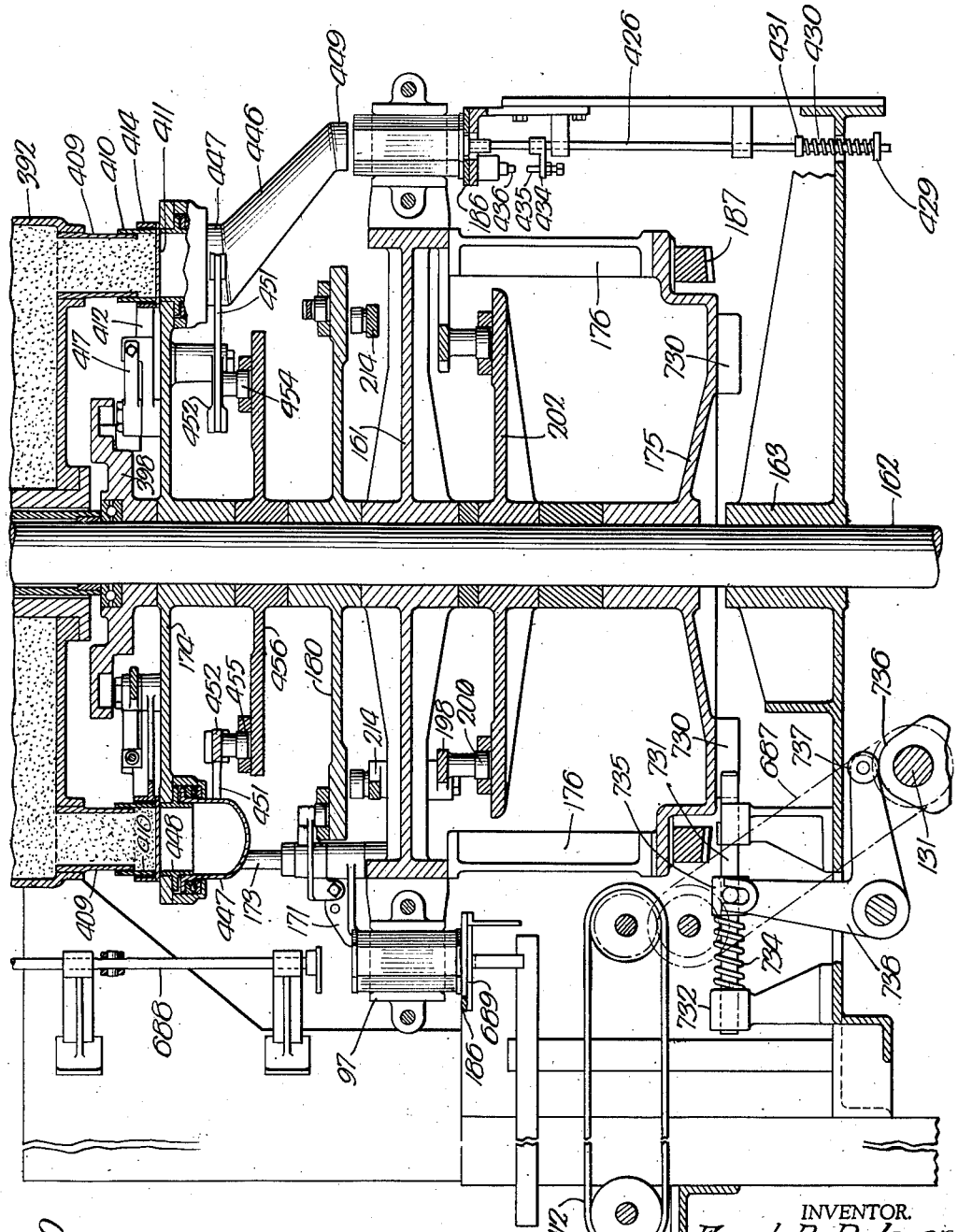

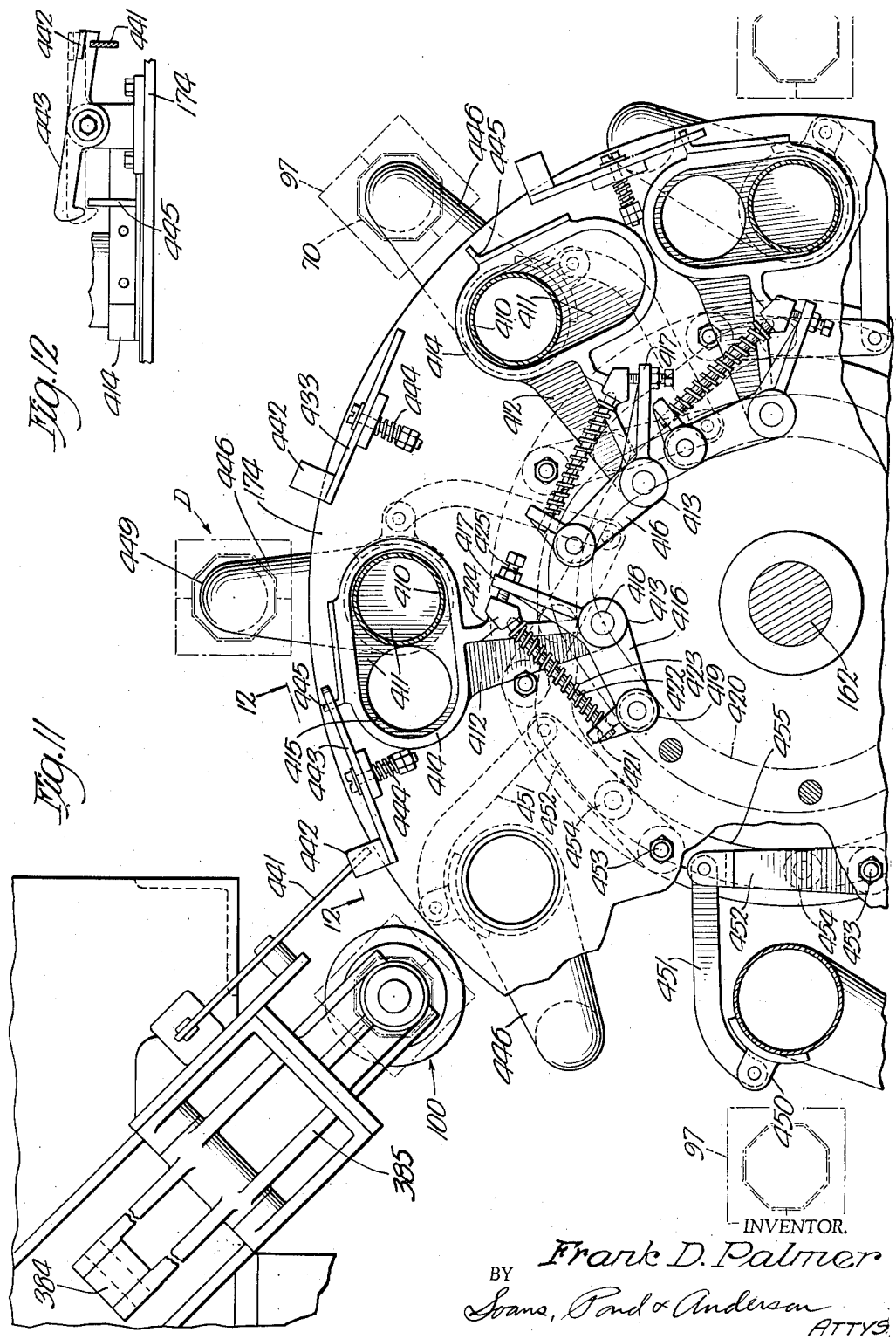

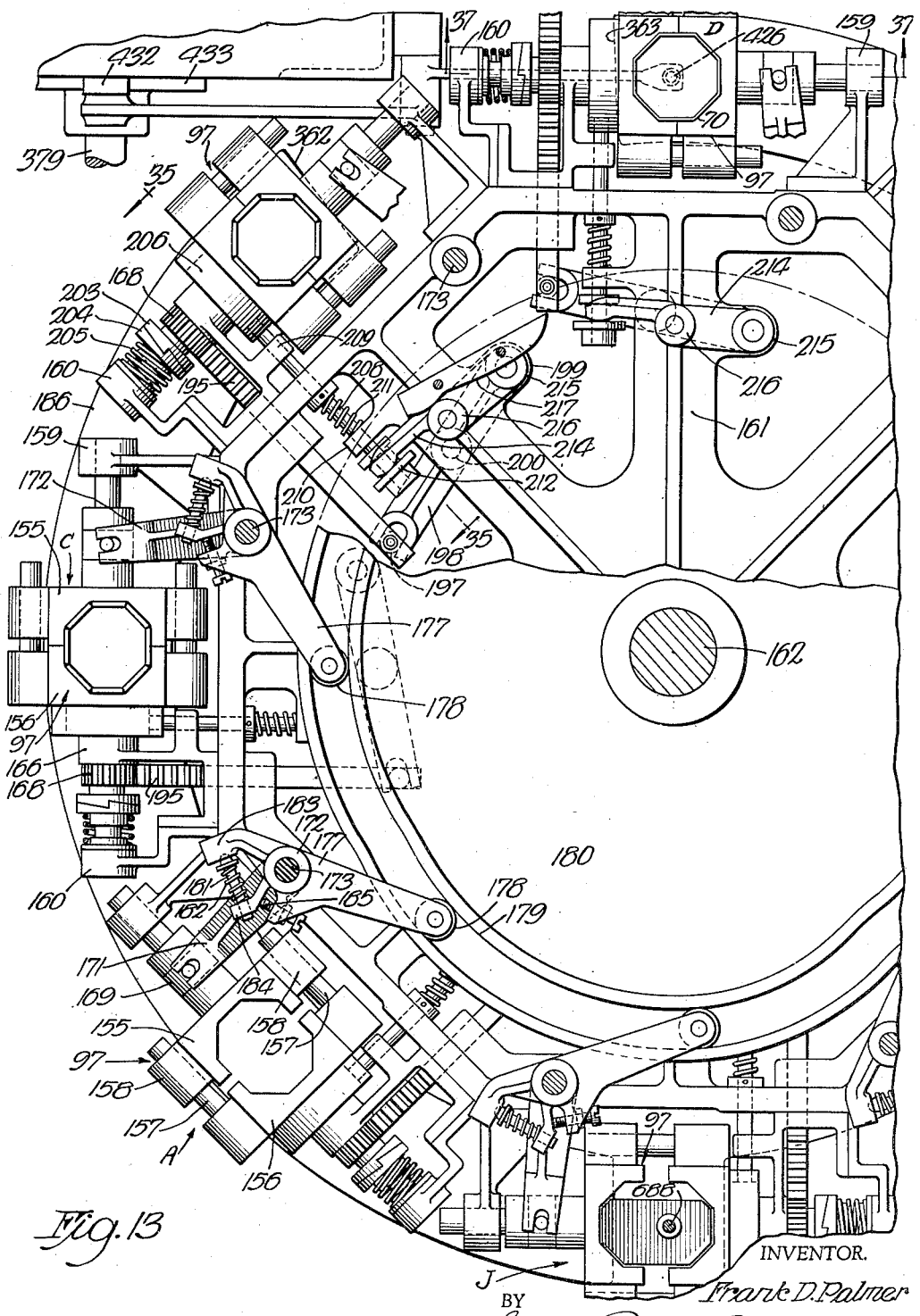

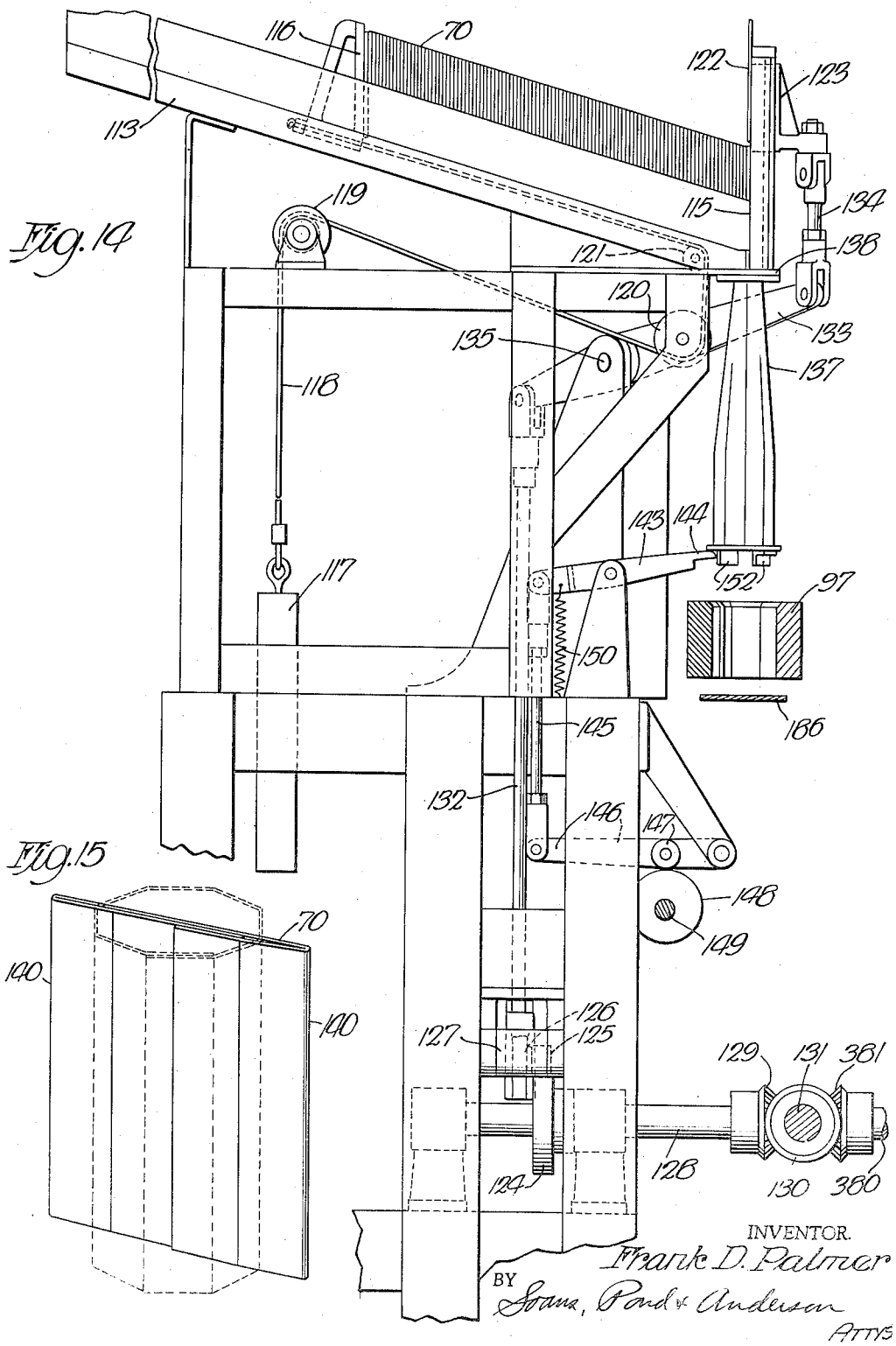

July 29, 1952　　　F. D. PALMER　　　2,604,826
APPARATUS FOR MAKING PACKAGES
Filed May 31, 1944　　　27 Sheets-Sheet 13
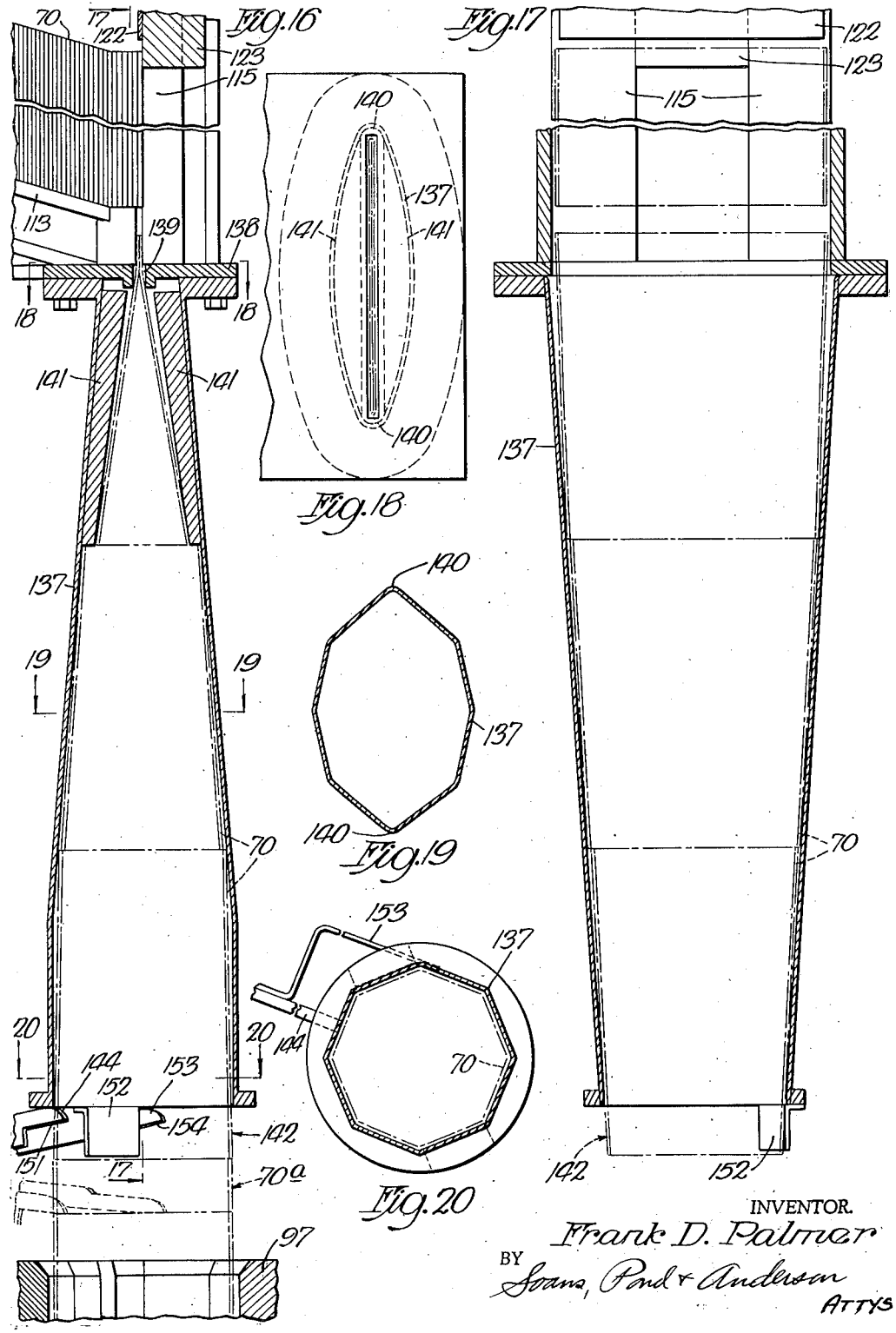
INVENTOR.
Frank D. Palmer
BY Evans, Pond & Anderson
ATTYS July 29, 1952  F. D. PALMER  2,604,826
APPARATUS FOR MAKING PACKAGES
Filed May 31, 1944  27 Sheets-Sheet 14
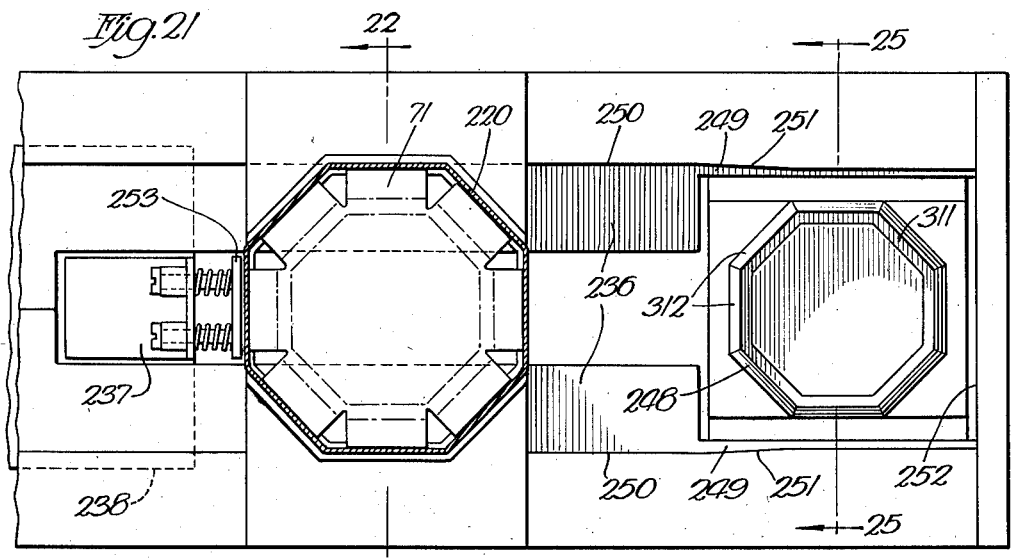
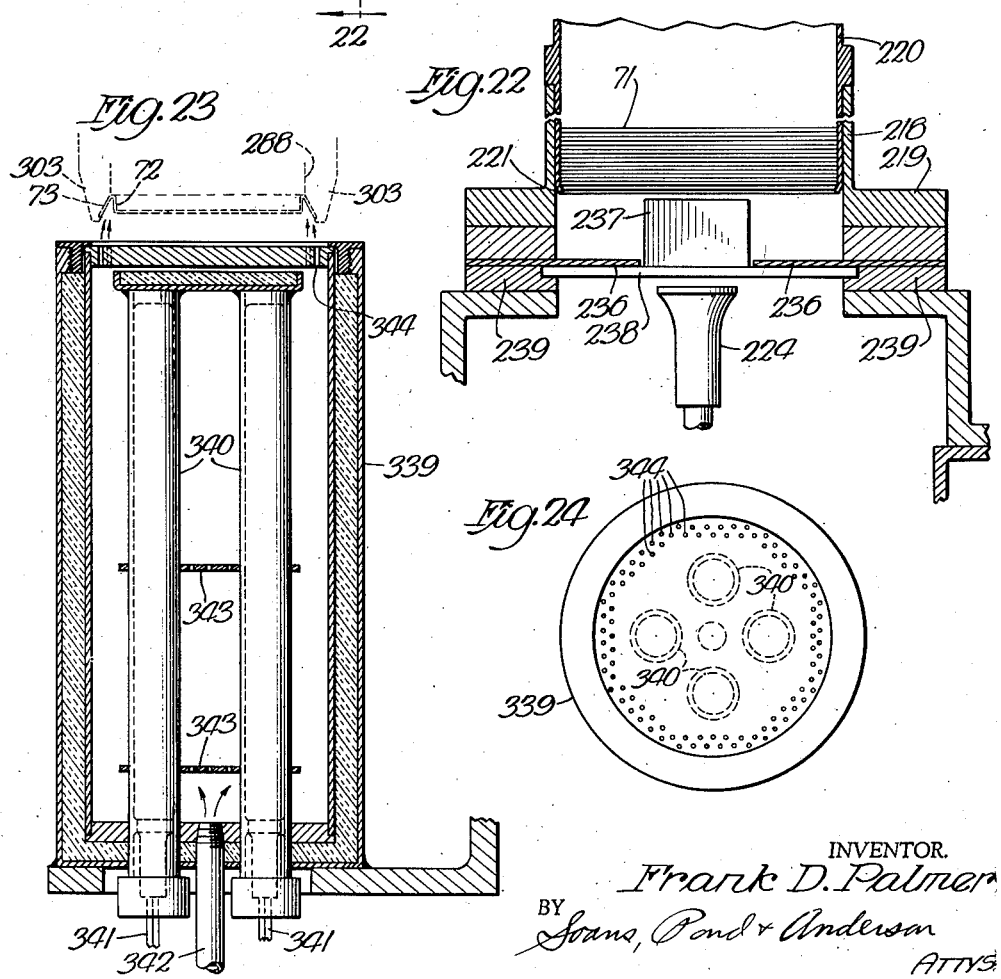
INVENTOR.
Frank D. Palmer
BY Soans, Pond & Anderson
ATTYS.

July 29, 1952 F. D. PALMER 2,604,826
APPARATUS FOR MAKING PACKAGES
Filed May 31, 1944 27 Sheets-Sheet 15
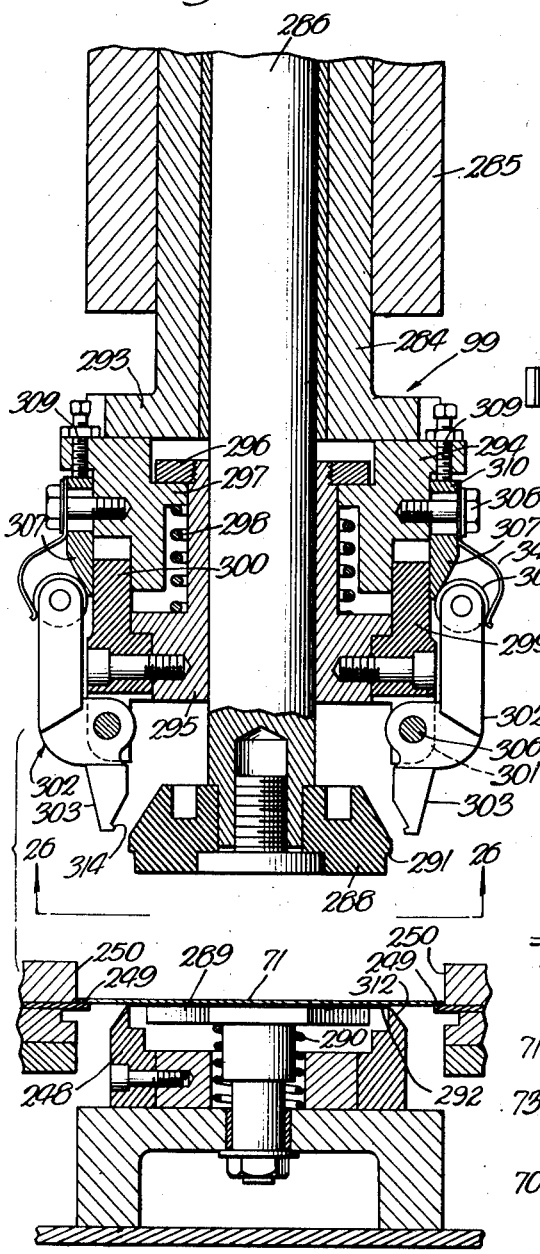
INVENTOR.
Frank D. Palmer
BY Soans, Pond + Anderson
ATTYS July 29, 1952      F. D. PALMER      2,604,826
APPARATUS FOR MAKING PACKAGES
Filed May 31, 1944      27 Sheets-Sheet 16
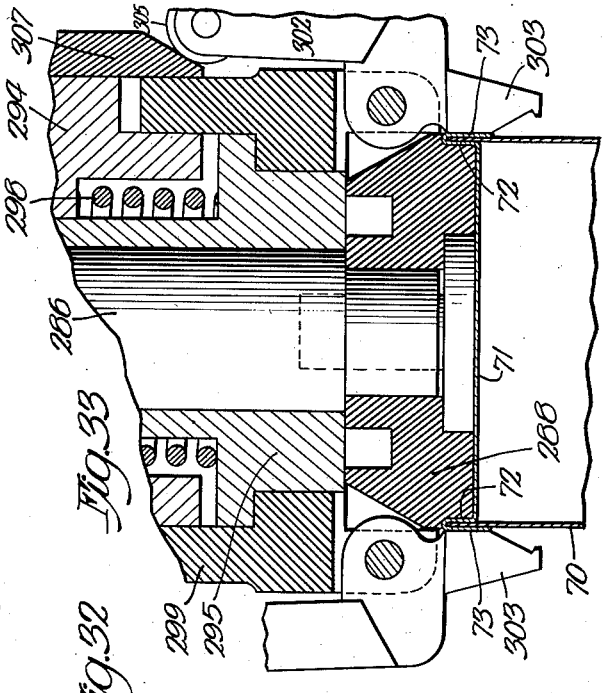
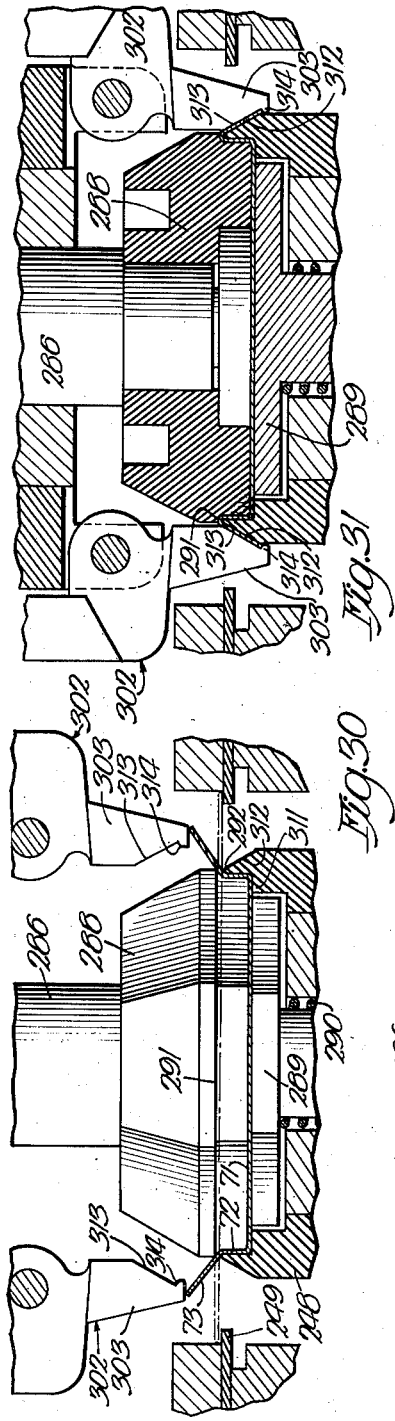
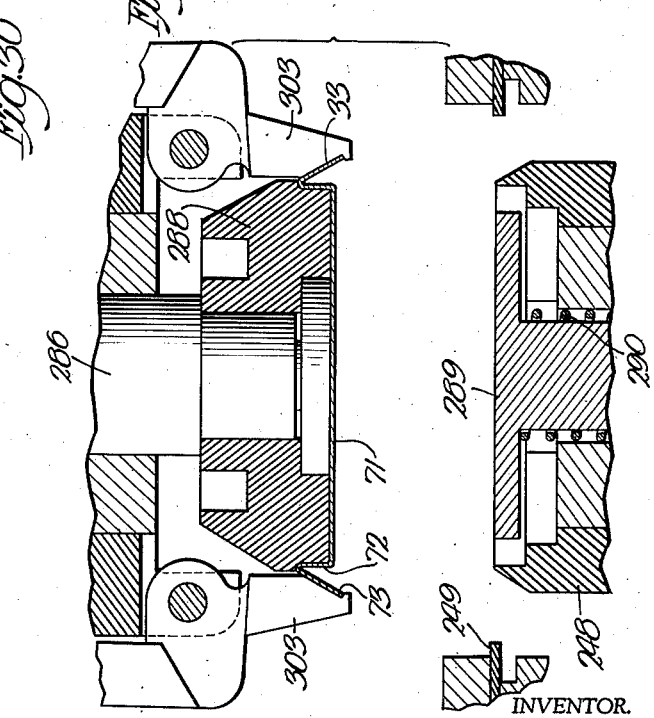
INVENTOR.
Frank D. Palmer
BY Soans, Pond & Anderson
ATTYS.

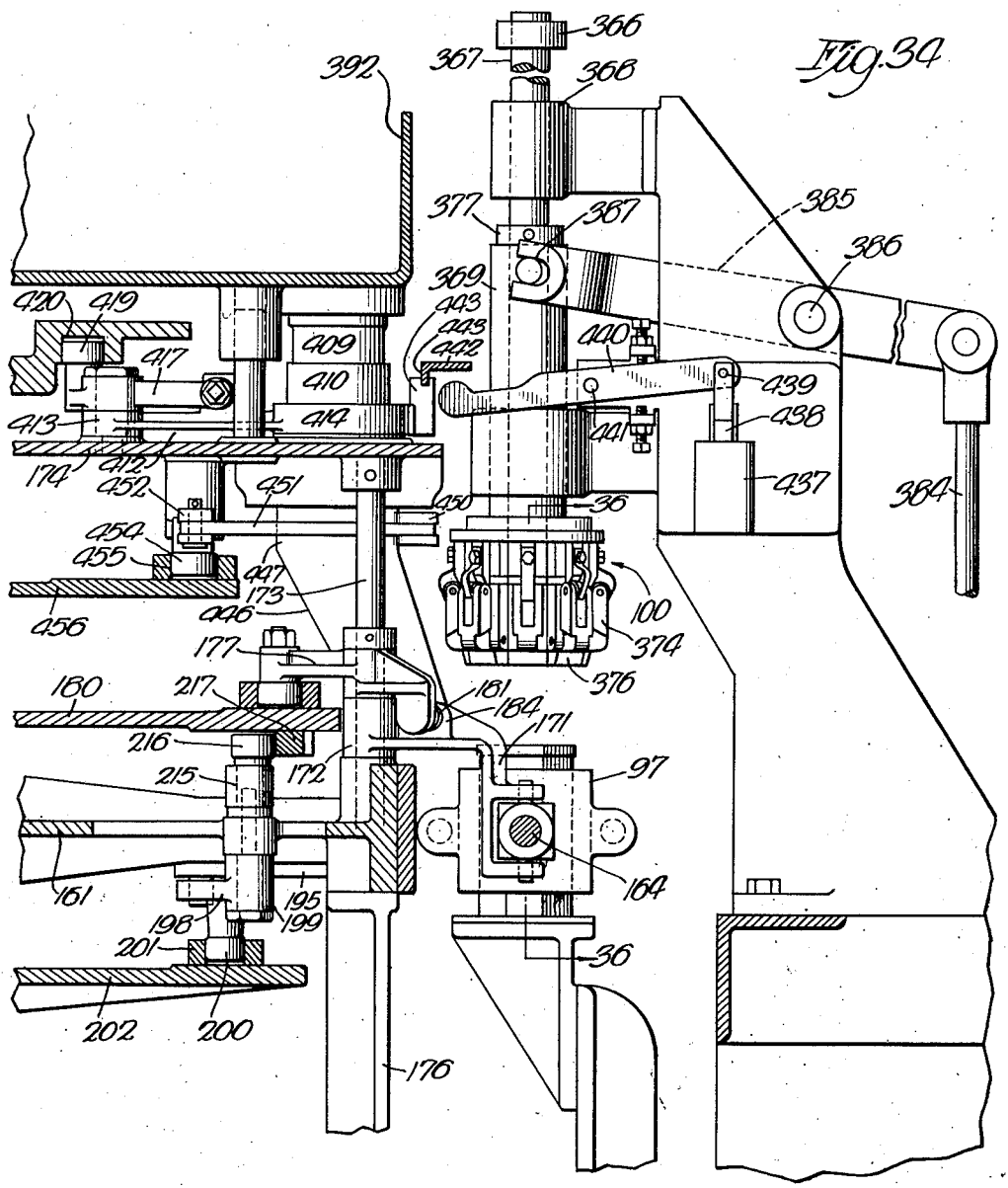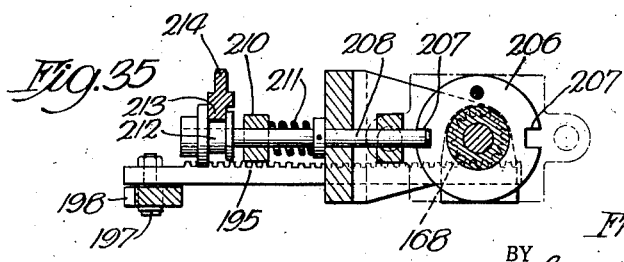

July 29, 1952  F. D. PALMER  2,604,826
APPARATUS FOR MAKING PACKAGES
Filed May 31, 1944   27 Sheets-Sheet 18

INVENTOR.
Frank D. Palmer
BY Soans, Pond & Anderson
ATTYS.

July 29, 1952  F. D. PALMER  2,604,826
APPARATUS FOR MAKING PACKAGES
Filed May 31, 1944  27 Sheets-Sheet 19

INVENTOR.
Frank D. Palmer
BY Evans, Foud & Anderson
ATTYS.

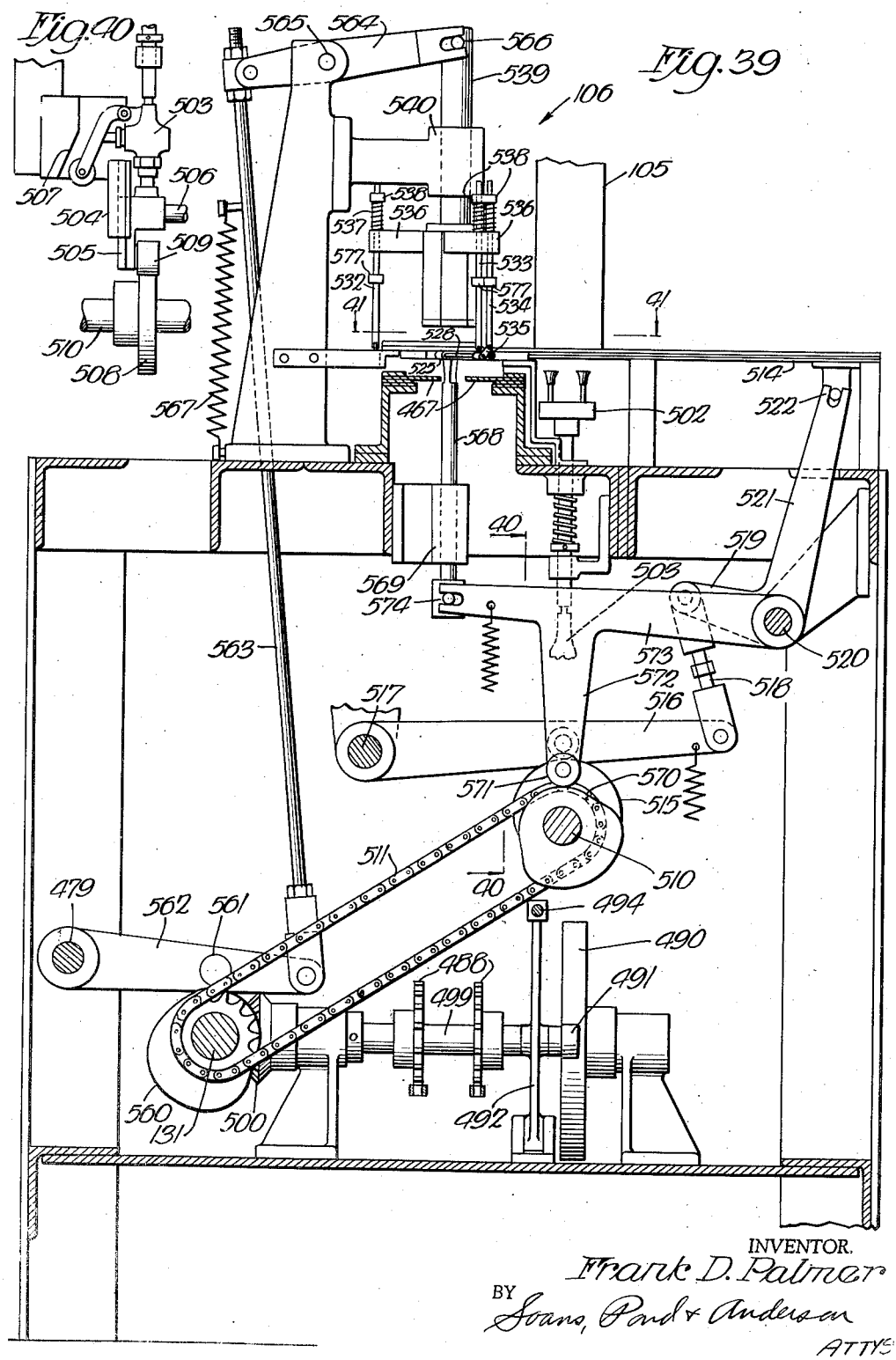

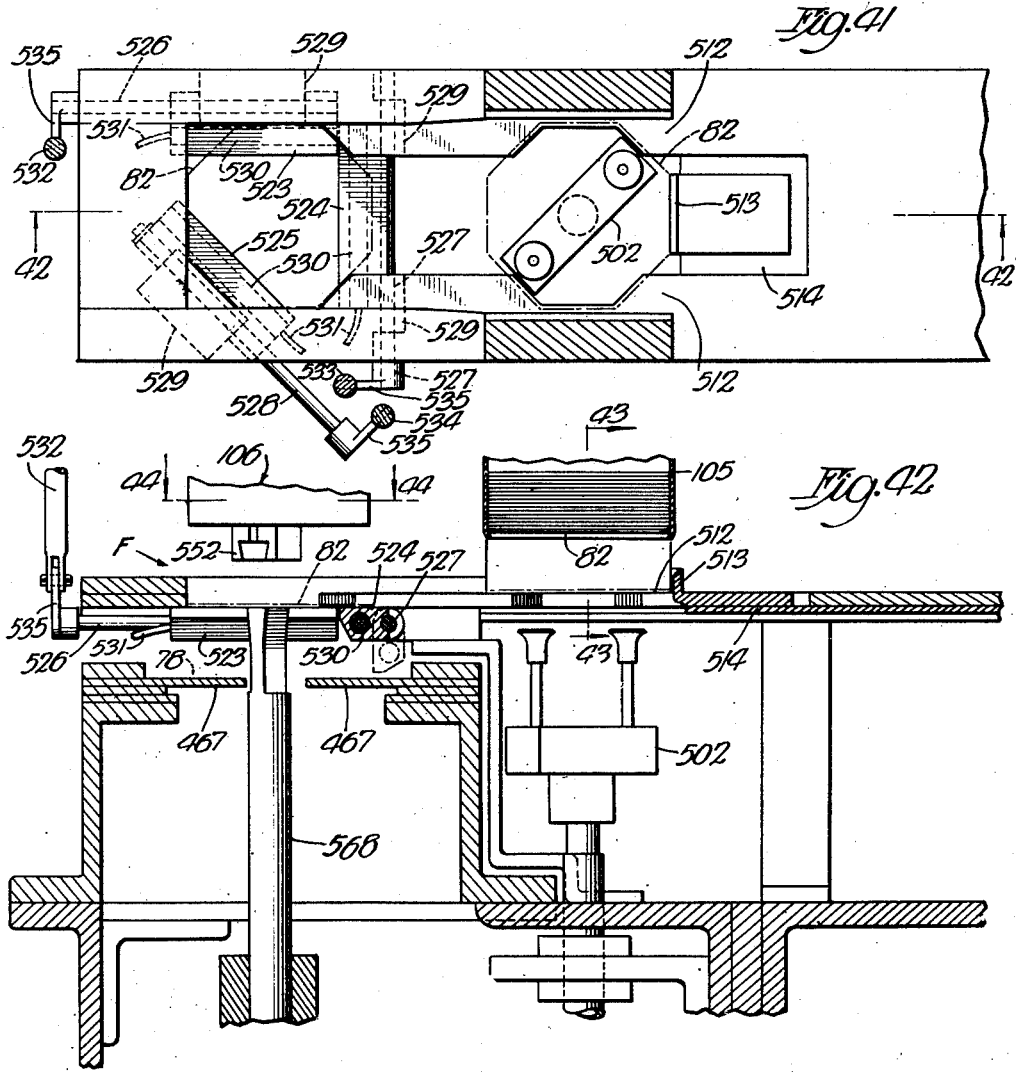
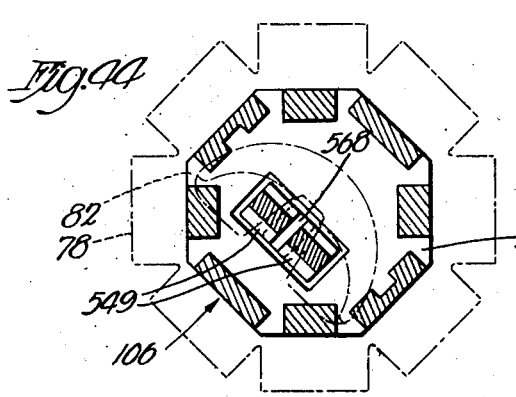
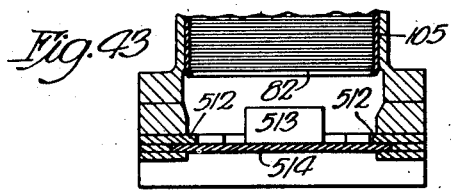

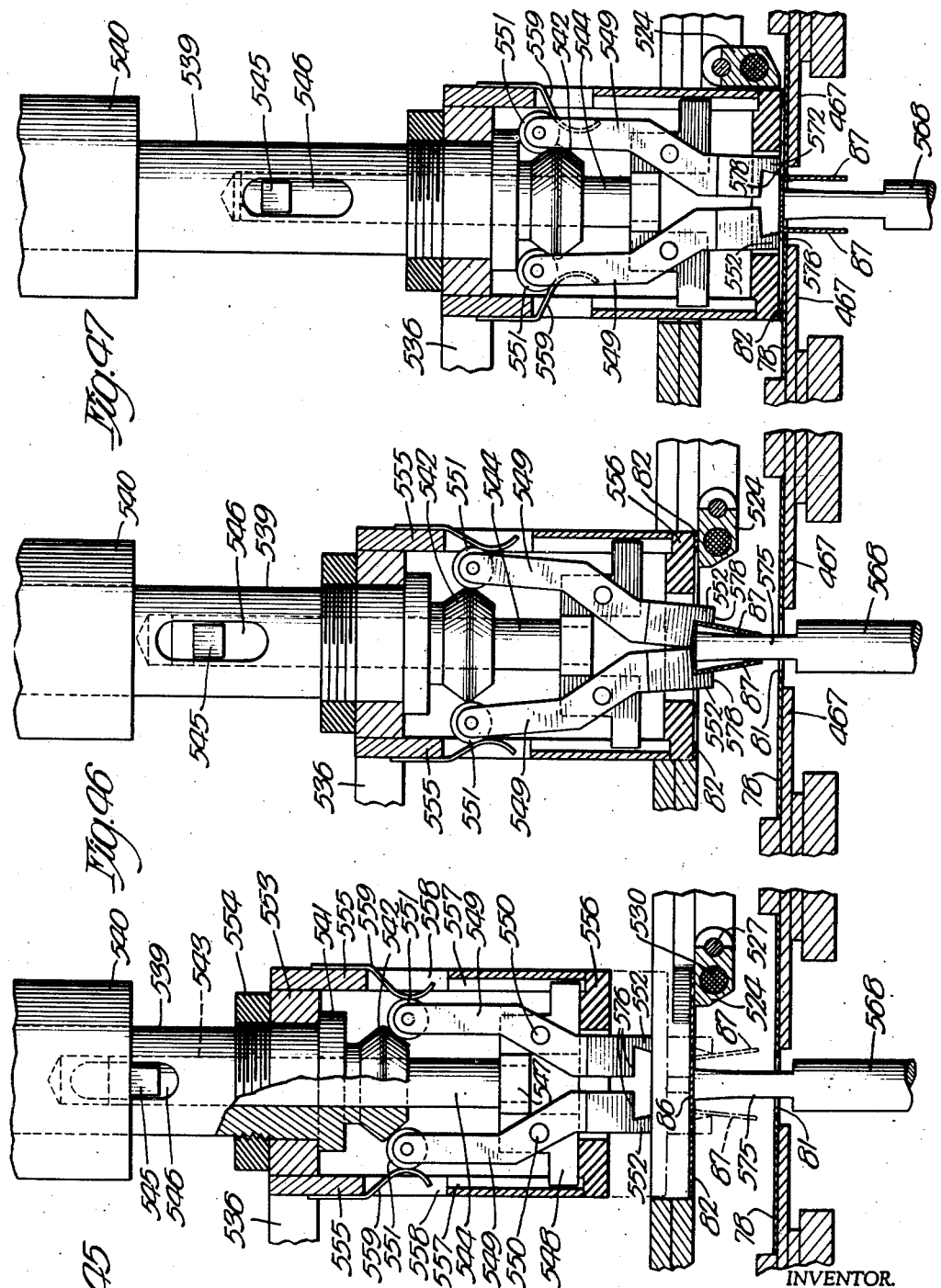

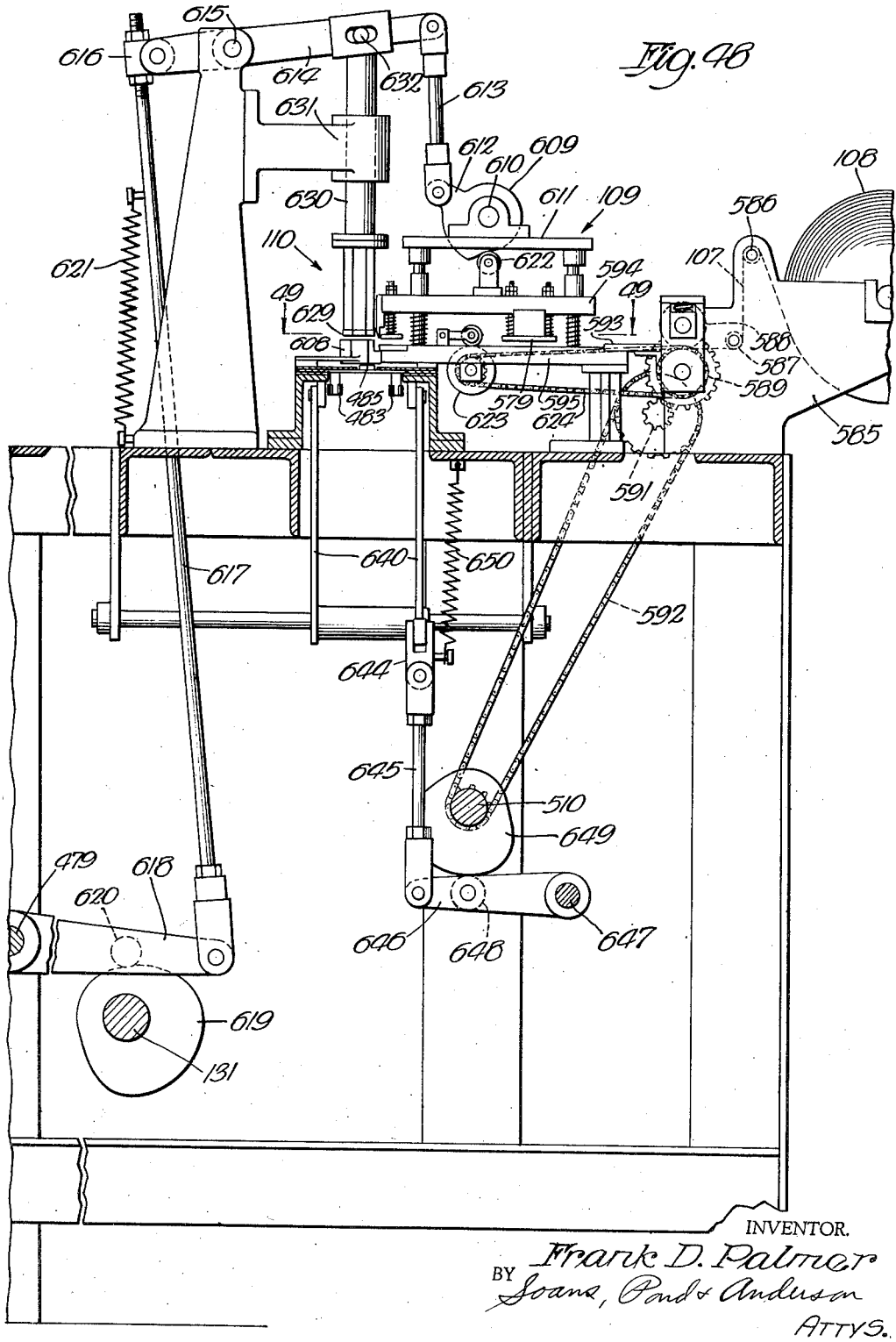

July 29, 1952 F. D. PALMER 2,604,826
APPARATUS FOR MAKING PACKAGES
Filed May 31, 1944 27 Sheets-Sheet 24
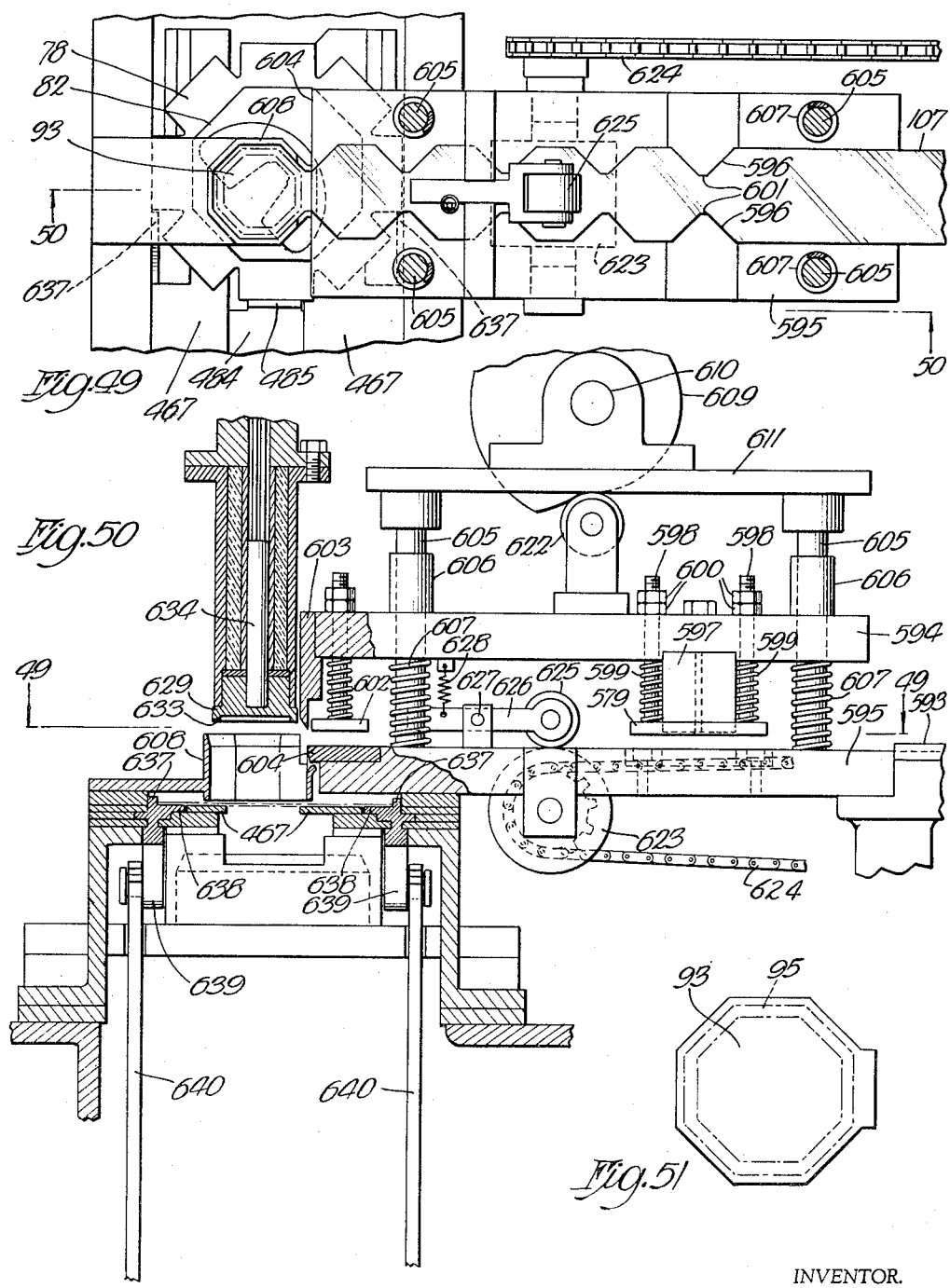
INVENTOR.
Frank D. Palmer
BY Soans, Pond & Anderson
ATTYS

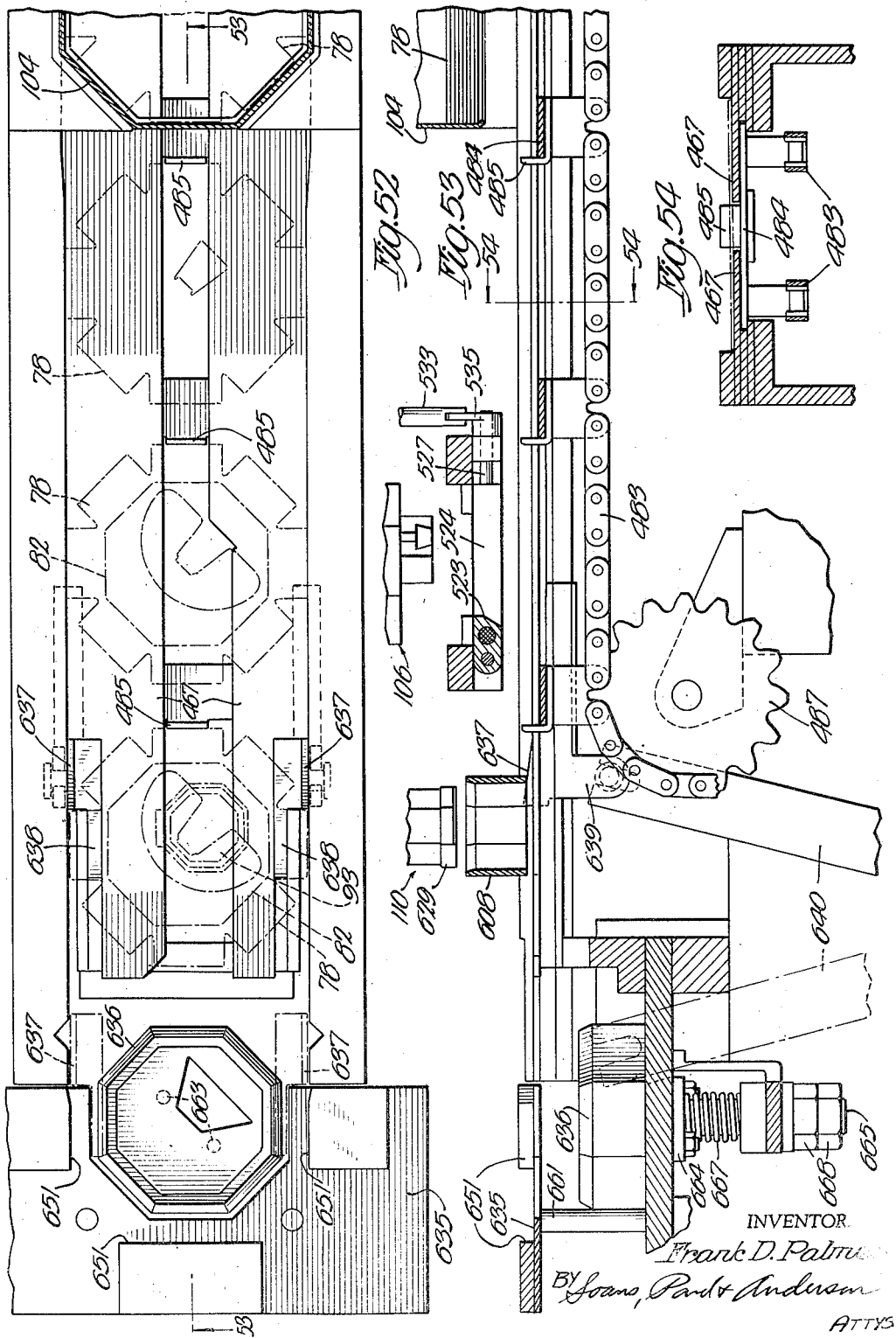

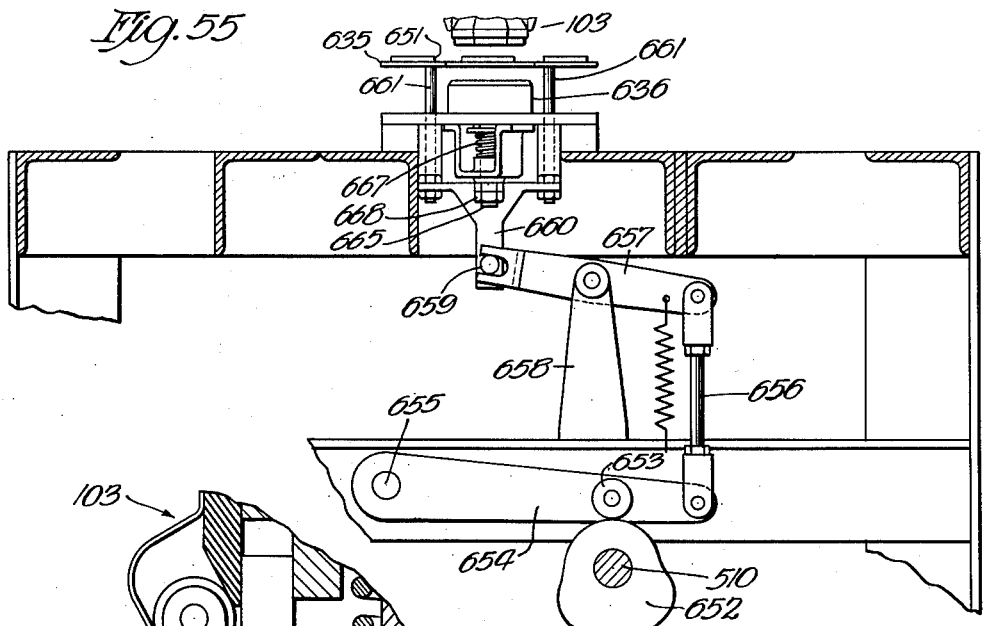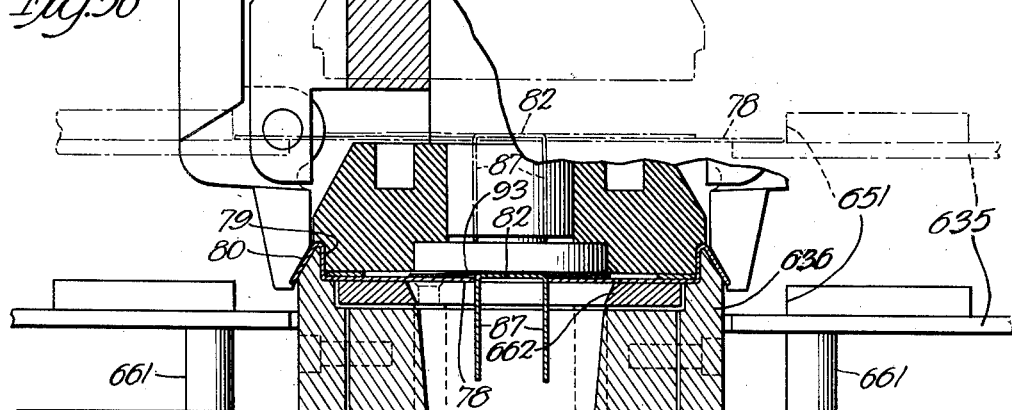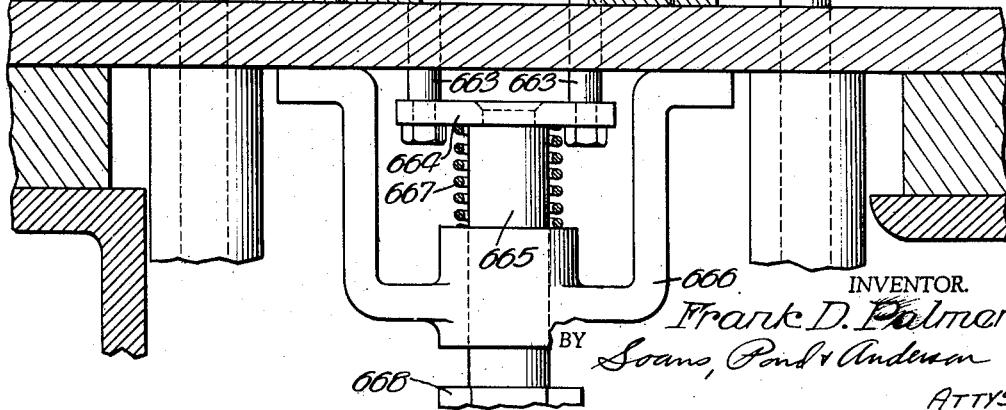

July 29, 1952
F. D. PALMER
2,604,826
APPARATUS FOR MAKING PACKAGES
Filed May 31, 1944
27 Sheets-Sheet 27
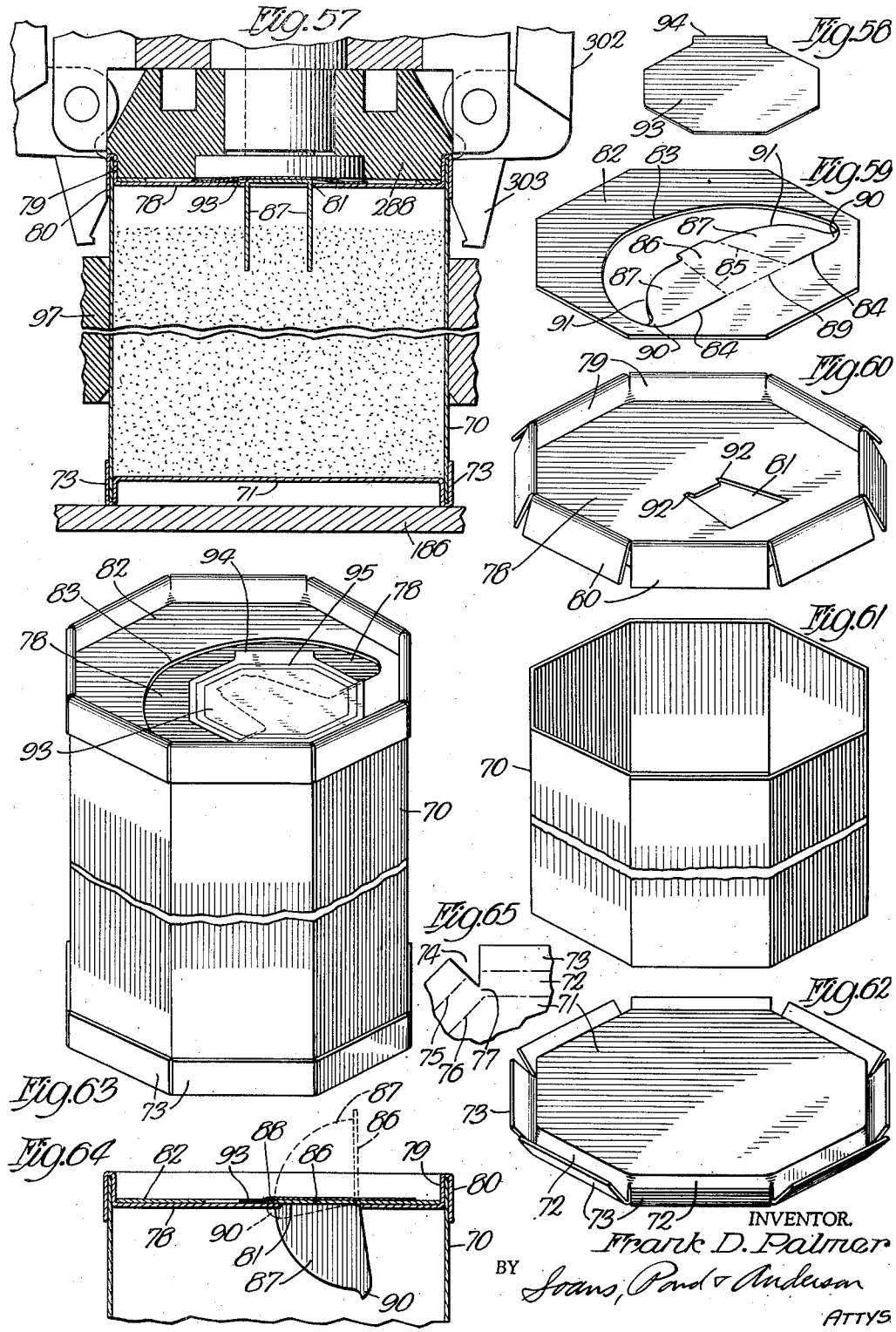
INVENTOR.
Frank D. Palmer
BY Soans, Pond & Anderson
ATTYS Patented July 29, 1952

2,604,826

UNITED STATES PATENT OFFICE 2,604,826

APPARATUS FOR MAKING PACKAGES

Frank D. Palmer, Chicago, Ill., assignor, by mesne assignments, to Package Machinery Company, East Longmeadow, Mass., a corporation of Massachusetts Application May 31, 1944, Serial No. 538,162

11 Claims. (Cl. 93—39.2)

This invention relates to an improvement in packages and method and apparatus for making the same. It has particular reference to a paper board container and automatic assembling, filling and closing of the same in a continuously operating manner.

The package herein contemplated is one which comprises a main tubular body part, a bottom closure and a top closure provided with a pouring spout arrangement which may be repeatedly opened and closed, the container being particularly adaptable to the packaging of such products as salt, sugar, spices and other materials which are capable of being discharged from the package by pouring through an opening. The package may be adapted to the packaging of other products and the provision of a pouring spout and of means for assembling the same is not an essential part of the invention but for the packaging of pourable products such as mentioned, a spout arrangement is desirable. Where the package includes a pouring spout structure such as referred to, such spout structure is preferably initially sealed closed.

The apparatus herein contemplated comprises mechanism for receiving a stack of pre-fabricated collapsed tubular container bodies, together with means for feeding such collapsed bodies one by one and opening or distending them. The apparatus also comprises mechanism for receiving a stack of partially pre-fabricated closure members for one end of the container and feeding such members one by one, forming them and applying and adhesively uniting them to one end of the container body. The apparatus further comprises mechanism for filling the container body after one end closure is applied thereto, and mechanism for assembling elements which form a spout containing end closure and for forming and applying such end closure and adhesively uniting it to the remaining open end of the filled container body.

The main objects of the invention are to provide a container and a method and apparatus for assembling, filling and closing the container in a continuously operating, automatic manner; to provide a container or package which is well adapted to the required automatic assembling, forming, filling and closing operations; to provide such a package with a dispensing spout arrangement which may be automatically assembled and initially sealed closed as a part of the operation of the carton forming, filling and closing apparatus; to provide apparatus of the character indicated which will be efficient and durable in operation and which will be of relatively compact form so as to require a minimum of floor area for the performance of all the operations indicated; to provide a method of package forming, filling and closing which facilitates the automatic production of the packages by relatively compact apparatus; and in general, it is the object of the invention to provide an improved package and apparatus of the character indicated.

Other objects and advantages of the invention will be understood by reference to the following specification and accompanying drawings (27 sheets) wherein there is disclosed a package and a method and apparatus for assembling, filling and closing the package according to a selected form of the invention.

In the drawings:

Figs. 3 and 4 are plan sections corresponding respectively to Figs. 1 and 2 but illustrating certain details of construction in a horizontal plane intermediate the top and bottom of the apparatus.

Fig. 5 is a section on the line 5—5 of Fig. 1;

Fig. 6 is a section on the line 6—6 of Figs. 1 and 2;

Fig. 7 is a section on the line 7—7 of Fig. 2;

Fig. 8 is a section on the line 8—8 of Fig. 4;

Fig. 9 is a section on the line 9—9 of Figs. 1 and 5;

Fig. 10 is a section on the line 10—10 of Figs. 1 and 3;

Fig. 11 is a section on the line 11—11 of Fig. 6;

Fig. 12 is a section on the line 12—12 of Fig. 11;

Fig. 13 is a section on the line 13—13 of Fig. 6;

Fig. 14 is a section on the line 14—14 of Fig. 1;

Fig. 15 is a perspective illustrating a container body such as herein contemplated;

Fig. 16 is a section on the line 16—16 of Fig. 1;

Figs. 17, 18, 19 and 20 are sections on the correspondingly numbered lines of Fig. 16;

Fig. 21 is a plan section on the line 21—21 of Fig. 5;

Fig. 22 is a section on the line 22—22 of Fig. 21;

Fig. 23 is a section on the line 23—23 of Fig. 1;

Fig. 24 is a plan view of the mechanism shown in Fig. 23;

Fig. 25 is a section on the line 25—25 of Figs. 5 and 21;

Fig. 26 is a bottom plan of the upper portion of the mechanism shown in Fig. 25 as indicated by the line 26—26 of Fig. 25;

Figs. 27 and 28 are perspectives illustrating certain details of mechanism;

Fig. 29 is a perspective of the bottom end of the container with the bottom member applied thereto, the container being shown in inverted position;

Figs. 30, 31, 32 and 33 are sections which correspond in part to Fig. 25 showing successive steps in the operation of forming and applying the bottom closure to the container body;

Fig. 34 is a section on the line 34—34 of Fig. 1;

Fig. 35 is a section on the line 35—35 of Fig. 13;

Figs. 38 and 39 are sections on the correspondingly numbered lines of Fig. 2;

Fig. 40 is a section on the line 40—40 of Fig. 39;

Fig. 41 is a plan section on the line 41—41 of Fig. 39;

Fig. 42 is a section on the line 42—42 of Fig. 41;

Figs. 43 and 44 are sections on the correspondingly numbered lines of Fig. 42;

Fig. 45 is a section on the line 45—45 of Fig. 7;

Figs. 46 and 47 are views similar to Fig. 45 but showing changed positions of the mechanism;

Fig. 48 is a section on the line 48—48 of Fig. 2;

Fig. 49 is a section on the line 49—49 of Fig. 48;

Fig. 50 is a section on the line 50—50 of Fig. 49;

Fig. 51 is a plan of a spout sealing member;

Fig. 52 is a plan section on the line 52—52 of Fig. 7;

Fig. 53 is a section on the line 53—53 of Fig. 52;

Fig. 54 is a section on the line 54—54 of Fig. 53;

Figure 1:
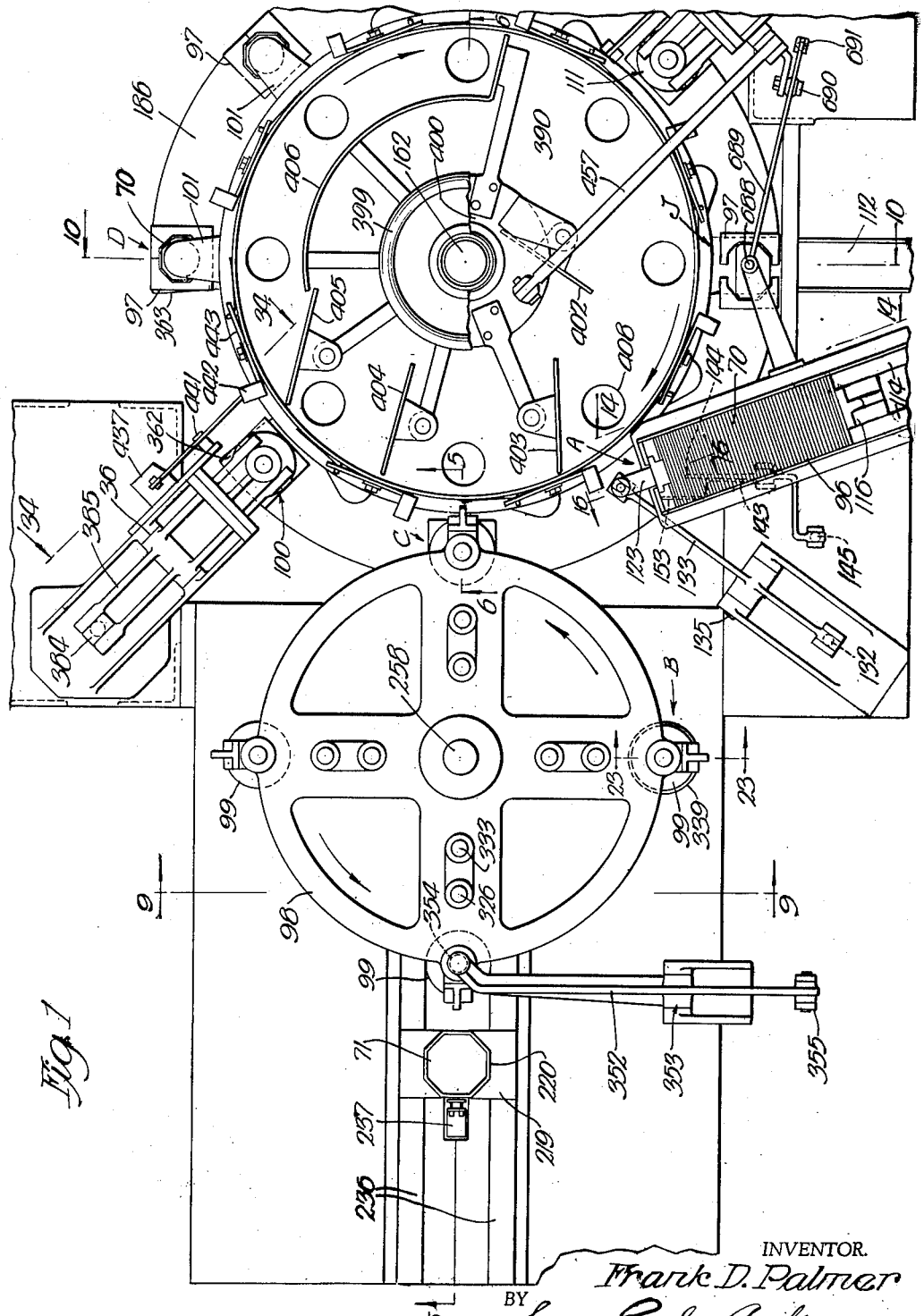
Figs. 1 and 2 are plan views of left and right-hand portions, respectively, of the improved apparatus, Fig. 2 being in effect a continuation of the right-hand end of Fig. 1.

Figs. 55, 56, and 57 are sections, respectively, on the correspondingly numbered lines of Fig. 7;

Figs. 58, 59, 60, 61 and 62 are perspectives, respectively, of the component parts of the improved container;

Fig. 63 is a perspective of the completed closed and filled container;

Fig. 64 is a cross-section through the spout structure in the upper end of the container; and Fig. 65 is a fragmentary plan of a detail of construction of the carton.

*The package*

The package herein contemplated is best illustrated in Figs. 58 to 64 inclusive, and in Fig. 15 of the drawings. It comprises a body made of a suitable weight of paper board, the body being designated in its entirety by the numeral 70. Said body 70 is formed from a substantially rectangular blank suitably scored transversely along lines so disposed as to facilitate folding of the blank to an octagonal tubular form as indicated in Figures 15 and 61. The opposite ends of the blank are preferably overlapped for a full width of one of the side walls of the body part as is clearly shown in Figure 61, suitable adhesive being employed for uniting the overlapping end portions.

The blank from which the body is formed may be of any suitable quality paper board and it is preferably provided on its inner or outer surfaces, or on both, with a moisture-proof finish or coating. The treatment for moisture-proofing may be varied considerably and any effective form of treatment may be employed.

The bottom end of the tubular container body 70 is closed by a bottom end closure 71 which, as best shown in Figure 62, embodies downwardly bent peripheral flange portions 72 and upwardly rebent flanges 73, said flanges 72 and 73 being arranged in pairs, respectively corresponding with a side of the tubular body and adapted to receive and embrace the lower marginal portion of such side. As indicated in Figure 62, the end closure 71 is of octagonal shape corresponding to the distended shape of the body 70, and it will be understood that said bottom member fits snugly within the container body except that its flanges 73 extend upwardly on the outside of the lower marginal portions of the body walls.

The flanges 72 and 73 have their end portions separated from each other by V-shaped notches such as indicated at 74, the sides of which notches completely traverse the ends of the flange portions 73 but only partially traverse the ends of the flange portions 72. Said flange portions are foldable relative to each other and relative to the main bottom area 71 along suitable fold lines indicated at 75 and 76, and it will be observed that the apex of the notch 74 does not reach the fold lines 76, which define the periphery of the main bottom member 71. When the flanges 72 and 73 are folded to the position illustrated (see Figure 57) to embrace the lower marginal portion of the container body, there is in effect a forming or drawing operation on the bottom blank whereby there is preserved an unbroken connection between the adjacent ends of the flanges 72, such unbroken connection being the bond remaining as indicated at 77 between said flanges above the notch 74.

Because of the resulting continuity of wall structure, the carton body is substantially free from leaks which might otherwise occur at the corners of the carton.

The bottom member 71 and its flanges 72 and 73 are preferably coated on the inside surface thereof with a suitable thermo-plastic adhesive material, so that upon the application of suitable pressure, either with or without the application of heat, the flanges 72 and 73 will become adhesively bonded to the embraced lower marginal portions of the container body walls. The adhesive, while serving the purpose of bonding the bottom member to the body, serves also to fill and seal any opening which might possibly occur between a flange 72 and the adjacent side wall of the carton, thereby insuring a leak-proof bottom structure.

Adhesive material other than thermo-plastic material may be employed but very satisfactory results have been achieved with thermo-plastic adhesive material, wherefore such material is preferred. One form of suitable thermo-plastic adhesive is a rubber-wax composition, several of which are commercially available.

The top of the container is similar to the bottom in its construction and manner of application but it is equipped with a spout structure which may be repeatedly opened and closed to facilitate dispensing of whatever content may be packaged in the container.

As shown in Figures 60 and 64, the top member 78 is equipped with laterally upwardly extending peripheral flanges 79 and rebent downwardly extending flanges 80 which are adapted to embrace the upper marginal portions of the container body walls, the top member being preferably adhesively secured to the body member substantially in the same manner as explained in reference to attachment of the bottom member to the container body. The top member 78 is provided with an opening 81 for permitting dispensing of the packaged material and a spout structure is associated with said opening.

The spout structure is formed in an end member 82 which is of octagonal shape to correspond with the cross-sectional shape of the tubular body and of the area of the end member 78, the member 82 being of such size as to fit snugly within the upwardly extending flanges 79 thereof substantially as illustrated in Figure 64. The member 82 is cut out as indicated at 83, and provided with slits 84 and fold lines 85, so as to form integrally with the member 82 a spout structure comprising a bottom wall 86 and side walls 87. In assembling the spout structure with the end closure 78, the spout side walls 87 are first folded downwardly relative to the spout bottom 86 so that the said side 87 may be passed through the opening 81 in the end closure 78 and the member 82 seated on the end closure 78 as illustrated in Figure 64.

The spout bottom 86 is so shaped that its side edges identified by the fold lines 86 substantially register with the side walls of the dispensing opening 81 and said spout bottom is preferably slightly longer than said dispensing opening, so that its free end or lip extends into overlapping relation to a portion of the end closure 78 as indicated at 88 (Figure 64). The overlapping lip portion 88 serves to prevent the spout bottom from being bent through the dispensing opening 81 to the inside of the container from where it would be difficult if not impossible to withdraw it.

The spout bottom 86 is foldable along a fold line 89 relative to the main body of the member 82 so that said spout may be withdrawn from the container to the dispensing position illustrated in dotted lines in Figure 64. For limiting such opening movement of the spout structure, the side walls 87 thereof are provided with end extensions 90 which are adapted to engage the inside of the end closure 78 when the desired limit of spout opening movement is reached. For preventing collapsing of the spout sides 87 toward each other, their outer or free edges 91 may be of arcuate form and the top member 78 may be provided with shallow notches 92 for receiving marginal portions of said arcuate edges.

When the container is filled and ready for warehousing or shipment to dealers or others, it is desirable that the spout structure be sealed closed so as to prevent unauthorized or accidental opening and spilling of the package content. For sealing the spout structure, a sealing member 93 is employed, such sealing member being preferably in the form of a thin, flexible paper or other sheet material and it is adhesively secured to portions of the top member 78 and the spout member 82, which surround the spout proper.

As indicated in Figure 67, the sealing member 93 engages and is adhesively secured to the surface of the member 82 just below the hinge connection 89 between the spout bottom and the member 82, and within the area of the opening 83 it is adhesively secured to the top surface of the end member 78. The member 93 may be secured by means of any desirable adhesive but here again it is preferred that a thermo-plastic adhesive material be employed, the same being activated by the application of pressure or heat or both.

The sealing member 93 may be of any convenient shape but as illustrated in Figure 58, it is preferably of octagonal shape in keeping with the cross-sectional shape of the container and it is provided with a lip extension 94 which remains free of attachment to the underlying member 78 to thereby facilitate gripping and tearing of the sealing member from the top end of the container. The member 82 is also preferably adhesively secured by thermo-plastic or other adhesive material to the member 78, so that the spout structure will not be removed from the container incident to removal of the seal 93.

The adhesive connection between the seal 93 and the underlying parts is preferably confined to a relatively narrow band as indicated at 95, whereas the member 82 is adhesively secured to the underlying member 78 over substantially the entire area of the member 82 which contacts the upper face of said member 78. Hence the member 82 is more firmly secured to the member 78 than is the sealing member 93 to its underlying parts. Hence removal of the sealing member may easily be effected without danger of incidentally removing the spout containing member 82.

*The method and apparatus in general*

The apparatus for assembling and filling the described carton includes mechanism: for feeding collapsed carton bodies one by one from a stack thereof; for opening or distending the bodies to their normal container condition; for feeding flat, unformed bottom closure blanks one by one from a stack thereof and forming and applying such bottom closure members, the bottom member being applied to the then upper end of the carton body; for inverting the carton body and thereafter delivering thereto a measured quantity of material to be packaged in the carton; for feeding one by one blank cover members 78 and 82 in flat condition and assembling the same in cooperative relation: for forming and applying the top sealing member 93 to the previously assembled top closure members; for forming the top closure member and application of the same to the open end of the container body; and mechanism for discharging the filled and closed container to a receiving conveyor or the like.

As shown in Figure 1, a stack 96 of carton bodies 70 is disposed at one side of the machine and arranged to deliver such bodies in open condition successively to gripping heads 97 which are carried by a rotating structure, the same being arranged to rotate in a clockwise direction as viewed in Figure 1. The heads 97 are moved intermittently and they carry each carton body into the zone of operation of a bottom closure forming and applying apparatus indicated generally at 98, such mechanism comprising a rotary turret-like mechanism which in this instance is equipped with four end closure forming and conveying units or heads 99.

The rotary end closure forming structure rotates in a counter-clockwise direction as viewed in Figure 1 and it is rotated intermittently and arranged to come to rest with its heads 99 successively in vertical alignment with one of the carton body heads 97 when the latter is at rest. The end forming heads 99 include mechanism for applying pressure to effect the adhesive attachment of the bottom member flanges 72 and 74 to the embraced marginal portion of the container body. A second pressure applying device is provided as indicated at 100, the same being arranged to act on the then closed end of the container in its first position of rest after the end closure is applied.

The container with one end effectively closed is next rotated so as to invert it to locate its closed end at the bottom of the container and its open end on top, whereupon a filling spout 101 is brought into operative relation to the container, there being such a spout associated with each of the container gripping heads 97.

A measured quantity of material is then delivered to the container through the spout 101 and thereafter the filled but open container is brought into operative alignment with mechanism for applying the top closure. The top closure applying mechanism is indicated generally at 102 (Figure 2) and is quite similar in its construction and operation to the bottom closure applying mechanism 98. The top closure applying mechanism includes a rotary structure having, in this instance, four heads 103 which are successively brought into vertical alignment with the container bodies carried by the grippers 97. The rotary top closure applying structure is rotated counter-clockwise as viewed in Figure 2.

The top closure structure is automatically assembled by the mechanism, form main closure blanks 78 which are fed one by one from a stack 104 thereof. The spout containing members 82 are fed one by one from a stack 105 thereof, the same being fed into overlying relation to the main closure member 78 and assembled and adhesively united to the main member 78 by mechanism indicated in its entirety at 106. The sealing members 93 are formed automatically from a strip of suitable paper or other material indicated at 107, the same being drawn from a supply roll 108 thereof and fed step by step through mechanism indicated in its entirety at 109 which cuts out the said sealing members.

Figure 2:
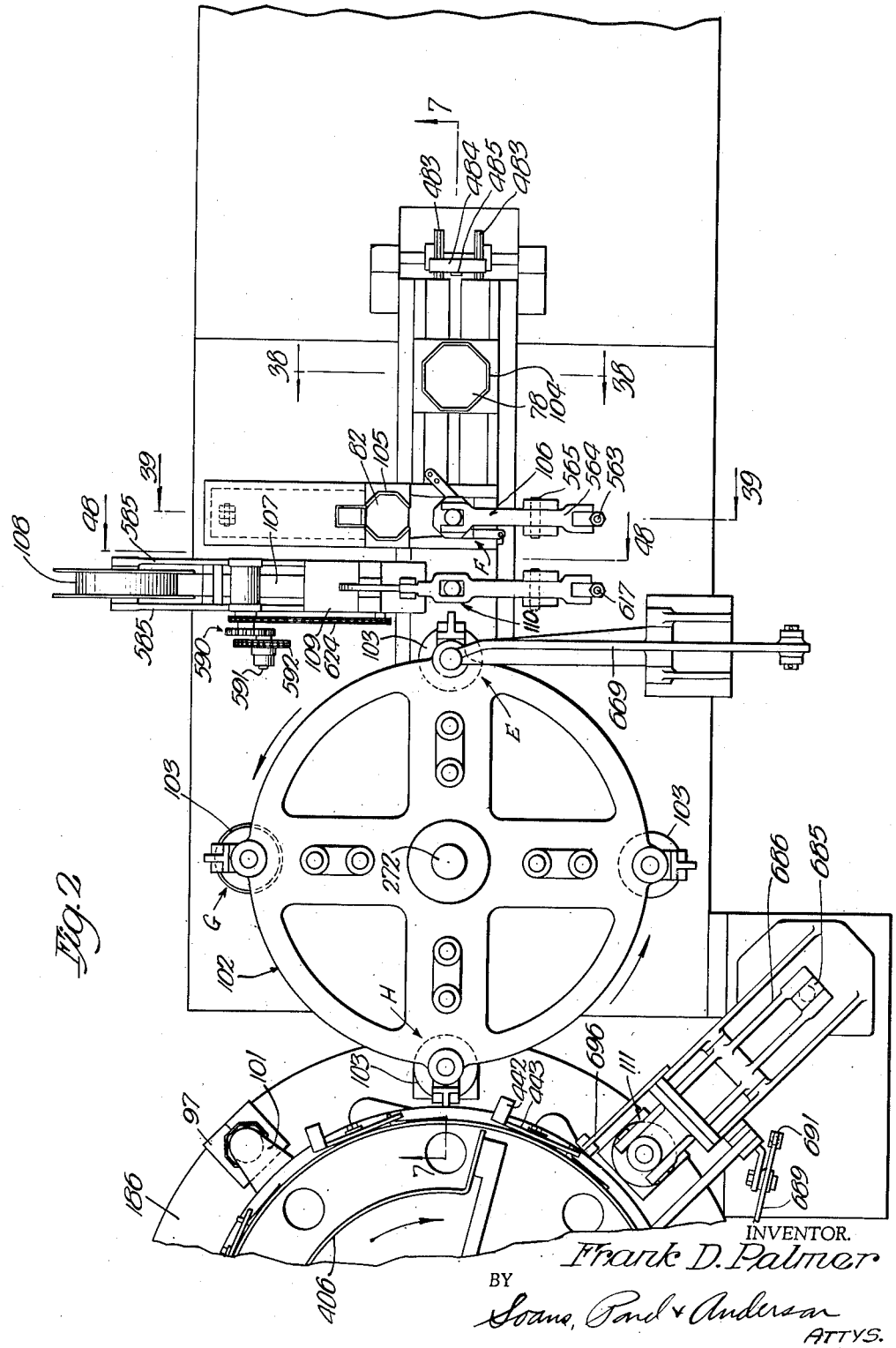

Such sealing members are automatically disposed in operative relation on the assembled main members 78 and spout members 82 and adhesively secured thereto, the securing mechanism including a pressure applying device indicated generally at 110. As best seen in Figure 2, the member 78 is fed edgewise in a straight line and successively receives thereon a spout member 82 and a sealing member 93, and its next step of movement brings it into the zone of operation of one of the heads 103 of the rotating structure 102. The latter serves to form the flanges 79 and 80 on the main member 78, then carry such formed member into vertical alignment with one of the filled containers carried by a head 97 and to apply the end closure to the open end of the container. The heads 103 include means for applying pressure to effect adhesive attachment of the top end closures 78 to the upper marginal portion of the container body.

A second pressure applying device is provided and includes mechanism indicated generally at 111 which is similar to the mechanism indicated at 100 (Figure 1), the second pressure applying mechanism 111 (Figure 2) serving to insure the effective adhesive attachment of the cover to the container body. The container being then filled and closed at both ends is then discharged by opening of the gripping head 97 permitting the container to drop by gravity to a receiving member which in this instance comprises a conveyor 112 which serves to carry the completed package to other mechanism or to packaging mechanism or receiving tables, or the like, as may be preferred.

*The carton body feeding and opening mechanism*

The carton body feeding and opening mechanism is best shown in Figures 1 and 14 to 20, inclusive. It includes a suitably formed, inclined tray or chute 113 into which the container bodies 70 are stacked on edge, the open ends thereof being at the top and bottom as illustrated in Figure 15. The container bodies are supported by means of spaced bottom members or ledges 114 and the leading or front end of the downwardly inclined stack abuts vertically disposed stop members 115.

To insure advancement of the stack of containers 70, there is provided a follower block 116, the same being suitably slidably mounted in the tray 113. In addition to its normal tendency to gravitate toward the front end of the tray, it is urged to move in that direction by a weight 117 which is connected by means of a flexible connection 118 to the follower, said connecting member 118 being guided around pulleys 119, 120 and 121, which are suitably journalled in various brackets or frame parts of the structure as clearly illustrated.

The container body 70 at the front end of the stack thereof is fed downwardly from the stack by a vertically reciprocating feed member 122, the same being carried by a head 123 which is vertically slidably mounted between the stop members 115.

Reciprocating motion is imparted to the head 123 and its feed plate 122 by means of a cam 124 (see Figures 3 and 14) which operates against a roller 125 carried by an arm 126 which is suitably pivoted at one end as shown at 127 to bearings carried by the machine frame structure. The cam 124 is carried by a shaft 128 which is continuously rotated through the agency of gears 129 and 130 which connect the shaft 128 with the main drive shaft 131 of the machine.

Rocking movement of the arm 125 produced by the cam 124 is transmitted to the member 123 through a connecting rod or link 132, a lever 133 and a link 134. The lever 133 is pivoted intermediate its ends as indicated at 135 on a suitable bracket or frame part so that upward movement of the rod 132 which is a positive upward movement is changed to positive downward movement of the carton body feeding head 123. A suitably applied spring (not shown) may be provided for causing the cam following roller 125 to maintain operative contact with the cam 124 and to thereby effect the return or upward movement of the feeding head 123.

It will be apparent that when the head 123 is in its uppermost position, the feed plate 122 overlies the upper edge of the foremost container body. Upon downward movement of the head 123 the said foremost container body is pushed downwardly into a tubular carton body opening member 137. When the member 123 is in its lowermost position the then foremost container body 70 in the magazine or tray 113 rests against the face of the feed plate 122. The said face of the feed plate 122 is smooth and polished to such an extent that there is no substantial frictional gripping action between it and the contacting face of the carton body, so that upward movement of the feed plate occurs without any material tendency to drag the contacting carton body upwardly. However, if desired, any suitable stop arrangement may be provided at the top of the magazine and adjacent the feed plate 122 to positively prevent upward movement of the foremost container body incident to the upward or return movement of the feed plate 122.

The carton opening or distending tube 137 (see Figures 16 to 20, inclusive) is secured at its upper end to a suitable plate member 138 which is in turn carried by the frame structure of the apparatus. Said plate 138 is provided with an opening 139 through which the carton bodies 70 are fed into the tube 137, the upper end of which is of generally flattened, elliptical form as best shown in Figure 18. The forming tube 137 is gradually changed in shape from flattened elliptical form at its upper end to substantially true octagonal form at its lower or delivery end, as shown in Figure 20. The arrangement is such that the tube forces the container body to adjust itself from flattened or collapsed condition to its normal distended position. At the receiving end of the tube it is of sufficient major transverse dimension to receive the entire width of the collapsed carton body but said width is gradually diminished toward the delivery end of the tube as indicated by the series of Figures 18, 19 and 20. Pressure is thereby applied to the opposite folded edges 140 of the collapsed container bodies to cause them to open up to their normal distended condition.

It may be observed that the pressure applied to the edges of the collapsed container bodies is augmented by the normal tendency of the container bodies to spread or open along the folds 140.

In the upper end portion of the forming tube 137 there are provided filler members 141 which reduce the minor transverse dimension of the interior of the tube to cause the effective interior of the tube to more nearly conform to the transverse dimensions of the container body in its initial opening. Said filler member may be soldered or otherwise secured in place. It has been found practical to effect the complete distension of the container body during the movement of the body through a tube of about three times the length of the container body. The tubes within the container body are advanced incident to the movement imparted to the following container bodies and it will be understood by reference to Figure 16 that the container body within the upper end portion of the forming tube is advanced in the tube incident to the feeding of the next container body by the feeding plate 122 into the forming tube.

Adequate interengagement of adjacent ends of the container bodies to effect such feeding of one container body by a following container body is insured by reason of the fact that within the forming tube 137 the most advanced container body is opened to a greater extent than the following container body, so that each following container body has a major transverse dimension in excess of the corresponding dimension of the immediately preceding container body. Hence opposite side portions adjacent the folds 140 of the leading end of a following container body will extend across the adjacent portion of the rear end of a preceding container body. To insure adequate interengagement between the container body being fed from the magazine 113 into the tube and the next preceding container body, the opening 139 in the plate 138 is made of such dimensions that the trailing end of the container then in the forming tube 137 will be held in substantially closed condition and in alignment with the adjacent end of the overlying container body.

The container bodies are fed step by step a distance equal to the length of the container bodies and the length of the forming tube 137 is such that the container body in the delivery end portion of the tube will come to rest with an end portion projecting below the delivery end of the forming tube substantially as indicated at 142 (Figures 16 and 17). The container body ejected from the forming tube is delivered into one of the gripping heads 97 which is then aligned with the forming tube. It will of course be apparent that the travel imparted to each container body by the described feeding means will cause the ejected carton body (indicated at 70a in Figure 16) to come to rest with its upper end portion in contact with the then lower end portion of the upper container body.

In the present mechanism, it is preferred that the container body 70a should be moved downwardly an added distance so as to separate the container bodies and in order to center the ejected container body in the gripping member 97, so as to cause substantially equal end portions of the container body to project above and below the gripping head 97.

For imparting the indicated desired additional movement to the container body 70a, there is provided a lever 143 (see Figures 1, 14 and 16) pivoted intermediate its ends on a suitable bracket or frame part and provided at one end with a finger 144, the end of which is adapted to abut a wall of the projecting portion of the lowermost container body in the forming tube 137. The opposite end of the lever 143 is connected by a rod 145 to one end of a lever 146, the other end of which is suitably pivoted to a frame or bracket member as clearly shown in Figure 14.

Intermediate its ends the lever 146 is provided with a roller 147 which engages the periphery of a cam disc 148 carried by a rotatably driven shaft 149. A suitable spring 150 serves to urge the cam following roller 147 into constant engagement with the cam 148, so that the cam is operative to effect upward movement of the lever 146 and connecting rod 145 and the spring downward movement.

When the lever 143 is rocked in a clockwise direction as seen in Figures 14 and 16, the end of its finger 144 presses against the said projecting container wall portion and deflects it inwardly incident to the arcuate travel of the said finger end. Hence the underlying edge portion 151 of the finger ends will engage the upper end of the underlying wall portion of the container 70a. Continued downward movement of the finger 144 will thus effect the desired added downward movement of the container 70a.

The finger 144 may be and preferably is of such length that when the lower portion of a container emerges from the forming tube 137, a wall portion thereof will be immediately engaged and fixed inwardly, thereby applying a desirable amount of frictional pressure on the container which serves to effectively hold the lowermost container in the forming tube until it is positively fed forwardly in the manner already explained. Hence it will be understood that even though the end of the finger continues its arcuate movement to such an extent that the end of the finger begins to move outwardly, it will nevertheless remain in operative engagement with the upper end of the container body 70a, so as to be capable of advancing the container to the extent indicated. Extension guides such as indicated at 152 may be provided on the bottom of the forming tube if desired.

The lever 143 may also be provided with a supplementary finger 153, which, as clearly shown in Figure 20, is adapted to engage another projecting side portion of a container body. The supplementary finger 153 is preferably so arranged that it will cause sufficient inward deflection of the engaged portion of the container body to permit the lower edge 154 of said finger to engage the upper end of the container body 70a for effecting further movement thereof upon rocking of the lever 143. The finger 153 constitutes, in effect, a safety feed member to insure the desired added movement of the container body 70a even though the finger 144 should accidentally fail to perform its function.

*The container carrying and inverting means*

As already indicated, the contained bodies are delivered to the gripper heads 97 by which they are carried in a circular path of travel and which heads are rotated so as to invert the container bodies after an end closure is applied thereto.

The gripper heads 97 each comprise a pair of blocks 155 and 156 (see Figures 6 and 13) which are so formed as to provide in each block a recess corresponding to one-half of the cross-sectional shape of the container body. The blocks 155 and 156 are slidably connected to each other so that they may be moved from open position for receiving a container body to closed position wherein they grip a container between them. For this purpose the block 156 is provided at its opposite ends with stub shafts 157 and the block 155 with bearing members 158, which slidably fit on the shafts 157.

Figure 37:
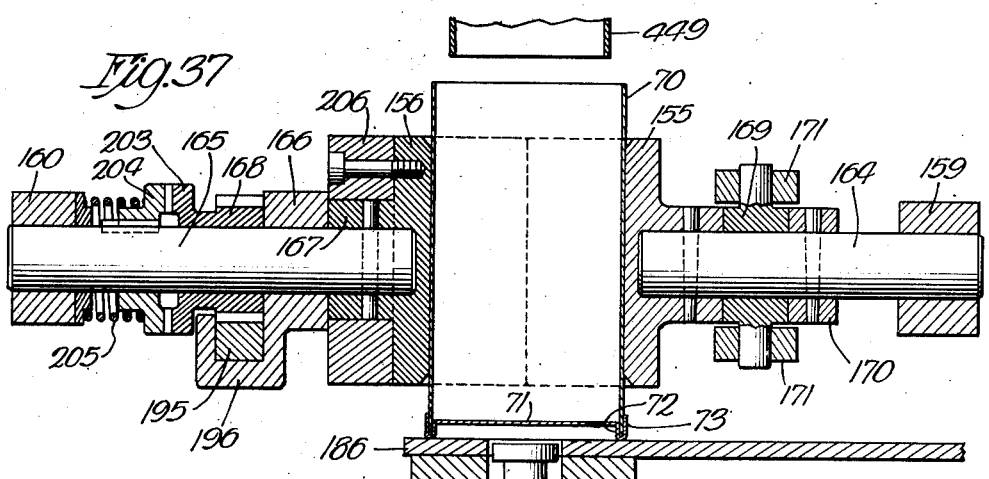
Fig. 37 is a section on the line 37—37 of Fig. 13.

The gripping heads 97 are carried by pairs of bracket arms 159 and 160 which project from a spider structure 161 constituting a part of a turret which is rotatably mounted on a central stationary post 162. Said post 162 is supported in a vertical position by means of suitable frame structure comprising parts indicated at 163 in Figure 6. The blocks 155 and 156 are provided with shafts 164 and 165, respectively, which are rigidly connected to the respective blocks by tapered pin connections as best shown in Figure 37 or in any other suitable manner. The shafts 164 and 165 are journalled in the supporting bracket parts 160, so that the gripping head structure in its entirety may be rotated about the axis of the shafts 164 and 165.

The gripper block 156 is additionally supported by a bracket arm 166 which is integrally connected to the bracket arm 160 and said gripper block 156 is normally held against lateral movement in the direction of its shaft 165. The bracket arm 166 is engaged by a hub-like portion 167 of said gripper block 156 so as to prevent movement of the gripper block in an outward direction. Inward movement of the gripper block 156 is also normally prevented by engagement of one face of a pinion gear 168 with said bracket arm 166, the pinion gear being secured to the shaft 165 by taper pin or other suitable means which will prevent movement of the gear 168 relative to the shaft 165.

The gripper block 155 is laterally movable toward and from the gripper block 156, such movement being permitted incident to the axial slidability of its shaft 164 in the supporting bracket arm 159. For effecting such lateral movement of the gripper block 155, there is provided a collar 169 which is rotatable on the shaft 164 between a hub-like portion of the gripper block 155 and a collar 170 which is rigidly connected to the shaft 164. Said collar 169 is equipped with oppositely disposed, radially extending pins which are adapted to be engaged by the slotted ends of a forked arm 171 (see Figure 13), which arm is pivotally mounted as indicated at 172 on a vertically disposed post 173 (see also Figure 34).

The post 173 is fixedly mounted at its lower end in a suitable boss provided for that purpose near the periphery of the spider member 161 and at its upper end in a boss provided in another spider or disc-like member 174. The member 174 is rotatably mounted on the central post 162, so that it is capable of rotating in unison with the member 161 as an incident to its connections therewith through the posts 173 of which there is one for each of the gripping head units, there being eight such units associated with the spider 161 in the present apparatus.

The members 161, 174 and posts 173 constitute the upper portion of a cage-like structure. The said cage-like structure includes a lower portion which comprises a spider or disc-like member 175 rotatably journalled on the post 162 and connected around its periphery by means of suitable upright posts or brackets 176 (see Figure 6).

The arm 171 which effects opening and closing movement of the gripper block 155 relative to its cooperating block 156 is actuated through the agency of an arm 177 which is rotatably mounted on the post 173 immediately above the hub of the arm 171. Said arm 177 is provided at one end with a cam-engaging roller 178 which travels in a cam groove 179. The cam groove 179 is formed on a disc or spider-like member 180 which is mounted fixedly on the post 162, so that said member 180 is a stationary member. The cam groove 179 is so formed (see Figure 13) that the arm 177 will be rocked as required to effect opening and closing of the gripper heads in properly timed relation to the operations of the apparatus.

Rocking movement of the arm 177 is transmitted to the lever 171 for closing the gripper blocks through the agency of a spring 181, such spring being supported by means of a pin 182 having one end seated in a socket in a portion 183 of the arm 177 and its other end slidably fitting in an opening provided in an upstanding part 184 of the arm 171. As illustrated in Figure 13, the pin 182 is preferably provided with a flange or collar for engaging one end of the spring 181, the other end of the spring engaging said upstanding portion 184 of the arm 171, so that closing movement of the gripper blocks is effected by a yielding or compressible connection between the arms 177 and 171. In this manner the application of excessive pressure on the carton body is prevented, while at the same time providing for a desirable resilient gripping effect on the container body. Opening movement of the gripper block 155 is more positively effected through the agency of an adjustable screw member 185 carried by a portion of the arm 177, said screw member being adapted to engage said upstanding portion 184 of the lever 171.

Carton bodies are delivered by the forming chute 137 and mechanism previously described to a gripping head 97 in the station indicated at A in Figure 13. The container body fits freely within the then open gripping head and rests on a platform or shelf 186 which preferably extends completely around the cage structure except for an opening provided to facilitate inversion of the container body. Said shelf 186 is carried by suitable frame work and brackets and is stationary. It serves to support the container body within the gripper heads while the end closures are being applied to the upper end of the body, so that the container body may not be moved endwise through the gripper during the application of the end closures. Hence it is unnecessary that the gripper members apply excessive squeezing force on the container bodies, it being merely necessary that the said gripper bodies hold the container bodies against lateral shifting so as to maintain them in proper alignment with other operating units of the apparatus. The gripping effect is, however, sufficient to hold the container body against endwise movement through the gripping heads when the same are rotated for inverting the container body.

Rotary movement is imparted to the cage structure and the gripping heads carried thereby through the agency of a ring gear 187 which is secured to the under side of the lower spider 175 of the cage structure. Said ring gear meshes with a pair of diametrically opposed gears 188 and 189 which are respectively carried by shafts 190 and 191 suitably journalled in bearing brackets carried by portions of the underlying frame structure 163. The said shafts 190 and 191 are suitably coupled as indicated at 192 (Figure 3) to shafts 193 and 194, respectively, which are in turn driven by means which will presently be described (see Figures 3 and 4).

Rotation of the gripper blocks for inverting the container bodies carried thereby is effected in properly timed relation by means of a rack bar 195 which meshes with the pinion gear 168, being held in operative relation thereto by a guiding element 196 formed integral with the bracket structure 166 as best shown in Figure 37 (see also Figure 13). The rack bar 195 is suitably mounted for longitudinal sliding movement in the cage structure (see also Figures 6 and 35) and its inner end is operatively connected by means of a roller 197 mounted on its said inner end to a forked end of a lever 198 which is pivotally mounted at its other end as indicated at 199 on the rotating cage part 161. The lever or arm 198 is provided intermediate its ends with a roller 200 which engages a cam groove 201 formed on a stationary disc-like member 202 which is fixedly mounted on the central post 162. Said cam groove 201 is so shaped that as an incident to the rotary travel of the cage and of the arm 198, the arm will be rocked at the proper time to move the rack bar 195 outwardly to thereby effect rotation of the gear 168.

The rotation of the gear 168 is transmitted to the gripper head carrying shaft 165 through the agency of a ratchet clutch, one member of which is indicated at 203 (Figures 13 and 37). Said member 203 of the ratchet clutch is preferably formed integrally with the gear 168 and it is adapted to cooperate with a complementary ratchet clutch part 204 which is suitably splined to the shaft 165 as clearly indicated in Figure 37 and urged by a spring 205 into operative engagement with the clutch member 203.

The ratchet clutch is formed so that when the rack bar 195 is moved outwardly, the resulting rotation of the clutch part 163 will be transmitted to the clutch part 204 and through the shaft 165 to the gripper head. The rack bar 195 is subsequently restored to initial, inwardly disposed position by an appropriate portion of the cam groove 201, but such return movement results in relative rotation between the clutch parts 203 and 204, so that rotation of the head in a reverse direction does not occur. The clutch spring 205 serves to permit the clutch member 204 to be cammed outwardly incident to the reverse rotation of the clutch member 203 and to return the member 204 into cooperative relation to said member 203 for the next turning movement of the gripper head.

It is preferred to lock the gripper head in operative position so as to prevent unintentional or accidental rotation thereof. For this purpose there is mounted on the gripper head hub 167 a ring or collar 206 (see Figures 13, 35 and 37), which collar is provided with a pair of diametrically opposed notches 207, and as indicated in Figure 37, it is rigidly secured to the gripper head block 156. A locking rod or bar 208 is slidably mounted in suitable bearing elements 209 and 210 which are provided on conveniently accessible portions of the rotating cage structure (see Figure 13) and said locking rod is normally urged by a coil spring 211 to move toward the collar 206 and into one of the notches 207. Said locking rod 208 is provided at its inner end with a grooved collar 212 into which projects a stud or roller 213 which is carried by an arm 214.

The arm 214 is pivotally mounted as indicated at 215 at its opposite end on the member 161 of the rotating cage structure and intermediate its ends said arm is provided with a roller 216 which is adapted to engage a short stationary cam bar 217 which is carried by the stationary disc-like member 180. The cam bar 217 is so arranged that it will effect inward rocking movement of the arm 214 to thereby disengage the locking rod 208 from the notched collar 206 when the gripping head is to be rotated for inverting the container body. At about the time the turning movement is completed, the arm 214 is released from the cam bar 217 so as to permit the spring 211 to re-engage the locking bar 208 with a notch 207 in the locking collar 206.

It will be understood that each of the eight container body grippers is independent of the others and that each is provided with mechanism for effecting its opening, closing and rotation in properly synchronized relation to the operations of other apparatus which will presently be described. However, the operating cams referred to respectively control each of the movements of all of the gripper heads, or, in other words, are common to all of the gripper heads.

*Bottom closure blank feeding mechanism*

The mechanism for feeding, forming and applying the container bottoms is shown in general in Figures 1, 3, 5 and 6. Certain details of the mechanism are shown in Figures 9, and 21 to 32, inclusive.

Octagonal shaped bottom member blanks 71 are stacked vertically in a suitably mounted and supported receptacle 220. As shown in Figure 22, the receptacle is removably mounted by having a lower end portion thereof inserted in an upstanding sleeve or collar-like part 218 formed integrally on a bracket plate 219 which is supported by frame or bracket parts provided for that purpose as indicated in Figure 22. The lower end of said receptacle 220 is suitably contracted as indicated at 221 (Figure 5) so as to support the stack of blanks while at the same time permitting forced withdrawal of the lowermost blank by mechanism now to be described.

In this instance vacuum means is employed for withdrawing the lowermost closure blank 71 from the receptacle 220 and it comprises a tube 222 vertically slidably mounted in a bearing 223 suitably supported by the frame work of the apparatus. The upper end of said tube 222 is provided with a cup-like member 224 which may be of rubber or other suitable material for engaging the bottom surface of the lowermost closure blank 71 in an air-tight manner.

The tube 222 has connected to its lower end a valve 225 which communicates through a flexible hose 226 with a suitable vacuum pump. The tube 222 and valve 225 are, in effect, extended downwardly by means of a rod 227 which is vertically slidably mounted in a bearing member 228 carried by the frame work of the apparatus so that the vertically slidable structure comprising the parts 222, 224, 225 and 227 is adequately supported for the indicated vertical sliding movement.

Vertical sliding movement is imparted to the said structure by means of an arm 229, one end of which is pivoted to the lower end of the rod 227 (see Figures 3 and 5) and the other end of which is mounted on a stationary shaft 230 so as to permit rocking movement of the said arm 229. The arm 229 is provided intermediate its ends with a cam following roller 231 which engages a cam 232 carried by the cam driven shaft 131.

The arm 229 is adapted to be positively moved upwardly by the cam 232 and it may be moved downwardly either by gravity or by the employment of a spring (not shown) suitably connected between the arm 229 and a lower portion of the frame structure or in any other advantageous manner.

The valve 225 is adapted to be opened when the gripping or vacuum cup 224 is raised, the valve being provided with an operating arm 233 carrying a roller 234 at its outer end for cooperation with a cam 235. The cam 235 is preferably a stationary cam suitably mounted on a frame part or bracket carried by a frame part and so arranged that when the vacuum cup 224 approaches the lowermost blank 71, the valve will be opened and held open so as to effect pneumatic attachment of the engaging lowermost blank to the vacuum cup 224.

Upon downward movement of the vacuum cup 224, the valve is again closed and the blank 71 carried by the vacuum cup is released and deposited on a pair of horizontally spaced tracks 236, between which the said vacuum cup moves up and down.

The end closure blank 71 so deposited on the tracks or rails 236 is fed edgewise along said tracks from its initial position under the receptacle 220 by means of a horizontally reciprocable pusher member 237. The pusher member 237 is carried by a plate 238 which is slidably mounted as best shown in Figure 22 in suitable side rails 239 which are carried by frame members of the apparatus. The pusher member is reciprocated by means of a cam 240 which is carried by said main drive shaft 131 (see Figures 3 and 5).

The cam 240 acts against a roller 241 carried by an arm 242 intermediate its ends, one of which is mounted on the shaft 230 to permit rocking of the arm and the other of which is connected to a link 243 which extends upwardly to one arm 244 of a bell crank lever. The bell crank lever is pivotally mounted as indicated at 245 on a frame-carried bracket and the other arm 246 of the bell crank is connected by means of a pin and slot connection as indicated at 247 to a suitable lug or ear which depends from said slidably mounted plate 238. Suitable spring means (not shown) may be provided for yieldingly urging the arm 242 in a downward direction so as to cause its roller 241 to maintain operative engagement with the roller 241 to maintain operative engagement with the cam 240.

When the pusher member 237 is moved forwardly, it serves to advance a closure member blank 71 to a predetermined position in overlying relation to a stationary die member 248 which is suitably mounted on a conveniently accessible frame part or other element which may be provided for that purpose.

As best shown in Figure 21, the tracks or rails 236 are recessed over the area of the stationary die 248 and only relatively narrow ledges 249 are retained for supporting the blank over the die member 248. Also, as shown in Figure 21, the sides 250 of the track structure are angled inwardly as indicated at 251 to accurately center the blanks 71 over the die. The feed movement of the bottom closure blanks 71 is limited by a suitable wall 252 provided at the ends of the ledges 249.

To prevent injury to the blanks and to insure their being fed fully up to the top wall 252, the pusher member 237 is provided with a head plate 253 which is suitably yieldably carried by the pusher so as to be adapted to yield rearwardly as an incident to a slight excess travel imparted to the pusher 237.

*Bottom closure forming and applying mechanism*

The bottom closure forming and applying mechanism comprises a rotating drum or cage-like structure (see Figure 5) embodying upper and lower end members 254 and 255 respectively, the same being rigidly connected together at their peripheries by means of connecting brackets 256. The said end members 254 and 255 are also rigidly connected together axially by means of a sleeve-like member 257.

Said cage-like structure is secured to a vertically disposed shaft 258 which is suitably journalled in a bearing member 259 carried by the frame work of the apparatus and at its lower end in a suitable bearing 260 which is also carried by the frame work. The shaft 258 is supported for rotation by suitable anti-friction bearings such as indicated at 261 adjacent the lower end of the shaft and 262 adjacent the bottom of the cage structure. A further anti-friction bearing 263 is provided intermediate the bottom of the bearing structure 259 and a collar 264 carried by the shaft to thereby prevent binding of the shaft incident to any tendency of the shaft to move upwardly.

The cage structure thus rotatably mounted is driven step by step, in this instance a quarter of a revolution each step. For so driving the structure there is provided a four-tooth ratchet member 265, the same being non-rotatably secured to the shaft 258 through the agency of a gear member 266 to which the ratchet is rigidly bolted and the hub of which gear member is keyed or otherwise non-rotatably secured to the said shaft.

For cooperating with the ratchet 265 there is provided a pawl 267 which is carried by one arm 268 of a bell crank lever, the latter being in turn rockably mounted on the shaft 258 beneath said ratchet wheel. Said bell crank 268 has another arm 269 which has connected to it one end of a rod 270, the other end of which is connected to an arm 271 (see Figure 4). The arm 271 is a member in general similar to the bell crank comprising the arms 268 and 269, and said arm 271 is rockably mounted on another vertically disposed shaft 272 so as to be capable of rocking in unison with the bell crank arms 268 and 269. The arm 271 has an extension 273 to which there is connected one end of a link 274, the other end of which is connected to a crank arm 275 which is carried by a rotatably driven gear 278.

As indicated in Figure 4, the connections between the ends of the link 274 and the arm extension 273 and crank arm 275 include universal joints which permit the necessary angling of the link 274 incident to rotation of the crank 275 and rocking of the arm 271.

Figure 3:
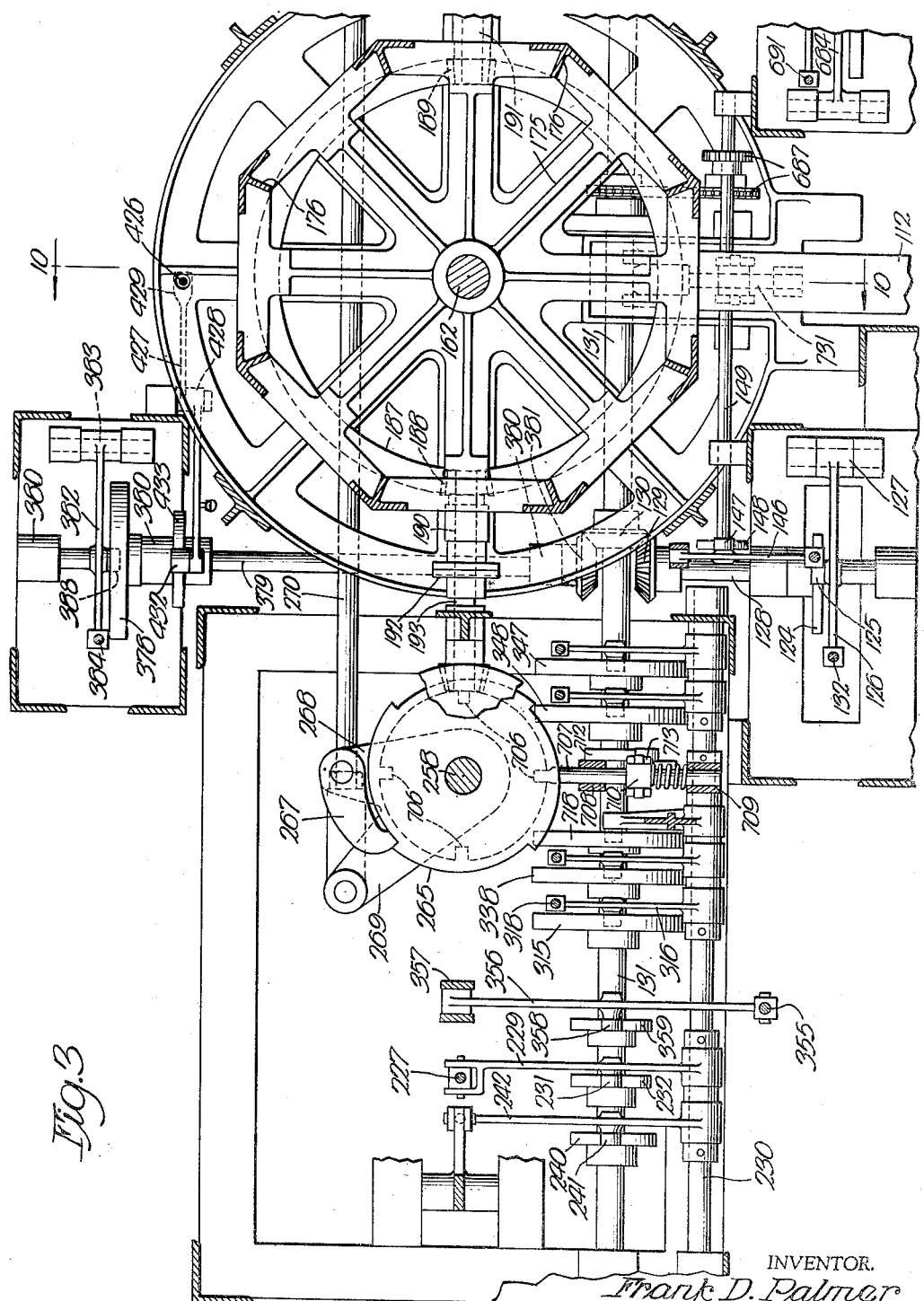

The gear 278 is carried by a shaft 279 which is suitably journalled in bearing brackets 280 and 281 carried by the machine frame work and the gear 278 is driven by means of a suitable electric motor 282 which is provided with a driving gear 283 in mesh with the gear 278. It will be observed that the rotation of the crank arm 275 will be converted into horizontal rocking or oscillating movement of the arm 271 and the bell crank arms 268 and 269. When the arm 268 rocks counter-clockwise as seen in Figure 3, the pawl 267 will act against one of the teeth of the ratchet wheel 265 to rotate the ratchet and thereby the cage structure carried by the shaft 258 one-quarter of a turn.

The cage structure comprising the top and bottom members 254 and 255 and its connecting elements carry the four heads indicated at 99 and previously referred to.

The heads 99 are adapted to successively cooperate with the stationary die member 248 to bend the flanges 72 and 73 of the end closure blank 71 to the initial condition illustrated in Figure 62.

Each of the forming heads 99 comprises a tubular member 284 which is vertically slidably mounted in a suitable bearing member 285 formed integral with the lower end member 255 of the cage structure (see Figures 5, 9 and 25).

Within the tubular member 284 there is vertically slidably mounted a shaft or rod 286, the upper end portion of which is also slidably mounted in a suitable bearing boss 287 formed integrally with the upper cage member 254. To the lower end of the shaft 286 there is secured a forming die member 288.

The die member 288 is adapted to engage an end closure blank 71 and to clamp it against a clamping plate 289 which is mounted for vertical movement within the stationary die 248 and yieldingly held in an upwardly disposed position as shown in Figure 25 by a suitable coil spring 290. Downward movement of the shaft 286 and its die member 288 serves to press the end closure blank 71 downwardly into the stationary forming die 248 to thereby cause the inner flange portions 72 to be bent upwardly along the fold lines 76 substantially as illustrated in Figure 30. The die member 288 is provided with a shoulder 291 which serves to assist in folding the outer flange portion 73 across the upper end 292 of the die member 248.

The tubular member 284 is provided at its lower end with an outwardly extending flange 293 to which is rigidly connected an annular mounting member 294. Within the mounting member 294 and slidably on the shaft 286 there is mounted a sleeve member 295, the same being provided at its upper end with a flange forming nut 296 which rests on an internal shoulder 297 formed in the mounting member 294. A suitable coil spring 298 disposed within a suitable space provided between a portion of the sleeve member 295 and a portion of the mounting member 294 serves to normally yieldingly urge the member 295 downwardly relative to the member 294 and the sleeve 284.

The sleeve 295 is suitably shaped externally to receive a plurality of mounting blocks 299 (see Figure 28) which are adapted to be firmly bolted to the lower portion of said member 295. The mounting blocks 299 have upwardly extending portions 300 which bridge the gap between the lower end of the member 294 and the adjacent face of the lower end portion of the member 295 and slidably bear on suitably formed surfaces in said mounting member 294. The mounting blocks 299 are also provided with pairs of depending ears 301 between which there is mounted a folding and gripping member 302 (see Figure 27).

The folding and gripping members 302 comprise depending head portions 303 and pairs of upwardly extending arms 304 between the upper ends of which is rotatably mounted a suitable roller 305. The members 302 are pivotally connected to the mounting blocks 299 by means of pivot pins 306 which extend through suitable holes in the ears 301 and the central portion of the members 302.

It will be understood that there is a mounting block 299 and forming and gripping member 302 for each side wall of the container, or, more properly, for each pair of flanges 72 and 73 of the bottom closure member. As indicated in Figure 26, the members 299 and 302 are disposed in octagonal formation, so that the heads 303 of the members 302 are pivotally movable respectively in directions extending at right angles to the normal planes of the end closure flanges 72 and 73.

A wedge block such as indicated at 307 is associated with each set of mounting blocks 299 and forming and gripping members 302. Such wedge blocks are normally locked in fixed position on a portion of the mounting member 294, the same being capable of vertical adjustment thereon but being adapted to be clamped in place by means of a clamping screw 308 and a suitable set screw 309. As best shown in Figure 25, the set screw 309 is threaded into a suitable aperture in a peripheral flange portion formed integral with the mounting member 294 and the clamping screws 308 pass through elongated slots 310 in the wedge blocks 307.

The shaft 286 and sleeve 284 are adapted to be initially moved simultaneously downward with the result that the end closure blank 71 is formed to the condition illustrated in Figure 30. As there shown, the lower ends of the heads 303 of the folding and gripping members 302 engage the edges of the outer flanges 73 which are initially turned outwardly by the cooperative action of the shoulder 291 and die edge 292.

The die member 288 is limited in its downward movement by reason of the shoulder 311 of the lower die member 248 but the sleeve 284 and the parts carried thereby may continue to move downwardly with the result that the heads 303 of the folding and gripping members 302 fold the outer flanges 73 of the bottom closure member downwardly over the outwardly and downwardly inclined faces 312 of the lower die member.

The heads 303 are provided with angularly disposed faces 313 which are normally disposed substantially parallel to the lower die faces 312 and with small ribs or teeth extending transversely thereof and indicated at 314. When the heads 313 of the folding and gripping members reach the position shown in Figure 31, the said ribs 314 underlie the outer edges of the downwardly bent flanges 212, which, because of the normal resiliency of the paper board stock from which the end closures are formed, tend to unfold and press themselves into contact with the said faces 313. Thereafter, the tubular member 284 and the shaft 286 are retracted or moved upwardly with the result that the end closure member 71 is carried upwardly with the lower die member 288 substantially as illustrated in Figure 32.

The vertical movement of the shaft 286 and of the tubular member 284 is effected by the following cam operated mechanism best shown in Figures 3, 5 and 9.

For actuating the outer or sleeve member 284, there is provided a cam disc 315 provided with a suitable cam groove in one face for actuating an arm 316. The arm 316 is mounted for rocking movement on the shaft 230 and it is provided with a cam groove engaging roller 317. The free end of the arm 316 is connected by a link 318 to one end of a rock lever 319 pivoted intermediate its ends on a suitable frame part or bracket. The other end of said rock lever 319 is connected by means of a link 320 to a vertically slidable section 321 of an annular member 322 which is provided with an outwardly facing groove 323.

The link or rod 320 is vertically slidably mounted in a portion of the bearing structure 259 as best shown in Figure 5.

The section 321 includes a groove portion 324 which is adapted to be aligned with the portions of the groove 323 as will hereinafter be explained. The grooves 323 and 324 receive a roller 325 which is adapted to travel in said grooves and said roller is carried by the lower end portion of a rod 326 which is vertically slidably mounted adjacent its lower and upper ends in the end members 254 and 255 of the rotating drum or cage structure. It will be apparent that rocking movement imparted to the arm 316 by the cam 315 will be transmitted through the described link and lever connections to the grooved section 321 and by it to the vertically slidable rod 326.

Vertical movement of the rod 326 is transmitted to the sleeve member 284 by means of a connecting lever 327, one end of which is pivotally mounted as indicated at 328 on the hub portion 257 of the cage structure. The other end of said lever 327 is pivotally connected as shown at 329 to the upper end portion of said tubular member 284. The arm 327 is also pivotally connected as shown at 330 intermediate its ends to the rod 326 so that vertical movement of the rod is thereby transmitted to the lever 327.

As indicated in Figure 5, the connection between the lever 327 and the rod 326 includes a sleeve part 331 which is rotatable on the rod 326 but confined against endwise movement on the rod by means of suitable collars secured to the rod. It will also be understood that necessary provision is made for permitting such relative lateral movement between the lever 327 and the parts 284, 326 and 257, as may be required by the rocking movement of the lever as compared with the vertical movement of the parts 284 and 326.

The upper die member 288 and shaft 286 are actuated vertically by means similar to those already described for actuating the sleeve 284. The actuating means for the rod 286 includes a lever 332 pivotally connected at one end to the hub member 257, at its other end to the rod 286, and intermediate its ends to a rod 333 which is vertically slidably mounted in the upper and lower cage members 254 and 255. The rods 326 and 333 are also connected adjacent their upper free ends by means of links 350 and 351. The link 350 is secured to the upper end of the rod 326 and the rod 333 is slidable through the other end of said link 350. The link 351 is secured to the rod 333 in downwardly spaced relation to the member 350 and the rod 326 is slidable through the other end of said link 351.

The lower end of said rod 333 is connected by means of a roller 334 and a vertically slidable grooved section 335 to a vertically slidably mounted rod 336. The grooved section 335 is similar to the grooved section 321 but constitutes a part of a second and inwardly disposed grooved annular member 336 (see Figures 5 and 9). The vertically slidable grooved section 335 is adapted to be actuated vertically by means of a cam disc 338 (Figure 3) which, like the cam disc 315, is carried by the continuously driven main shaft 131. Said cam disc 338 is operatively connected to the rod 336 by connections which are substantially the same as those which connect the cam disc 315 to the rod 320.

It will be understood that the annular members 322 and 337 serve to normally hold the forming head members 286 and 284 in normally fixed, raised position. The vertically slidable actuating members 321 and 335 are actuated by the cams 315 and 338, respectively, in suitably synchronized relation to effect downward movement of the end closure forming structure previously described.

By comparison of the relationship of the parts of the head structure 99 as shown in Figures 25 and 32, it will be seen that when an end closure is seated in the head structure 99, the sleeve part 284 with the mechanism supported thereby is disposed in a position which is lower relative to the die part 288 than before such end closure has been formed and fitted in the die structure (Figure 25). Accordingly, the roller 325 (Figures 5 and 9) through which vertical movement is transmitted to such sleeve structure will be disposed in a somewhat lowered position when the end closure is formed and seated in said die head. The groove 323 in the outer annular member 322 is therefore tapered downwardly as indicated at 323a (Figure 9), so that the roller 325 will enter the lowered portion of the groove 323a when the rotating structure is next advanced. It will also be apparent that after the end closure is applied to the container the die head will be permitted to return to its initial condition as shown in Figure 25, and that a return step (not shown) in said groove 323 is provided at the proper place to permit the roller 325 to reenter the higher portion of said groove 323.

For the purpose of relieving the mechanism for actuating the die head rod 286 from excessive strains when forming an end closure, it is preferred that a supplementary pressure applying device be provided. Such a device may comprise an arm 352 pivotally connected intermediate its ends as indicated at 353 (Figure 1) in a suitable upstanding bracket carried by the frame work of the apparatus. Said arm 352 has an end portion 354 extending into overlying relation to the upper end of the die head rod 286 and its other end is connected by means of a connecting rod 355 to a cam actuated lever 356 (Figure 3). The cam actuated lever 356 is pivotally mounted at one end as indicated at 357 in a suitable bracket carried by the frame work of the apparatus and it is provided intermediate its ends with a roller 358 which engages a rotary cam 359 carried by said driven shaft 131. The cam 359 is so formed that it will effect rocking movement of the arm 352 in properly synchronized relation to the movement of said rod effected by the previously described mechanism, and it is further so designed that it will apply supplementary pressure on said rod when in its lowermost position to thereby more effectively force the die head 288 into the lower die 248 to form the end closure member as shown in Figure 30.

After the end closure has been formed and raised to the position illustrated in Figure 32, the rotating cage structure which carries the forming head is advanced one-quarter of a turn in a counter-clockwise direction as shown in Figure 1 and then again stopped. The following forming head structure 99 is then actuated to form another end closure while the first formed end closure is subjected to a heat treatment which may be provided for softening or activating a thermo-plastic adhesive material carried by the inside face of the formed-up member 71.

Such thermo-plastic adhesive material may cover the entire inside area of said end member including its peripheral flanges, or it may be restricted to the area of said flanges if desired. In any event, such thermo-plastic adhesive material is subjected to heating so as to render it soft and tacky, so that it may be relied upon for adhesively attaching the end closure to the container body. It will be understood that the end closures are furnished in blank form with the desired adhesive material already applied thereto but dried, so as to be hard and non-tacky.

The end closure heating station is indicated at B in Figure 1 and the means for heating and softening the adhesive preferably comprises a heating unit 339 (see Figures 9 and 23). The heating unit 339 comprises a receptacle-like member formed of suitable heat resisting material and within such receptacle there are positioned a plurality of electrical heating units 340, the same being of any suitable construction and being connected to a source of electric current by leads 341 extending out through the bottom of the device. As shown in Figure 9, the heating unit 339 is mounted on a suitable bracket carried by the frame and it will be understood that it is fixedly mounted in such position that it will be aligned vertically with one of the forming heads 99 which carries an end closure member in the form illustrated in Figure 32.

Air under pressure is delivered to the inside bottom portion of the heating unit 339 by means of a conduit 342 which connects to any suitable source of compressed air and the air is caused to collect around the heating elements 340 and to be thereby heated. Suitable baffles, perforated or otherwise, as indicated at 343, may be provided within the unit 339 for insuring proper circulation of the air around the heating units. The heated air emerges from the heating unit 339 through a plurality of outlet openings 344 so arranged as to deliver the hot air into the angle between the flange portions 72 and 73 of the end closure member. Such heated air serves the purpose of softening and reactivating the adhesive material carried by the indicated surface portions of the end closure member.

The end closure member with its softened adhesive is next advanced to position for applying such end closure to the then upper end of the carton body, the rotating cage structure carrying the heads 99 being advanced another quarter of a turn. The end closure member 71 is accordingly brought into vertical alignment with a container body which is supported on the shelf 186 and by one of the gripper heads 97.

The end closure applying station is indicated at C in Figures 1 and 6. For applying the end closure, the head structure carrying the end closure is again lowered by means of vertically slidably mounted grooved sections 345 and 346 which are actuated by connections to cams 347 and 348 respectively (see Figures 3 and 5). The cams 347 and 348 are similar to the previously described cams 315 and 338 and are carried by the main driven shaft 131. The members 345 and 346 are disposed in diametrically opposed relation to the members 321 and 335 as shown in Figure 5, so that the head structure 99 is actuated for a second time by the members 345 and 346 after the head structure has been advanced one-half a turn from its end closure forming position.

The end closure carrying structure as shown in Figure 32, upon arriving in vertically aligned but upwardly spaced relation to a container body, is lowered by the mechanism already referred to so as to insert the end closure 71 into the container body 70 with its flanges 72 in face to face relation to adjacent marginal wall portions of the container body. The cam 347 which actuates the sleeve part 284 of the head structure and the parts carried thereby is so shaped as to cause said sleeve part 284 and the head structure carried thereby to continue to move downwardly after the end closure 71 reaches its operative position within the container body, thereby causing the folding fingers 303 to fold the outer flanges 73 downwardly into face to face engagement with the adjacent outside marginal end portions of the container.

Downward movement of the die member 288 is limited by engagement of a collar 348 carried by the upper end of the shaft 286 with the upper end member 254 of the cage structure (see Figure 5), and, of course, the cam mechanism is preferably so designed as to lower the shaft 286 to the indicated limited extent.

Downward movement of the sleeve 284 to effect folding of the outer flanges 73 as shown in Figure 33 continues until the lower end of the member 295 engages the upper end of the die member 288, whereupon the fingers 303 come to rest in respect of vertical motion. The mounting member 294 which carries the wedge blocks 307 is, however, permitted to continue to move downwardly by the yielding of the spring 298 with the result that the wedge blocks 307 engage and thrust outwardly the rollers 305 carried by the upper ends of the members 302 whereby the fingers 303 are rocked inwardly to thereby squeeze the end closure flanges 72 and 73 together with the marginal end portions of the container walls between them. In this way, a tight adhesive connection is produced between the end closure 71 and the side walls of the container body 70. Upward movement of the sleeve 284 and shaft 286 serves to retract the head 99, leaving the end closure 71 in operative position on the then upper end of the container body. Suitable leaf springs 349 anchored to the upper portions of the wedge blocks 307 and having free portions engaging the rollers 305 of the clamping members 302, serve to return the latter to normal position when the wedge blocks 307 are retracted to normal position incident to upward movement of the structure.

The container body, with the end closure 71 applied to its upper end, will thereafter be advanced one step of movement of the rotary cage structure comprising the gripping heads 97 carried by the members 174, 161, 175, and the parts and brackets 173 and 176 which are rotatable about the vertical post 162. The step by step turning movement of the rotary cage structure on the post 162 is effected by a driving connection with the driven shaft 258 of the end closure forming mechanism. The driving connection is best illustrated in Figures 3, 5 and 6 and it comprises a bevel gear 360 formed on the member 266 which is carried by the driven shaft 258. Said gear 360 meshes with a gear 361 carried by the shaft 194 which, as already explained, is connected to a gear 188 which meshes with a ring gear 187 carried by the rotary structure on the post 162. The relationship of the gears 360, 361 and 187 and 188 is such that for each quarter-turn of the end closure forming structure, the container body conveying structure will be advanced one-eighth of a turn.

After the end closure is applied to the container body as above explained, it is subjected to a second or supplementary pressure operation by the mechanism indicated at 100 in Figure 1, it being understood that said mechanism 100 is so positioned as to operate on the end closure when it reaches the first position of rest after its movement from the end closure applying position C.

Figure 36:
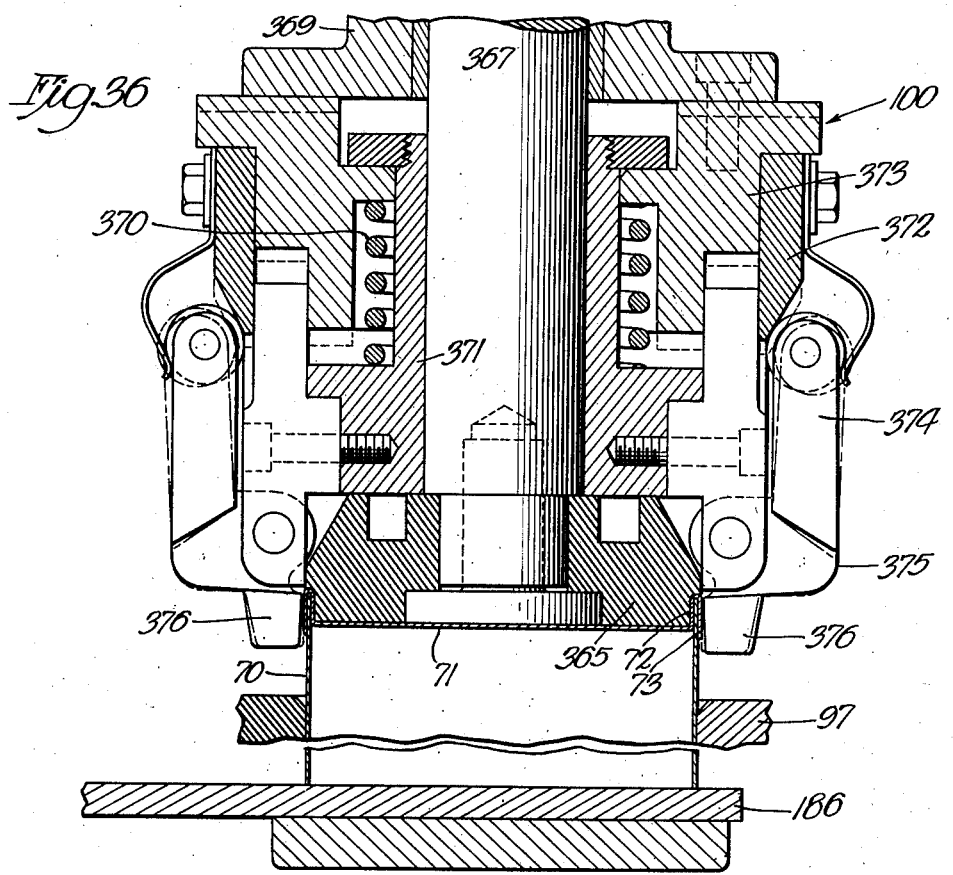
Fig. 36 is a section on the line 36—36 of Fig. 34.

The supplementary pressing mechanism is shown in Figures 1, 34 and 36. It comprises a head structure of substantially the same construction as the end closure applying mechanism except that the lower end portions 303 of the members 302 are eliminated since there is no end closure gripping function in the supplementary pressure applying mechanism. The supplementary pressure applying head 100 is initially in elevated but axially aligned relation to a container to which an end closure 71 has been applied. The mechanism is moved downwardly to cause the inner die member 365 to enter the recessed end closure 71 as shown in Figure 36, such downward movement being limited by engagement of a collar 366 on the upper end of the inner shaft 367 with the upper end of a bearing bracket 368 in which the shaft 367 is slidably supported.

The downward movement of the shaft 367 is effected by downward movement of the sleeve member 369 which is transmitted through a coil spring 370 to an inner sleeve member 371, the lower end of which member 371 engages the top of the inner die 365. When the downward movement of the die 365 is stopped by engagement of the collar 366 with the bracket 368, the spring 370 yields to permit continued downward movement of the sleeve 369 and a wedge block 372 carried by a mounting member 373 which is in turn connected to the sleeve 369. The wedge block, by its downward movement relative to the inner sleeve member 371 and die 365, serves to thrust outwardly the upper end portion 374 of pivotally mounted clamping members 375, the lower end portions 376 of which engage the outer flange portions 73 of the end closure and squeeze them tightly against the container body wall. It will be observed that the inner die member 365 serves as a backing for the pressure applying parts 376, so that the marginal end portions of the container body walls are tightly squeezed between the end closure flanges 72 and 73.

When the supplementary squeezing operation is completed, the sleeve member 369 is again moved upwardly until it reaches its normal position relative to the shaft 367 where it engages a collar 377 carried by the shaft 367 so that further upward movement of the sleeve 369 is also imparted to said shaft 367. The entire supplementary squeezing head is thereby elevated or retracted to its initial position entirely free of the then upper end of the container.

Downward movement of the supplementary squeezing structure is effected in this instance by means of a rotary cam 378 (see Figure 3) which is carried by a shaft 379. The shaft 379 is suitably journalled in bearings indicated at 380 which are formed or mounted on the frame work of the apparatus. The shaft 379 is continously driven by means of a gear 381 secured to the shaft 379 and meshing with the gear 130 on the main driven shaft 131.

The cam 378 actuates a lever 382 which is pivoted at one end as indicated at 383 in suitable supporting bearings or brackets and at the end of the said lever there is secured a connecting rod 384 which extends upwardly from the lever 382. The lever 382 is provided with a roller 388 intermediate its ends which engages a suitable cam groove in the cam disc 378 to effect the desired rocking movement of the lever 382 and vertical movement of the rod 384. The rod 384 is connected at its upper end to one end of a lever structure 385 which is pivotally mounted intermediate its ends as indicated at 386 (see Figures 1 and 34), the other end of said lever 385 being suitably connected as shown at 387 to said sleeve 369.

After the supplementary squeezing operation is completed and the container is released by the supplementary squeezing mechanism, the container body is again advanced another one-eighth of a turn during which it is inverted by means of the rack and gear mechanism 195, 168 and operating mechanism already described. The container supporting shelf 186 terminates as indicated at 362 so as to avoid any interference with the turning of the container body and the said shelf starts again as indicated at 363 so as to support the container in inverted position. It will be understood that the inverting operation is so timed that it will take place during the travel of the container between the ends 362 and 363 of the shelf. When the container is inverted and reaches the station indicated at D, it is in position to receive a charge of material to be packaged.

*The package filling mechanism*

The material to be packaged is initially supplied to a hopper or receptacle 390 which is rotatably mounted on the upper end portion of the post 162 (see Figures 1 and 6). Said receptacle includes a bottom wall 391, and an upwardly extending side wall 392. The receptacle is rotatably mounted on a hub member 393, the hub member 393 being seated on an outwardly extending flange thereof as shown in Figure 6. The hub 393 is bored out and internally threaded as indicated at 394 to receive an externally screw threaded sleeve 395 which is rotatable on the upper end portion of the shaft 162. The sleeve 395 is supported against downward movement by an anti-friction thrust bearing 396, the bearing being in turn supported by the hub portion 397 of a cam disc member 398. The cam disc 398 is pinned or otherwise secured to the post 162 against rotation and against vertical movement thereon. The upper end of the threaded sleeve 395 is preferably provided with a hand wheel 399 which facilitates manual rotation of the sleeve 395 and consequent vertical adjustment of the receptacle 391. A lock nut 407 is provided on said sleeve 395 for locking it against accidental adjustment, the lock nut being engageable with the upper end of the hub member 393 to effect the said locking function.

A hub or spider member 400 is seated through the agency of an anti-friction bearing 401 and said hub on a shoulder provided on the hub member 393, and said hub or spider 400 serves to support a series of scrapers or spreaders 402, 403, 404, and 405 and a partition wall 406 within the receptacle.

The hub 400 and the scrapers or spreaders carried thereby are normally stationary and are held against rotation by any suitable means, for example, a link 457 which is connected at one end to the hub and at its other end to a conveniently located stationary part of the mechanism (Fig. 1).

The receptacle 390 is provided with a series of outlets 408 in its bottom wall 391, there being one such outlet opening for each gripper head of the mechanism. Discharge tubes 409 are mounted in the discharge opening 408 and extend downwardly therefrom and have their lower ends extended into tube sections 410 which rest at their lower ends on transversely movable valve plates 411.

Each of the valve plates 411 is carried by an arm such as indicated at 412 (see Figures 6 and 11) which is pivotally mounted at its inner end as indicated at 413 on the rotating top plate 174 of the rotary cage structure on the post 162. The outer or free end of the arm 412 is provided with a transversely elongated frame-like portion 414 to the bottom of which is secured the valve plate 411. The valve plate 411 is provided with an opening 415 at one end of the frame 414, the other end portion of the valve plate being imperforate so as to be capable of constituting a closure for the lower end of the tube section 410.

The valve plate arm 412 is adapted to be actuated through the agency of a bell crank member comprising arms 416 and 417, said bell crank being pivotally mounted as indicated at 418 coaxially with the pivot mounting 413 of the valve arm 412. The arm 416 of said bell crank carries an upwardly extending roller 419 which enters a cam groove 420 formed in the stationary cam disc member 398. The bell crank arm 416 is also provided with an ear or lug 421 which is apertured to receive one end of a rod 422 which supports a coil spring 423 which is subject in effect to compression between the lug 421 and an abutment member 424 on the valve arm 412. Preferably, the end of the rod 422 which is adjacent the abutment 424 is adjustably seated therein so as to permit limited lateral rocking movement of the rod 422 about the seated end thereof as a pivot, and the spring 422 is compressed between the lug 421 and a collar carried by said rod 422. An adjustable set screw 425 carried by the bell crank arm 417 serves to maintain the valve arm 412 in predetermined relation to the bell crank arms 416 and 417 as will be apparent by inspection of Figure 11.

The cam 420 is so shaped that the bell crank arms 416 and 417 will be rocked clockwise (Figure 11) to move the valve arm 412 and its valve plate 411 to open position in which the valve opening 415 will be axially aligned with the tube sections 409 and 410. The opening movement will be effected through the agency of the spring 422 which is capable of being compressed in the event that the valve arm 412 is locked against movement either intentionally or accidentally, so that the normal movements of the bell crank arms 416 and 417 may take place as required by the cam 420.

Provision is made for preventing opening of the valve structure in the event of absence of a container in a gripping head in the filling position D. The mechanism referred to is best shown in Figures 1, 3, 10, 11, and 34. It comprises a vertically slidably mounted rod 426, the upper end of which is provided with an enlarged head and positioned with its upper surface substantially flush with the top surfaces of the container supporting shelf 186. The shelf 186 is provided with a suitable opening for permitting the headed upper end of the rod to assume such position and to move upwardly therethrough.

A lever 427 pivotally mounted intermediate its ends as indicated at 428 has one end 429 apertured and fitted around the lower end of said rod 426 so as to be movable upwardly relative thereto. A spring 430 is interposed between said lever end portion 429 and a collar 431 carried by the rod, so that upward movement of the member 429 may be transmitted through the spring 430 to the rod 426. The other end portion of the lever 427 is provided with a cam engaging roller 432 which engages a cam 433 carried by the driven shaft 379.

The cam 433 is so shaped and timed that before the valve plate arm 421 is moved to open the valve, the lever end 429 will be moved upwardly. In the event that there is a container in place in the then overlying gripper member, such container will prevent upward movement of the rod 426 and the spring 430 will be compressed, thereby permitting said upward movement of the lever end 425 notwithstanding the immovability of the rod 426. However, if for some reason there is no container in the gripper position, or if for some reason there is no bottom in a container body in said filling position, the rod 426 will be moved upwardly through the opening in the shelf 186.

Near the upper end of the rod 426 there is secured to the rod a lug 434 which carries an adjustable set screw 435, the latter being adapted to engage an electric switch button 436 which controls an electric circuit to a solenoid 437 (see Figures 1 and 34).

The solenoid 437 has a plunger 438 which is pivoted as indicated at 439 to one end of an arm 440 which is suitably pivotally mounted intermediate its ends as indicated at 441. The free end of said arm 440 underlies an ear 442 of a latch member 443 which is pivotally mounted intermediate its ends on the cage end member 174. The latch 443 is normally frictionally held against rocking movement incident to the provision of a friction producing spring 444 associated with the pivot mounting of the latch member. The end of the latch member opposite the end having said ear 442 is suitably formed to hook over an ear or lug 445 which is carried by the valve plate frame 414 (see Figures 11 and 12).

Normally the latch member 443 is in the open position illustrated in Figure 12, but when the solenoid 437 is energized, the arm 440 is rocked with the result that the latch 442 is also rocked to the dotted line position shown in Figure 12 wherein it engages the ear 445 of the valve plate frame and locks the same against opening movement.

As best shown in Figures 6 and 10, the valve plate 411 is movable transversely on the top surface of the rotary cage end member 174. Spouts such as indicated at 446 are associated with each of the outlets 408 of the receptacle and the respective valve structures. Each spout has an upper end position 447 rotatably secured to the under side of the end member 174 through the agency of a laterally extending flange on the upper end of the spout portion 447, an antifriction bearing and suitable supporting structure carried by the member 174 as clearly shown in the drawings. A suitable sleeve member 448 which enters the upper end portion of the spout is also provided, such sleeve portion constituting, in effect, a continuation of the upper sleeve member 410.

The spout contains the angularly downwardly and outwardly directed intermediate portion illustrated and a short, downwardly facing discharge portion 449 which is of such transverse dimension that it is adapted to deliver material to a container thereunder.

The spouts 446 are automatically adjusted from an angular position which they occupy during the greater part of their travel around the post 162. In such angular position they avoid interference with surrounding mechanism and permit close coupling thereof with the container gripping and carrying mechanism mounted on the post 162. The spouts are adapted to be automatically swung outwardly to a radial position (see Figure 11) so as to align their discharge ends 449 with containers which are carried by associated grippers when they reach the filling position. It will be understood that the spouts 446 occupy a predetermined relation respectively to the container carrying grippers and rotate in unison therewith about the post 162.

The mechanism for effecting said swinging adjustment of the spouts comprises a laterally extending lug 450 carried by the upper portion 447 of the spout which is co-axial with the delivery tubes and sleeves 409, 410 and 448. Links such as indicated at 451 have their outer ends connected to the lugs 450 and their inner ends pivotally connected to the free end of an arm 452 which is pivotally mounted adjacent its other end as indicated at 453 on a suitably located boss carried by the member 174 (see Figure 34).

The arms 452 are provided intermediate their ends with rollers 454 which enter a cam groove 455 formed in or on a stationary disc-like member 456, the same being non-rotatably mounted on the post 162. The cam groove 455 is so shaped that when the spout has been carried past the supplementary squeezing mechanism 100, the spout will be swung outwardly to radial position in which its discharge end 449 will register with the open end of a container disposed therebelow. The valve mechanism previously described is, of course, not opened until after the spout has been swung to its indicated operative position and it remains in such operative position during one step of movement of the rotary structure on the post 162. Shortly before such step of movement is completed, the valve is again closed and thereafter the spout swung to its retracted position, thereby freeing or clearing the upper end of the filled container so as to facilitate the application of a top closure thereto.

The upper closure member which embodies a spout construction as already explained is applied to the open end of the filled container by means of forming and applying mechanism comprising the heads 103 on the rotary structure 102 (see Figure 2). Said heads 103 are in general similar to the bottom closure forming and applying heads 99. The spout containing upper end closure blanks are delivered in assembled relation to a zone of operation of a head 103, such zone being indicated at E (Figure 2).

*The upper end spout containing closure assembling mechanism*

Figure 38:
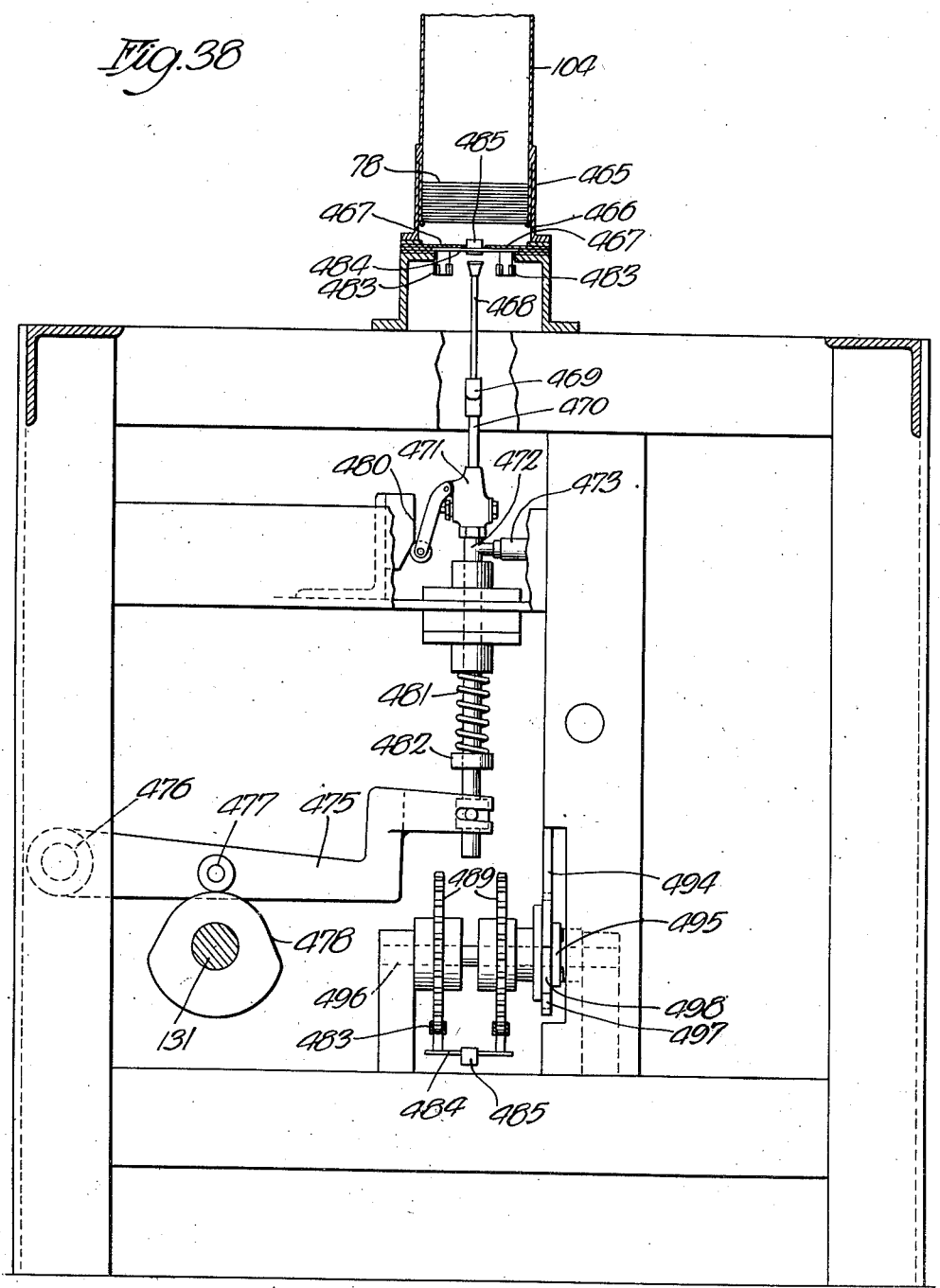
Fig. 38 is a section on the line 38—38 of Figs. 2 and 7.

The main blanks which constitute the upper end closure member 78 are supplied to the assembling apparatus in a stack contained in the receptacle 104 which is removably mounted in a receiving socket 465 suitably supported on the frame structure of the mechanism as indicated in Figure 38. By reason of the removable mounting of the receptacle 104 (and the receptacle 220 for the bottom end closures), such receptacles when emptied may be quickly replaced by extra filled receptacles, thereby avoiding any necessity for interrupting the operation of the apparatus for the purpose of supplying additional blanks to the mechanism.

The lower end of the receptacle 104 is contracted sufficiently as indicated at 466 to prevent accidental or unintentional downward passage of the blanks from said receptacle. Vacuum means, in general similar to the vacuum means provided for feeding bottom end closures from the receptacle 220, is provided for withdrawing the lowermost blank 78 through the contracted end of the receptacle and delivering such blank to a supporting guideway comprising a pair of spaced tracks or plates 467 between which the vacuum blank withdrawing means passes.

As shown in Figures 7 and 38, said vacuum blank feeding means comprises a pair of upwardly extending tubes 468 provided at their upper ends with suitable resilient cups for engaging surface portions of the lowermost blank 78 on opposite sides of its spout opening 81. The tubes 468 are slidable through a frame part as best shown in Figure 7, and said tubes extend upwardly from a T-shaped head 469 which is carried by the upper end of a pipe 470 which is connected to a valve 471. The valve 471 has a conduit 472 connected to its other end and said conduit is suitably connected through the agency of a flexible connection 473 to a suitable source of vacuum which may be a vacuum pump provided as a part of this apparatus or otherwise.

The conduit 472 is extended downwardly and is slidable through a suitable supporting structure 474 carried by the frame work of the apparatus and the lower end of said conduit or an extension thereof has connected to it the free end of a lever 475 which is pivotally mounted as indicated at 476 on a stationary shaft 479 suitably supported in the frame work of the apparatus (see Figure 4). Intermediate its ends the lever 475 is provided with a cam engaging roller 477 which engages the periphery of a rotary cam 478.

The cam 478 is so shaped that incident to its rotation it will effect upward movement of the vacuum tubes 468 and the valve 471 so as to cause the cups on the upper ends of said tubes 468 to engage the lowermost end closure blank 78. The valve 471 is controlled by a stationary cam 480 which serves to open the valve when it is moved upwardly to a predetermined extent and to maintain the valve open during a predetermined extent of vertical movement thereof, so that the cups on the upper ends of the tubes 468 will have the lowermost end closure blank 78 pneumatically secured thereto so that such lowermost blank will be thereby withdrawn from the receptacle 104 incident to downward movement of the withdrawing members 468. Downward movement of the structure is insured by the provision of a coil spring 481 which is compressed between a collar 482 on the downward extension of the member 472 and the stationary guide for said member 472.

The valve 471 is of course closed to release the end closure blank therefrom at about the time that the closure blank is lowered into contact with the tracks 467.

The blank thus delivered to the tracks 467 beneath the receptacle 104 is fed edgewise step by step by means of a pair of conveyor chains 483 which are connected together by means of cross-bars 484 which underlie the tracks 467. Pusher members 485 extend upwardly from said cross-bars 484 and travel between the tracks 467.

The chains 483 are guided by suitably mounted sprockets 486, 487, 488 and 489, the reaches of the chains between the sprockets 486 and 487 being the active or operative reaches which propel the end closure blanks delivered to the tracks 467.

The chain is propelled step by step by means of a cam 490 which acts on a roller 491 carried by a lever 492. The lever 492 is pivoted at its lower end as indicated as 493 and the upper end of the lever has pivoted to it a link 494, the other end of which is connected to an arm 495 which is rockably mounted on the shaft 496 on which the sprockets 489 are mounted. A ratchet wheel 497 is mounted on said shaft 496 and is rigidly connected to the sprockets 489 through the agency of said shaft 496 and said arm 495 carries a pawl 498, one end of which is adapted to normally engage the periphery of the ratchet 497 and to act against the teeth thereof as will be apparent from inspection of Figure 8. The pawl 498 may be urged into operative engagement with the ratchet 497 by spring or other suitable means not shown.

The cam 490 is carried by the frame structure and said shaft is continuously rotated by means of a gear connection indicated at 500 with the main driven shaft 131. The sprockets 488 are rotatable on said shaft 499.

The cam 490 is so shaped that it will effect rocking movement of the lever 492 and thereby impart rocking movement to the arm 495 and pawl 498 so as to advance the ratchet 497 step by step. The cam 490 is synchronized with the other operations of the apparatus and each step of travel imparted to the chain is of predetermined extent to advance the end closure blanks corresponding distances each step of movement.

In the present apparatus, a blank 78, upon being advanced two steps from the position in which it is delivered to the tracks 467, is located under a unit of mechanism indicated generally at 501 which applies thereto the spout blank member 82.

The spout blanks are supplied to the apparatus in a stack carried by the magazine 105 (Figure 2) which is located at one side of the path of travel of the blanks 78.

The receptacle 105 is similar in construction and arrangement to the receptacles 104 and 220 and the blanks are fed one by one from the bottom of the stack in the receptacle by pneumatic means indicated generally at 502.

The pneumatic means 502 is generally similar to the pneumatic means previously described for feeding blanks 78 from the receptacle 104, wherefor further detailed description is unnecessary. However, the pneumatic means 502 is vertically slidably mounted above its valve structure 503 which receives a sliding shoe 505 constituting the lower end of the vertically movable pneumatic feeding means. A flexible hose connection 506 with a pump or other vacuum producing means is provided and the valve 503 is controlled by stationary cam means 507.

Vertical movement of the pneumatic feed device 502 is effected by a cam 508 which engages a roller 509 carried by the sliding shoe 505. The cam 508 is mounted for rotation with a shaft 510 which is suitably journalled in frame portions of the apparatus (see Figure 7), the shaft 510 being continuously driven by means of a chain 511 which engages suitable sprockets secured to the shaft 510 and the cam driven shaft 131 (see also Figure 4).

The blanks withdrawn from the bottom of the spout 105 are deposited on a pair of tracks or rails 512 (see Figures 41 to 43 inclusive) which are spaced horizontally and between which a pusher is reciprocated to feed the blanks edgewise to a position overlying a blank 78 on the tracks 467.

The pusher mentioned is indicated at 513, the same being carried by a plate 514 which is slidably mounted beneath the tracks 512. The plate 514 and its pusher 513 are actuated in properly synchronized relation to the other mechanism by means of a cam 515 on the shaft 510 which cam acts against a roller carried by an arm 516 which is suitably pivotally mounted at one end in the frame structure as indicated at 517. The other end of said arm is connected by means of a link 518 to one arm 519 of a bell crank which is pivotally mounted in a frame or bracket part as indicated at 520. The other arm of said bell crank extends upwardly as indicated at 521 and is provided with a pin and slot connection 522 with a lug depending from the slidable plate 514.

The spout blanks 82 are fed by the pusher member 513 edgewise to a position indicated at F (Figures 41 and 42) wherein they are disposed substantially co-axially of blanks 78 disposed on the tracks 467. In the position F, the blanks 82 are supported by pivotally mounted members 523, 524 and 525, the same being mounted on suitable shafts or rods indicated at 526, 527 and 528 which are in turn rotatably supported by suitable frame carried bearings such as indicated at 529.

The inner supporting portions of said members 523, 524 and 525 are bored out and receive electrical heating units such as indicated at 530 from which suitable flexible electric connecting wires 531 extend to a source of electric current.

The blanks 82, as already indicated, are preferably coated around their margins on their under sides with suitable thermo-plastic adhesive and such adhesive is in a dry, non-tacky condition on the blanks as they leave the receptacle 105. The heated supporting members 523, 524 and 525 serve to soften or reactivate such thermo-plastic adhesive to make it tacky and in condition for adhesively uniting the blank 82 to the blank 78.

The shelves are normally held in horizontally disposed, blank supporting position by means of rods 532, 533 and 534 which extend upwardly from short bell crank arms such as indicated at 535 carried by one end of the respective shafts of the supporting shelves. The rods 532, 533 and 534 extend upwardly and pass through laterally extending ears such as shown at 536 which are formed integrally with vertically movable mechanism which is about to be described.

As shown, the shelves are resiliently supported by means of springs 537 disposed around the upper end portions of the respective rods and confined between the upper surfaces of the ears 536 and collars such as indicated at 538 on the respective rods. It will be apparent that when the ears 536 are lowered, the supporting shelves will be permitted to rock downwardly and further that the shelves may be forcibly rocked downwardly since the springs 537 may be compressed to permit movement of the supporting rods 532, 533, 544, relative to the said ears 536.

The vertically movable mechanism with which the ears 536 are formed is shown in Figures 39 and 45 to 47, inclusive.

Said mechanism comprises a shaft 539 which is vertically slidably mounted in a suitably supported bracket member 540. The lower end of said shaft 539 is provided with an outwardly extending shoulder part 541 and a cam knob 542. The lower end portion of the shaft 539 is drilled out to provide a socket 543 within which there is slidably mounted a shaft 544, said shaft being capable of longitudinal movement within said main shaft 539 but the movement being limited by means of a cross-pin 545 which extends through the shaft 544 and through diametrically opposed slots such as shown at 546 in the shaft 539.

The lower end of the shaft 544 is provided with a cross-head 547 which is equipped with downwardly offset feet 548. A pair of rock arms 549 are pivotally secured as indicated at 550 to the respective ends of the cross-head 547, and said arms have upwardly extending portions provided at their upper ends with rollers 551 which engage the cam knob 542. Said rock arms 549 also have inwardly offset and downwardly extended portions, the lower ends of which are notched to provide relatively narrow, vertically extending end portions 552.

The main shaft 539 has secured to its lower end a member 553, the latter being clamped on said shoulder 541 by means of a nut 554 so as to be rigidly and non-rotatably held in place on the shaft 539.

The member 553 has connected to it downwardly extending side member 555 which have connected to their lower ends an end member 556. The lower portions of the side members 555 are provided with vertically extending grooves indicated at 557 in which grooves end portions of the feet 548 are slidable.

The sliding connection thus effected between the shaft 544 and the side members 555 serves to effectively maintain said parts in proper co-axial relation especially near their lower ends.

The side members are provided with openings such as indicated at 558 and leaf spring members 559 are carried by such side members and extend through said openings 558 and engage the rollers 551 to thereby yieldingly urge the same into operative engagement with the cam knob 542. The aforementioned ears 536 are formed integrally with or secured to the said side members 555 which may, if desired, constitute portions of either a cylindrical or a rectangular box-like structure. In this instance the members 555 constitute the sides of a rectangular box-like structure.

The shaft 539 and the parts carried thereby are adapted to be vertically actuated by means of a cam 560 which is carried by the main shaft 131 (see Figure 40). The cam 560 acts against a roller 561 carried by an arm 562 which is pivotally mounted as indicated at 563 on the frame carried shaft 479. The opposite or free end of the arm 562 is connected by an upwardly extending rod 563 to one end of a cross-arm 564 which is pivotally mounted intermediate its ends as shown at 565 on a suitable bracket or post. The other end of the arm 564 is connected in any suitable manner as by means of a pin and slot connection indicated at 566 to the upper end of the shaft 539. A spring such as indicated at 567 may be provided for normally urging the movable parts in such a direction that the cam engaging roller 561 will be yieldingly held in operative engagement with the cam 560.

The cam 560 is so formed and timed that, in properly synchronized relation to other operating mechanism, the shaft 539 will be lowered with the result that the narrow end portions 552 of the rockable members 549 will come into engagement with the top of the spout containing blank 82 disposed on the pivoted heating shelves 523, 524, 525. The arrangement is such that the said narrow end portions 552 will engage the spout side portions 87, 87 of the blank 82 so that continued downward movement of the members 552 will be effective to fold said spout sides 87 downwardly as shown in dotted lines in Figure 45.

For cooperating with the spout side folding structure and particularly for supporting the spout bottom 86 during such folding operation, there is provided a rod 568 vertically slidably mounted in a suitable bearing bracket 569 carried by the frame work of the apparatus. Said rod is actuated by means of a cam 570 carried by the rotating shaft 510 (see Figure 39) which cam engages a roller 571 carried by an arm 572 which extends downwardly from a normally horizontally disposed arm 573. The arm 573 is pivotally mounted coaxially with the pivot mounting 529 of the bell crank arms 519 and 521 and the free end of said arm 573 has a pin and slot connection indicated at 574 with the lower end of said rod 568.

The upper end of the rod 568 is provided with a narrowed or flattened end portion 575. The said rod is so located that when it is moved upwardly its upper end portion 575 will be moved through the dispensing opening 81 in the end closure blank 78, then in position beneath the spout containing blank 82. The cam 570 is so shaped and timed that in properly synchronized relation with the operation of the shaft 539, the rod 568 will be moved upwardly so as to cause its upper end to support said spout bottom 86 during the spout side folding operation of the fingers 552.

The spout sides 87, 87 are folded downwardly to the dotted line position thereof as shown in Figure 45 incident to unitary downward movement of the shafts 544 and 539. When the recessed end walls 576 of the rocking bars 549 come into engagement with portions of the spout bottom 86 supported on the upper end of the part 575, downward movement of the rock members 549 terminates but downward movement of the shaft 539 and the side members 555 and other parts rigidly connected to the shaft 539 continues with the result that the cam knob 542 passes between the rollers 551 so as to spread the upper end portions of the arm 549, thereby moving together the lower end portions 552 thereof which are then in engagement with the outer faces of the approximately vertically disposed spout sides 87. Hence the movement of said lower portions 552 toward each other will serve to further fold said spout sides 87 into downwardly converging relationship as indicated in Figure 46.

When the spout sides 87 are folded to the said converging relationship, the supporting rod 568 begins to move downwardly and such downward movement is in unison with continued downward movement of the shaft 539, and parts carried thereby. When such unitary downward movement of the shaft 539 and supporting member 568 commences, the lower end member 556 of the structure carried by the shaft 539 is in engagement with the upper surface of the blank 82, so that continued downward movement of said end member 556 will necessarily force the end member downwardly past the supporting shelves 523, 524, 525, which may, of course, be rocked downwardly on their respective shafts as already indicated. Furthermore, by the time that the shaft 539 is lowered to the position illustrated in Figure 46, the ears 536 which support the shelves 523, 524, 525 are correspondingly lowered, so that the supporting pressure of the springs 537 is substantially reduced.

To avoid objectionable pressure on the surfaces of the shelves 523, 524, 525, the rods 532, 533, 534 (see Figure 39) may be provided with collars such as indicated at 577 which are so located that the bottom surfaces of the ears 536 will engage such collars to effect the downward rocking of the shelves at the proper time.

After the parts reach the position shown in Figure 46, they move downwardly in unison until the lower ends 578 of the rock arms 549 are stopped by engagement of portions of the blank 78 at opposite sides of the opening 81 therein, which portions are adequately supported by the underlying parts of the tracks 467. The shaft 539 and the parts carried thereby including the end member 556 are, however, permitted to continue downward movement for a short distance until the blank 82 is deposited in face to face contact with the upper face of the blank 78 and pressed tightly thereagainst so as to cause the adhesive carried by the under side of the blank 78 to effectively unite the blank 82 to the blank 78, with the spout sides 87, 87 passed through the said opening 81 as clearly shown in Figure 47.

Incident to such added downward movement of the shaft 539 and parts carried thereby, the ridge of the cam knob 542 passes beyond the rollers 551 so as to permit the springs 559 to force the upper ends of the arms 549 toward each other so as to cause said rollers 551 to rest on the upwardly and inwardly inclined surface portion of the cam knob 542.

The member 568 is thereupon lowered to its original or starting position as shown in Figures 39 and 42, and the shaft 539 is also raised to its starting position as indicated in Figure 45. Incident to the upward movement of the shaft 539, the shaft 544 will also be moved upwardly by reason of the overhanging relationship of the rollers 551 to the cam knob 542. However, when the cross-pin 545 engages the lower end of the bracket 540, such upward movement of the shaft 544 will be stopped. Continued upward movement of the shaft 539 will therefore pull the cam knob 542 past the rollers 551 to restore the parts to the position illustrated in Figure 45 to be in readiness for another spout assembling operation. It will also be noted that incident to the upward movement of the shaft 539, the ears 536 move upwardly and serve to restore the shelves 523, 524, 525 to spout blank supporting position.

After the spout structure is applied to the closure blank 78 in the manner explained, the blank is advanced another step to a position in which the sealing member 93 is applied.

The apparatus for forming and applying the sealing member is most clearly shown in Figures 48, 49 and 50. The supply roll 108 of paper or other material from which the sealing member 93 is formed is suitably mounted on brackets 585 carried by the main frame. The brackets 585 (see also Figure 2) also carry guide rolls 586 and 587 around which the strip 107 is threaded as indicated in Figure 48 before being passed between a pair of feed rolls 588 and 589.

The feed roll 589 is suitably journalled in the brackets 585 and it is driven by a suitable gear connection indicated at 590 to a suitably supported shaft 591 which is provided with a sprocket for receiving a driving chain 592. The chain 592 also engages a sprocket on the driven shaft 518 whereby driving power is transmitted to the chain 592.

The strip 107 is fed between suitable horizontally spaced guide members such as indicated at 593 into an operating zone between upper and lower die carrying plates 594 and 595, respectively. The lower die carrying plate 595 is provided with a pair of oppositely disposed notching dies 596 which cooperate with a complementary die member 597 carried by the upper member 594.

The lower die plates 596 are rigidly mounted in the plate 595 and the upper die member 597 is rigidly mounted on the upper carrying plate 594. There is provided a clamping plate 579 which surrounds the lower end portion of the die 597, said clamping plate being yieldably mounted on the upper carrying member 594 through the agency of upwardly extending posts 598 which are slidable through the carrying member 594. Coil springs indicated at 599 are disposed around the posts 598 between the clamping plate 579 and the carrying member 594, so as to yieldingly hold the clamping member 579 in downwardly spaced relation to the carrying member 594, the limit of downward movement being determined by stop and lock nuts indicated at 600 on the upper ends of said posts 598.

As best shown in Figure 49, the notching dies 596 (and the complementary notching die 597) are so shaped as to cut out V-shaped marginal portions of the strip 107. The dies are so shaped that at the inner ends or at the apex of each notch there is a short straight edge as indicated at 601 substantially parallel with the normal side edges of the strip 107 and extending between the adjacent ends of the angular sides of the notch.

The upper die carrying member 594 has yieldably connected to it another clamping member 602, the same being vertically slidably supported therein and yieldingly held in downwardly spaced relation by post and spring means as illustrated in Figure 50. Said member 594 also carries a shearing knife 603 which is adapted to cooperate with a stationary blade 604 carried by the member 595.

The member 594 is vertically slidably mounted relative to the member 595 on posts 605 which extend upwardly from the member 595 through the member 594 and through suitable upstanding bosses 606, formed on the top of said member 594. Suitable coil springs 607 disposed around the posts 605 between the upper and lower members 594 and 595 normally urge the member 594 to an upwardly disposed position wherein the clamping members 579 and 602, the die 597, and knife 603 are spaced upwardly from the surface of the member 595 to permit travel of the strip 107 over the surface of the member 595.

The relationship existing between the dies 596 and 597 and the cutting members 603 and 604 is such that when the dies 596 and 597 cut notches in the strip 107, the knife 603 severs an end portion of the strip therefrom along a line connecting the rearmost ends of the edges 601 to thereby separate from the strip a seal member shaped as indicated in Figures 51 and 58. Such seal member is received in a sleeve-like member 608 which serves to accurately position the member in the desired overlying relation to the spout structure on the end closure member 78 which then overlies the said sleeve 608 on portions of the tracks 467.

The upper die and knife carrying member 594 is actuated by means of a cam disc 609 which is mounted for rocking movement on a shaft 610 suitably supported on a plate 611 carried by the upper ends of the posts 605. Said cam member 609 is provided with an ear 612 to which is connected the lower end of a link 613 (Figure 48), the upper end of which is connected to the outer or free end of a cross-arm 614 which is pivoted intermediate its ends on a suitable post or bracket part as indicated at 615. The opposite end of the arm 614 is connected through the agency of a universal joint 616 to a connecting rod 617, the lower end of which is pivoted to the free end of a rock arm 618 which is mounted for rocking movement on the shaft 479.

The arm 618 is rocked by means of a cam 619 carried by the shaft 131, said cam engaging a suitable roller 620 carried by the arm 618 intermediate its ends. A spring 621 suitably connected between a stationary and a moving part of the operating structure serves to normally cause the roller 620 to follow the cam 619. It will be seen that the cam 619 is effective through the described link and arm connections to the cam 609 to periodically rock the cam 609.

The cam 609 acts against a roller 622 which is suitably mounted on top of the carrying plate 594 so that rocking movement of the cam 609 results in downward movement of the member 594 and the clamping plates and cutting parts carried thereby.

When the strip 107 is being cut, it is held against movement by the clamping members 579 and 602. The feed rollers 588 and 589 are, however, continuously rotated so that the strip 107 is caused to bulge upwardly in the space between the clamping member 579 and the feed rolls 588 and 589. As soon as the strip 107 is released by the clamping members 579 and 602, its normal tendency to assume a flat condition causes the bulge to flatten out with attendent accelerated advancement of the strip between the clamping members 602 and the underlying parts of the carrying member 595.

For the purpose of insuring proper advancement of the strip within the zone of operation of the die structure, there is provided an additional feed roller 623 which is driven at a suitable speed by a chain 624 which engages sprockets carried by shaft portions of said feed rollers 589 and 623. A roller 625 is associated with the feed roller 623 for insuring contact between the strip 107 and the feed roller 623. Said roller 625 is mounted for rotation in the arms such as indicated at 626, the latter being pivoted intermediate their ends as shown at 627 on suitable supports carried by the member 595. The opposite ends of the said arms 626 are connected by springs such as shown at 628 to the upper member 594. When the member 594 is raised, the spring 628 is stretched to thereby resiliently urge the roller 625 toward the feed roller 623. However, when the carrying member 594 is lowered, the tension on the spring 628 is reduced or wholly eliminated, so that the roll 625 produces no substantial frictional contact between the strip 107 and the feed roll 623. Hence the feed roller 623 may slip relative to the strip 107 when the strip is held against movement by the clamping members as already explained.

The sealing member 93 which is deposited on the spout containing end closure 78 in the manner already explained, is preferably formed of sheet material which contains a coating of suitable thermoplastic adhesive material. It is adhesively united in the marginal band 95 already referred to by means of an electrically heated presser member 629 carried by a vertically slidable rod or plunger 630. The plunger 630 is slidably mounted in a suitable bracket 631 (Figure 48) and it is adapted to be actuated by a pin and slot connection 632 with a portion of the rock lever 614.

The presser member 629 has its lower end portion provided with a depending rim-like formation 633 which corresponds to the desired marginal band of attachment of the seal 93 to the spout containing end closure and said rim may be suitably stepped as indicated to correspond to the different levels of the top surfaces of the blank members 82 and 78 which are readily noticeable in Figure 63. An electric heating unit is indicated at 634, the same being of any suitable construction and mounted in any convenient manner such as illustrated in Figure 50.

*The top end closure forming and applying mechanism*

The end closure structure assembled as above described is fed from its last station on the supporting tracks 467 to a position on a vertically movable support 635 where it overlies a normally stationary lower forming die 636. The mechanism for feeding the assembled end closure units from the tracks 467 to said support 635 comprises a pair of horizontally reciprocable mounted feed members 637, the same having horizontally extending flange or ledge portions 638 which underlie and thereby support the end closure assembly. Said members 637 and 638 are suitably slidably mounted in the structure which supports the tracks 467 as shown in Figure 50, and they have downwardly extending lugs 639 through which they are adapted to be reciprocated.

Reciprocation of the feed members 637 is effected through the agency of bell cranks including upwardly extending arm portions 640 which have their upper ends connected to said lugs 639 by means of suitable pin and slot connections indicated at 641. The bell cranks are pivotally mounted as indicated at 642 on suitable frame carried brackets or the like and they have horizontally extending arm portions 643 which are connected by means of a suitable universal joint 644 to one end of a link 645, the other end of which is connected to the free end of a lever 646 which is pivotally mounted at one end at 647 on a frame part of the apparatus. A roller 648 carried by the lever 646 intermediate its ends is engaged by a cam 649 carried by the shaft 510. A spring 650 connected between a stationary part of the frame structure and a part of the operating linkage serves to cause the roller 648 to follow the cam 649.

It will be seen that the cam 649 is operative to reciprocate the feeding members 637 horizontally. Said feeding members 637 engage rearwardly disposed edges of the outer flange portions 73 of the closure assembly and thereby advance the same to the vertically movable supporting plate 635. As shown in Figure 52, the members 637 have their upper surfaces inclined downwardly and rearwardly so that upon rearward movement of the members 637 they are adapted to move under the outer flange portions 73 of a newly positioned end closure assembly. Rearward movement of such assembly incident to frictional engagement between the members 637 and the overlying portions of the assemblies is prevented by engagement of a portion of the assembly with one of the feeding lugs 485.

After the closure assembly is deposited on the support 635, the latter is lowered so as to deposit such assembly on the upper edge of the die member 636. To insure properly centered positioning of the assembly on the member 636, the supporting plate 635 is provided with positioning stops 651 which accurately position the end closure assembly on the plate 635, and on the die 636. The indicated vertical movement of the supporting structure 635 is effected by means of a cam 652 carried by the shaft 510 which operates against a roller 653 carried by a lever 654 suitably pivotally mounted at one end as indicated at 655 on a conveniently located frame part.

The other end of the lever 654 has connected to it one end of a link 656, the opposite end of which is pivoted to one end of a rock lever 657 which is pivotally mounted intermediate its ends on a suitable bracket 658. The other end of the rock lever 657 is connected by means of a pin and slot connection as shown at 659 to a post 660 which is connected to the supporting plate 635 through the agency of a pair of rods 661 which are slidable through the frame work which supports the lower die 636 as best shown in Figure 53.

The lower die 636 is disposed in vertical alignment with a forming head 103 carried by the rotary structure 102 (Figure 2) which is of substantially the same construction as the rotary structure 98 for forming and applying the bottom end closures. A top end closure forming and applying head 103 is fragmentarily shown in Figure 56, inspection of which discloses that the inner and outer flange portions 79 and 80, respectively, of the closure member 78 are formed in and bent around the upper portion of the die 636 substantially in the same manner as already explained in respect of the formation of the lower end closures 71.

Because of the presence of the depending spout side 87 in the upper closure member, the lower forming die 636 is modified as compared with the lower forming die 248 by having an apertured supporting plate 662 instead of a solid supporting plate such as 289 in the bottom end closure forming die 248 (compare Figure 56 with Figure 25). The supporting plate 662 is resiliently supported by means of a pair of posts 663 which are vertically slidable through the base portion of the forming die 636 and are connected at their lower ends to a cross member 664 which is mounted on the upper end of a post 665. The post 665 is vertically slidable in a suitable bracket 666 and a spring 667 interposed between the cross member 664, and a portion of the bracket 666 serves to yieldingly urge the post 665 and the plate 662 to its upper limit of movement which is determined by a stop nut or head 668 on the lower end of the post 665.

It will be understood that the upper limit of movement of the member 662 is such that its top surface is substantially flush with or slightly higher than the upper edges of the die member 636, so that upon downward movement of the plate 635, the end closure assembly will be deposited on said apertured plate 662. The base portion of the die 636 is also apertured as shown in Figure 56 to receive the side walls 87 of the spout structure.

A supplementary pressure applying arm 669 corresponding substantially to the pressure applying arm 352, is provided for producing an added pressure on the forming dies to insure complete forming and sharp folding of the various parts of the end closure member 78. Said arm 669 is operated by means of another arm 670 to which it is connected by means of a link 671, and which arm 670 carries a roller 672 which engages a cam 673 carried by the driven shaft 131.

After the die head 103 has completed its forming operation on the spout containing upper end closure, it is elevated as already explained in connection with the forming die heads 99 and serves to carry with it the spout containing upper end closure. Such end closure is thereupon carried to a heating station indicated at G in Figure 2, where thermo-plastic adhesive material carried by the then lower faces of at least the flange portions 79 and 80 of the upper end closure is heated so as to soften the adhesive material to a tacky condition.

Thereafter, the end closure is advanced another step of movement by the rotary structure 102 to a position indicated at H, where the die structure 103 carrying such end closure is in alignment with the upper end of a filled container. The upper end closure is then applied to the upper end of the filled container in substantially the same manner as already explained in reference to the application of the bottom end closure.

The end closure is then released from the applying heads 103 and the closed container then advanced another step by the gripper structure which carries the closed container into the operating zone of the auxiliary squeezing means 111 which is of substantially the same construction as the previously described means for applying a second squeeze to the inner and outer flanges of the bottom closure to insure tight sealing contact between the flanges and the embraced marginal portion of the container body.

The second squeezing structure 111 is, in effect, represented in the cross-sectional view Figure 36 which has been described in connection with the bottom end closure second squeezing structure.

The means for operating the second squeezing structure, 111, comprises a cam 680 carried by a shaft 681 which is suitably mounted for rotation and driven by a gear connection indicated at 682 with the driven shaft 131 (see Figure 4). The cam 680 operates against a roller 683 carried by an arm 684 (see Figures 3 and 4) suitably pivotally mounted at one end and having connected to its other end an upwardly extending rod 685 which is connected to the operating arms 686 of the structure 111.

After the second squeezing operation is completed, the completely closed container is advanced another step to the discharging station indicated at J, where the gripper members are opened to permit the container to drop by gravity to the discharge conveyor 112 which is suitably driven by gear and chain connections indicated generally at 687 (Figs. 3 and 10) to the shaft 131.

To insure discharge of the filled container from the gripper members, there is provided (see Figure 10) a vertically slidable plunger 688 suitably mounted in brackets carried by the frame structure. Said plunger is adapted to be moved downwardly into engagement with the upper end of a filled package carried by the grippers to the discharging station to thereby forcibly eject the package in the event that it does not fall of its own weight to the conveyor 112. As shown in Figure 10, the package supporting shelf 186 is provided with an opening 689 at the discharge station to permit packages to drop through the shelf to said discharge conveyor 112.

The plunger 688 is adapted to be reciprocated by means of a rock arm 689 which is pivoted intermediate its ends as indicated at 690 with one of its ends suitably connected to the plunger rod 688. The other end of said rock arm 689 is connected by means of a rod 691 to one end of a rock arm 692 which is pivotally mounted at its other end in suitable brackets as indicated at 693 (Figure 4). The rock arm 692 carries a roller 694 which is acted upon by a cam 695 to effect the desired rocking movement of the arm and consequent vertical movement of the plunger 688.

Incident to the travel of the container carrying structure between the station H (Figure 2) and the supplementary squeezing unit 111, the latches 443 are subjected to engagement with a stationary cam member 696 which is suitably mounted on the supplementary squeezing unit 111 and located in the path of movement of the latch ears 442. In the event that a latch has been moved into position for locking one of the valve gates against opening movement, it is desirable that such latch be automatically opened so as to permit operation of the valve gate in connection with the next package filling operation with which such valve gate may be associated. Accordingly, the cam member 696 is positioned as shown in Figure 2 to engage the latch ear 442 to release the same after the gate structure has traversed the zone of the filling operation and would normally be returned to closed position.

The rotary structure 102 which forms and applies the spout containing upper end closure is rotated step by step one-quarter of a turn at a time by means of a pawl 697 carried by a portion of the arm 271 (Figure 4), said pawl operating against the teeth of a ratchet wheel 698 which is carried by the shaft 272 of said rotary mechanism 102. The rotary mechanism 102, like the rotary mechanism 98, is connected to the gripper carried turret for rotating the latter step by step by means of the previously mentioned gears 187, 189, shafts 191, 194, and gears 699, on the shaft 194 and 700 on the shaft 272.

For locking the rotatable turret structure on the shaft 258 in operating position between each step of movement thereof there is provided on said shaft a toothed disc 705, the same being rigidly connected to the ratchet wheel 265 (see Figures 3, 5 and 9). The disc 705 is provided with peripheral slots or notches 706. The notches 706 are successively engaged by a locking plunger 707 which is slidably mounted in suitable bearings indicated at 708 and 709 carried by frame parts of the apparatus. Intermediate the bearings 708 and 709, the locking bar 707 is provided with a sleeve or collar 710 which is rigidly secured to the bar so as to be movable axially therewith. A spring 711 disposed around a portion of said locking bar 707 intermediate the collar 710 and the bearing 709 normally urges the locking bar to move toward the locking disc 705 and to enter one of the notches 706 to thereby lock said disc 705 and the parts to which the disc is attached against rotation.

The locking bar 707 is periodically disengaged from the locking disc 705 in synchronized relation to the desired movements of the apparatus by means of a cam 712 carried by the shaft 131, such cam acting against a roller carried by an arm 713 which is pivotally mounted at its lower end on a bracket or other part carried by the frame and has its upper end forked and operatively connected to the collar 710 on the locking rod 707 (see Figure 9).

The rotary turret structure carried by the shaft 272 is similarly periodically locked against movement by means of a locking disc 714 (see Figures 4 and 7) which is rigidly connected to the ratchet wheel 698 and therethrough to the shaft 272, a cam actuated locking rod 715 being provided for cooperating with said locking disc 714. The locking rod 715 and locking disc 714 are substantially the same in construction and operation as the locking disc 705 and locking rod 707 above described.

The rotary turret structures carried by the shafts 258 and 272 are quite heavy and when set in motion the momentum thereof tends to continue them in motion. To avoid abrupt stopping and jarring of the apparatus and to eliminate strains thereon, there is preferably provided a braking arrangement which serves to more or less gradually stop the rotary movement of the turrets so that the smoothness of operation of the mechanism will not be impaired by the locking engagement effected between the locking discs 705 and 714 by their respectively associated locking rods 707 and 715.

Such brake mechanism (see Figures 5 and 9) comprises a brake drum 716 secured to the shaft 258 through the agency of the gear 266. A brake band 717 suitably lined for cooperation with said brake drum encircles the latter. The brake band 717, in properly synchronized relation to the movements of the apparatus is adapted to be closed and opened relative to the brake drum 716 by means of a cam 718 carried by the shaft 131 which actuates a bell crank 719 suitably pivotally mounted on the shaft 230. One arm of said bell crank is provided with a roller 720 for engaging the cam 718 and the other arm of the bell crank is connected by means of a link 721 to a rod 722 which is slidable in an aperture provided in an ear 723 formed at one end of the brake band 717. The other end of the brake band is anchored to a frame part as indicated at 724.

The rod 722 is provided with suitable stop means such as indicated at 725 which engages one side of the ear 723 to open the brake band when the bell crank 719 is rocked in one direction. On the opposite side of the ear 723 the rod is provided with a spring 726 and with suitable stop means 727, whereby when the bell crank 719 is rocked in the other direction, yielding pressure will be applied to the ear 723 to thereby close the brake on the brake drum 716 to gradually stop the rotation of the shaft 258 and parts carried thereby.

A similarly constructed and actuated brake structure comprising a brake drum 728 and brake band 729 is provided in association with the shaft 272 for stopping the rotation thereof in the indicated manner (see Figure 7).

The cage structure carried by the shaft 162 is also provided with means for locking it against rotation, such means being best shown in Figures 6 and 10. It comprises pairs of lugs such as indicated at 739 which depend from the lower member 175 of said cage structure. A locking rod 731 suitably slidably mounted in bearings 732 and 733 carried by conveniently located frame parts is adapted to successively enter between the pairs of lugs 730 as clearly indicated in Figure 10 to lock the cage structure against rotation. The locking rod 731 is normally urged into locking position by means of a spring 734 which is located between the bearings 732 and a collar 735 carried by the locking bar.

Withdrawal of the locking rod 731 is effected in properly synchronized relation to the operations of the mechanism by means of a cam 736 mounted on the driven shaft 131. The cam 736 engages a roller 737 carried by the end of one arm of a bell crank 738, the end of the other arm of which is operatively connected to the collar 735 on the locking bar 731, so that when the cam rocks the ball crank in the proper direction the locking rod will be disengaged from the lock bars 730.

The described details of construction may, of course, be varied considerably without changing the principles of operation involved in the apparatus and while nevertheless employing the invention embodied in the described apparatus. The scope of the invention should be determined by reference to the following claims which it is intended should be construed to refer to the inventive principles involved in the disclosed package apparatus and method rather than to the various mechanical expedients which are obviously subject to wide variation by those skilled in the art.

I claim:

1. In apparatus of the class described, means for forming a flat blank into an end closure having a peripheral, laterally extending, inner flange part and a rebent outer flange part and for applying such end closure to an end of a container body, said means comprising an axially movable plunger head and a female die member, said plunger head and die member being adapted to cooperate to form a flat blank into a flanged end closure, means for moving said plunger head into cooperative relation to said female die member, means associated with said plunger head and mounted for axial movement relative thereto for engaging a portion of the flange of the end closure to rebend the same as an incident to relative movement between said head and said means, means for effecting relative movement of said plunger head and die member to effect withdrawal of the formed end closure from said die member, said rebending means being provided with abutments for engaging portions of said formed end closure to hold the same to said plunger head during said withdrawal movement, said rebending means being also mounted for lateral movement toward and from the periphery of said plunger head for applying pressure to intervening portions of the flanged end closure and container body when the end closure is inserted into the latter, and means associated with said plunger head and axially vertically movable relative thereto and relative to said rebending means for effecting said lateral movement thereof to apply pressure as aforesaid.

2. Apparatus according to claim 1 wherein said rebending means consists of a plurality of pivotally mounted members surrounding said plunger head.

3. Apparatus according to claim 1 wherein said rebending means consists of a plurality of fingers mounted for rocking movement toward and from the plunger head and wherein the means for effecting such rocking movement consists of one or more cams axially movable relative to said plunger and said fingers and having operative engagement with the latter for effecting said rocking movement as an incident to said relative movement, and means for effecting said relative movement.

4. Apparatus according to claim 1 wherein there is provided in addition to said means for moving the plunger head into cooperative relation to the die member, a supplementary means for effecting such movement of the plunger head, thereby to relieve the first mentioned means of excessive operating strains.

5. Apparatus according to claim 1 wherein said axially movable plunger head and associated parts are mounted for lateral movement for carrying the end closure formed by said plunger head and die into position for insertion in a container body and wherein the means for effecting said axial movements of the plunger head and associated parts and for controlling the relative position thereof during said lateral movement thereof consists of a cam structure embodying a stationary part for controlling the relative position of said parts and a movable part, operative connections between said cam structure and said plunger head and associated parts, and means for effecting movement of said movable cam part to effect certain of said axial movements of the plunger head and associated parts.

6. Apparatus according to claim 1 wherein said plunger head and associated axially movable parts are mounted for lateral rotary movement for carrying an end closure formed on said plunger head to position for application to a container body, and wherein said axial movements of the plunger and associated parts and the relative position of said parts during said rotary movement thereof is effected and controlled by a cam structure embodying a normally stationary circular cam member and a movable cam member, the movable cam member constituting, in effect, a movable continuation of said normally stationary cam member, operative connections between said movable cam member and said plunger head and associated parts, and means for effecting movement of said movable cam part to actuate said plunger and associated parts.

7. Apparatus of the class described for forming a flat blank into a member having a peripheral, laterally extending, inner flange part and a rebent outer flange part, comprising an axially movable plunger head and a female die member, said plunger head and die member being adapted to cooperate to form a flat blank into a flanged end closure, means for moving said plunger head into cooperative relation to said female die member, means associated with said plunger head and mounted for axial movement relative thereto for engaging a portion of the flange of the end closure to rebend the same as an incident to relative movement between said head and said means, and means for effecting relative movement of said plunger head and die member to effect withdrawal of the formed end closure from said die member, said rebending means being provided with abutments for engaging portionss of said formed end closure to hold the same to said plunger head during said withdrawal movement.

8. In apparatus of the class described, a stationary die, a turret rotatable step by step, a punch carried by said turret and operative in one position of said turret to cooperate with said die to form a blank into a flanged end closure member, means associated with said punch for gripping said flanged end closure so as to cause the latter to be conveyed laterally into successive positions as an incident to rotation of said turret, means for heating the flange portions of said end closure in one of said successive positions, and means for applying said end closure to a container in another of said successive positions following said heating position.

9. In apparatus of the class described, the combination of a normally stationary die, means for positioning in predetermined relation to said die an end closure blank having a marginal portion coated with heat-sensitive adhesive, a turret structure rotatable step by step, means carried by said turret structure for cooperating with said die to form said blank into a flanged end closure having said heat sensitive adhesive on its flange portion, means for applying heat to the flange portion of the end closure formed as aforesaid, and means for applying the heated end closure to a container body during the period of rest of the turret structure next following the application of heat as aforesaid.

10. In apparatus of the class described, means for applying a flanged end closure to an end of a tubular container body, comprising an axially movable plunger structure having a head member adapted to fit within the flanged end closure, means carried by said plunger structure for engaging peripheral portions of the end closure to hold the same on said head member, means for moving said plunger structure in an axial direction to insert a flanged end closure carried thereby into an end of a tubular container body, means also carried by said plunger structure and axially movable relative to said head member and operative as an incident to such relative axial movement to fold flange portions of said end closure into face-to-face relationship to portions of the container body and to press together portions of the container body and end closure disposed intermediate said head member and said pressing means, and means for effecting said relative movement, said relatively axially movable plunger-carried means being also mounted for pivotal movement transversely of the direction of said axial movement, and there being provided means for effecting rocking of said pivoted means toward and from said head member to additionally press said container body and end closure portions together.

11. In apparatus of the class described, means for applying a flanged end closure to an end of a tubular container body, comprising an axially movable plunger structure having a head member adapted to fit within the flange end closure, means carried by said plunger structure for engaging peripheral portions of the end closure to hold the same on said head member, means for moving said plunger structure in an axial direction to insert a flanged end closure carried thereby into an end of a tubular container body, means also carried by said plunger structure and axially movable relative to said head member and operative as an incident to such relative axial movement to fold flange portions of said end closure into face-to-face relationship to portion of the container body and to press together portions of the container body and end closure disposed intermediate said head member and said pressing means, and means for effecting said relative movement, said relatively axially movable plunger-carried means being also mounted for pivotal movement transversely of the direction of said axial movement, and there being provided means operative as an incident to a portion of said relative movement for effecting rocking of said pivoted means toward and from said head member to additionally press said container body and end closure portions together.

FRANK D. PALMER.

REFERENCES CITED

The following references are of record in the file of this patent:

UNITED STATES PATENTS

| Number | Name | Date |
| --- | --- | --- |
| 605,053 | Corkhill | May 31, 1898 |
| 883,738 | Patterson et al. | Apr. 7, 1908 |
| 1,085,557 | Everett | Jan. 27, 1914 |
| 1,201,319 | Loufek et al. | Oct. 17, 1916 |
| 1,249,853 | Taliaferro | Dec. 11, 1917 |
| 1,366,006 | Jehn | Jan. 18, 1921 |
| 1,433,251 | Annen | Oct. 24, 1922 |
| 1,469,067 | Coates | Sept. 25, 1923 |
| 1,495,192 | MacNaughtan | May 27, 1924 |
| 1,746,835 | Jones | Feb. 11, 1930 |
| 1,987,185 | Dixon | Jan. 8, 1935 |
| 2,016,138 | Dixon | Oct. 1, 1935 |
| 2,026,780 | Frostad | Jan. 7, 1936 |
| 2,087,809 | Nichols et al. | July 20, 1937 |
| 2,106,739 | Harrison | Feb. 1, 1938 |
| 2,180,954 | Harrison | Nov. 21, 1939 |
| 2,170,821 | Hothersall et al. | Aug. 29, 1939 |
| 2,200,276 | Hothersall et al. | May 14, 1940 |
| 2,203,955 | Frederick | June 11, 1940 |
| 2,222,617 | Hothersall et al. | Nov. 26, 1940 |
| 2,241,711 | Lowey | May 13, 1941 |
| 2,337,528 | Stuckert et al. | Dec. 21, 1943 |
| 2,346,684 | Hothersall | Apr. 18, 1944 |
| 2,349,638 | Schreiber | May 23, 1944 |
| 2,350,232 | Hines | May 30, 1944 |
| 2,352,645 | Liebmann | July 4, 1944 |
| 2,352,646 | Liebmann | July 4, 1944 |
| 2,371,265 | Ray | Mar. 13, 1945 |
| 2,386,787 | Geertsen | Oct. 16, 1945 |

FOREIGN PATENTS

| Number | Country | Date |
| --- | --- | --- |
| 5,017 | Great Britain | of 1910 |